(12) United States Patent
Kim et al.

(10) Patent No.: US 11,023,009 B2
(45) Date of Patent: Jun. 1, 2021

(54) FOLDING MEMBER AND DISPLAY DEVICE INCLUDING THE SAME

(71) Applicant: Samsung Display Co., LTD., Yongin-si (KR)

(72) Inventors: Se Yong Kim, Gimpo-si (KR); Chang Min Park, Gwangmyeong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/695,107

(22) Filed: Nov. 25, 2019

(65) Prior Publication Data

US 2020/0257335 A1    Aug. 13, 2020

(30) Foreign Application Priority Data

Feb. 12, 2019  (KR) .......................... 10-2019-0016276
Apr. 26, 2019  (KR) .......................... 10-2019-0049105

(51) Int. Cl.
    *G06F 1/16*    (2006.01)
(52) U.S. Cl.
    CPC .......... *G06F 1/1641* (2013.01); *G06F 1/1616* (2013.01); *G06F 1/1681* (2013.01)
(58) Field of Classification Search
    None
    See application file for complete search history.

(56) References Cited

U.S. PATENT DOCUMENTS

| 9,021,657 | B2 * | 5/2015 | Park | H04M 1/022 |
| | | | | 16/354 |
| 9,173,288 | B1 * | 10/2015 | Kim | G06F 1/1618 |
| 9,348,450 | B1 * | 5/2016 | Kim | G06F 3/0412 |
| 9,535,452 | B2 * | 1/2017 | Ahn | H05K 5/0017 |
| 9,572,272 | B2 * | 2/2017 | Lee | H05K 5/0021 |

(Continued)

FOREIGN PATENT DOCUMENTS

| KR | 1020110100936 | 9/2011 |
| KR | 1020150135731 | 12/2015 |

(Continued)

OTHER PUBLICATIONS

Extended European Search Report—European Application No. 20152588.8 dated Jun. 9, 2020, citing references listed within.

*Primary Examiner* — Anthony Q Edwards
*Assistant Examiner* — Rashen E Morrison
(74) *Attorney, Agent, or Firm* — Cantor Colburn LLP

(57) ABSTRACT

A folding member includes first and second supporting members, joint units connected, on first sides thereof, to the first supporting member, connected, on second sides thereof, to the second supporting member, and coupled to one another to be rotatable along a first curved trajectory, a third supporting member below the first supporting member, a fourth supporting member below the second supporting member, and a hinge member providing first and second rotational axes, which are parallel to each other, to first sides of the third and fourth supporting members, respectively, that are opposite to each other. Each of the joint units includes a first guide part in an area on a bottom thereof. And each of the third and fourth supporting members includes, in an area thereof, a second guide part which guides the first guide part to rotate along the first curved trajectory.

30 Claims, 71 Drawing Sheets

(56) References Cited

U.S. PATENT DOCUMENTS

| | | | |
|---|---|---|---|
| 9,733,668 B2* | 8/2017 | Park | G06F 1/1679 |
| 9,801,290 B2* | 10/2017 | Ahn | G06F 1/1652 |
| 10,063,677 B2* | 8/2018 | Cavallaro | G06F 1/1626 |
| 10,082,827 B2* | 9/2018 | Yamauchi | G06F 1/1681 |
| 10,117,346 B2* | 10/2018 | Yang | H05K 5/0086 |
| 10,143,098 B1* | 11/2018 | Lee | E05D 3/18 |
| 10,274,997 B2* | 4/2019 | Lin | H04M 1/0268 |
| 10,306,788 B2* | 5/2019 | Bi | E05D 3/06 |
| 10,416,710 B2* | 9/2019 | Mizoguchi | G06F 1/1637 |
| 10,481,634 B2* | 11/2019 | Mizoguchi | G06F 1/1637 |
| 10,564,682 B1* | 2/2020 | Wu | F16C 11/04 |
| 10,705,563 B2* | 7/2020 | Lin | G06F 1/1681 |
| 10,716,228 B2* | 7/2020 | You | F16M 11/04 |
| 2011/0043976 A1* | 2/2011 | Visser | G09F 9/301 |
| | | | 361/679.01 |
| 2011/0063783 A1* | 3/2011 | Shim | G06F 1/1681 |
| | | | 361/679.01 |
| 2012/0120618 A1* | 5/2012 | Bohn | G06F 1/1681 |
| | | | 361/749 |
| 2013/0021762 A1* | 1/2013 | van Dijk | H05K 5/0226 |
| | | | 361/749 |
| 2015/0089974 A1* | 4/2015 | Seo | A44C 5/0076 |
| | | | 63/1.13 |
| 2017/0060188 A1* | 3/2017 | Han | G06F 1/1681 |
| 2017/0061836 A1* | 3/2017 | Kim | G06F 1/1652 |
| 2018/0275725 A1* | 9/2018 | Lin | H04M 1/022 |

FOREIGN PATENT DOCUMENTS

| | | |
|---|---|---|
| KR | 1020170003801 | 1/2017 |
| KR | 101726306 | 4/2017 |
| KR | 1020180005476 | 1/2018 |

* cited by examiner

FOLDING MEMBER AND DISPLAY DEVICE INCLUDING THE SAME

This application claims priority to Korean Patent Application No. 10-2019-0016276, filed on Feb. 12, 2019, and Korean Patent Application No. 10-2019-0049105, filed on Apr. 26, 2019, and all the benefits accruing therefrom under 35 U.S.C. § 119, the content of which in their entirety is herein incorporated by reference.

BACKGROUND

1. Field

Exemplary embodiments of the invention relate to a folding member and a display device including the same.

2. Description of the Related Art

A display device displaying an image includes a display panel such as an organic light-emitting element display panel including organic light-emitting diodes ("OLEDs") or quantum dot-electroluminescence ("QD-EL") elements or a liquid crystal display ("LCD") panel.

A mobile electronic device includes a display device to provide an image to a user. The demand for a smaller, thinner mobile electronic device with a larger display screen has increased, and a foldable (or bendable) display device capable of being folded or unfolded to provide a larger display screen only when in use has been developed.

Various methods may be used to realize the foldable display device. In a case where multi-joint parts that may be rotatably connected to one another are used to realize the foldable display device, the display panel of the foldable display device may be pressed by the joint parts in a folding area.

SUMMARY

Exemplary embodiments of the invention provide a display device having guide parts applied in multi-joint parts and thus improving durability.

Exemplary embodiments of the invention also provide a display device having a protective member applied in multi-joint parts and thus improving durability.

However, exemplary embodiments of the invention are not restricted to those set forth herein. The above and other exemplary embodiments of the invention will become more apparent to one of ordinary skill in the art to which the invention pertains by referencing the detailed description of the invention given below.

An exemplary embodiment of the invention provides a folding member including a first supporting member and a second supporting member, a plurality of joint units connected, on first sides thereof, to the first supporting member, connected, on second sides thereof, to the second supporting member, and coupled to one another to be rotatable along a first curved trajectory, a third supporting member disposed below the first supporting member, a fourth supporting member disposed below the second supporting member, and a hinge member providing first and second rotational axes, which are parallel to each other, to first sides of the third and fourth supporting members, respectively, that are opposite to each other.

In an exemplary embodiment, each of the plurality of joint units includes a first guide part in an area on a bottom thereof, and each of the third and fourth supporting members includes, in an area thereof, a second guide part which guides the first guide part to rotate along the first curved trajectory.

In an exemplary embodiment, the folding member may further include a first and a second rear covers disposed below the third and fourth supporting members, respectively.

In an exemplary embodiment, the first guide part may include a tunnel unit which extends perpendicularly from a middle of a surface of a respective joint unit of the plurality of joint units, and a penetration may be defined in the tunnel unit.

In an exemplary embodiment, the second guide part may include a guide arm which overlaps with the tunnel unit and slides along the penetration.

In an exemplary embodiment, the guide arm may extend along the first curved trajectory to be in contact with ends of the first and second rear covers.

In an exemplary embodiment, the first guide part may include a sidewall which is disposed at an end of the tunnel unit to extend perpendicularly from the surface of the respective joint unit and a hook which extends perpendicularly from the sidewall toward the tunnel unit.

In an exemplary embodiment, the second guide part may include a rail unit which overlaps with the hook and allows the hook to slide.

In an exemplary embodiment, the rail unit may extend along the first curved trajectory to be in contact with ends of the first and second rear covers.

In an exemplary embodiment, a height from a top surface of the hook to the surface of the respective joint unit may be the same as a height of the penetration.

In an exemplary embodiment, the plurality of joint units may be coupled by pin members.

In an exemplary embodiment, each of the plurality of joint units may include an extension which extends in a first direction and protrusions which are disposed at each of both ends of the extension and be convexly curved.

In an exemplary embodiment, grooves which are concavely curved in an opposite direction to the protrusions in a second direction which intersects the first direction may be defined in the extension.

In an exemplary embodiment, the protrusions may overlap with the grooves in the second direction and are rotatably coupled to the grooves.

In an exemplary embodiment, the plurality of joint units may be coupled by metal plates.

In an exemplary embodiment, metal plate holes which are through holes may be defined in the protrusions, and the metal plates penetrate the metal plate holes.

In an exemplary embodiment, each of the metal plates may include coupling areas and a bending area, the coupling areas may include coupling holes which are defined to correspond to coupling protrusions provided in the first and second supporting members, and the bending area may include a plurality of bending holes.

In an exemplary embodiment, link part grooves may be defined in areas of the protrusions. A link parts may be provided in areas of the link part grooves. The link parts and the link part grooves may overlap in the second direction and are rotatably coupled together.

In an exemplary embodiment, the first curved trajectory may be defined as a part of a reference circle, and a center of the reference circle may be apart from the first and second rotational axes.

In an exemplary embodiment, the hinge member may include a first gear which is connected to the first rotational axis, a second gear which is connected to the second rotational axis, and an idle gear which connects the first and second gears.

In an exemplary embodiment, the hinge member may include a rotary cam which performs a rectilinear motion, a fixed cam which converts the rectilinear motion of the rotary cam into a rotational motion, and an elastic member which firmly attaches the rotary cam and the fixed cam.

In an exemplary embodiment, the fixed cam may include three mountain-shaped parts and three valley-shaped parts.

In an exemplary embodiment, the rotary cam may form valley-shaped parts which engage with the mountain-shaped parts of the fixed cam to be in sliding surface contact with the mountain-shaped parts of the fixed cam and also form mountain-shaped parts on opposite sides of each of the valley-shaped parts of the rotary cam.

According to the aforementioned and other exemplary embodiments of the invention, a display panel foldable along a first curved trajectory in a folding area which is defined in a plan view, the display panel displaying an image and a folding member disposed below the display panel to support the display panel.

In an exemplary embodiment, the folding member may include first and second supporting members, a plurality of joint units connected, on first sides thereof, to the first supporting member, connected, on second sides thereof, to the second supporting member, and coupled to one another to be rotatable along a first curved trajectory, third and fourth supporting members disposed below the first and second supporting members, respectively, and a hinge member connected, on a first side thereof, to the third supporting member to be rotatable about a first rotational axis and connected, on a second side thereof, to the fourth supporting member to be rotatable about a second rotational axis.

In an exemplary embodiment, each of the plurality of joint units may include a first guide part. Each of the third and fourth supporting members may include, in an area thereof, a second guide part which guides the first guide part to rotate along the first curved trajectory.

In an exemplary embodiment, the first guide part may include a tunnel unit which extends perpendicularly from a middle of a surface of a respective joint unit of the plurality of joint units and a penetration may be defined in the tunnel unit.

In an exemplary embodiment, the second guide part may include a guide arm which overlaps with the tunnel unit and slides along the penetration.

In an exemplary embodiment, the first guide part may include a sidewall which is disposed at an end of the tunnel unit to extend perpendicularly from the surface of the respective joint unit and a hook which extends perpendicularly from the sidewall toward the tunnel unit.

In an exemplary embodiment, the second guide part may include a rail unit which overlaps with the hook and allows the hook to slide.

In an exemplary embodiment, the plurality of joint units may be coupled by pin members.

In an exemplary embodiment, the display device may further include a metal sheet disposed on the first supporting member, the second supporting member, and the plurality of joint units.

In an exemplary embodiment, an adhesive layers may be interposed between the metal sheet, the first supporting member, the second supporting member, and the plurality of joint units.

In an exemplary embodiment, each of the plurality of joint units may have a middle surface which is in contact with a surface of the metal sheet and two chamfered surfaces which are disposed on opposite sides of the middle surface.

In an exemplary embodiment, each of the plurality of joint units may have a middle surface which is in contact with a surface of the metal sheet and two cut surfaces which are perpendicular to the middle surface.

Other features and embodiments may be apparent from the following detailed description, the drawings, and the claims.

BRIEF DESCRIPTION OF THE DRAWINGS

The above and other exemplary embodiments and features of the invention will become more apparent by describing in detail embodiments thereof with reference to the attached drawings, in which.

DETAILED DESCRIPTION

Figure 1:
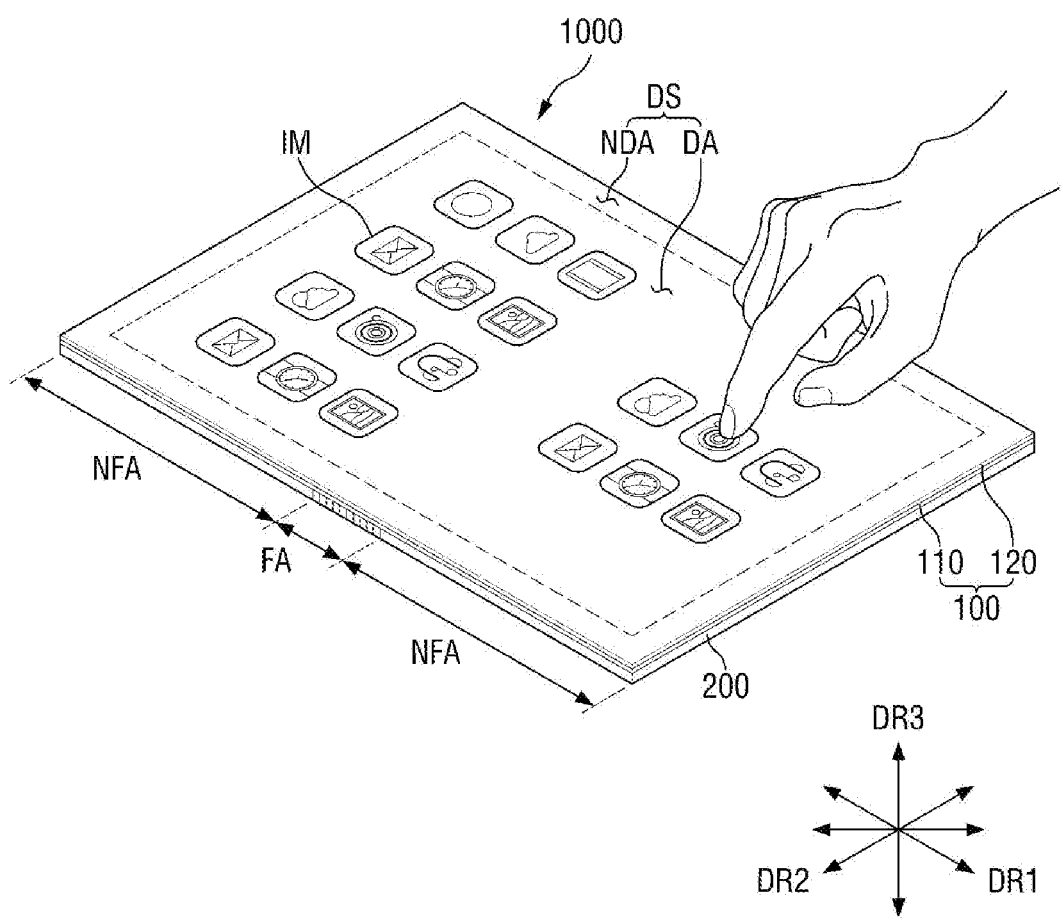
FIG. 1 is a perspective view of an exemplary embodiment of a display device according to the invention.

The advantages and features of the invention and methods for achieving the advantages and features will be apparent by referring to the exemplary embodiments to be described in detail with reference to the accompanying drawings. However, the invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the invention is only defined within the scope of the appended claims.

Where an element is described as being related to another element such as being "on" another element or "disposed/located on" a different layer or a layer, includes both a case where an element is disposed/located directly on another element or a layer and a case where an element is disposed/located on another element via another layer or still another element. In contrast, where an element is described as being is related to another element such as being "directly on" another element or "disposed/located directly on" a different layer or a layer, indicates a case where an element is disposed/located on another element or a layer with no intervening element or layer therebetween. In the entire description of the invention, the same drawing reference numerals are used for the same elements across various drawing figures.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the invention. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," and "including," are to be construed as open-ended terms (i.e., meaning "including, but not limited to,") unless otherwise noted.

Hereinafter, embodiments of the invention will be described with reference to the attached drawings.

Figure 2:
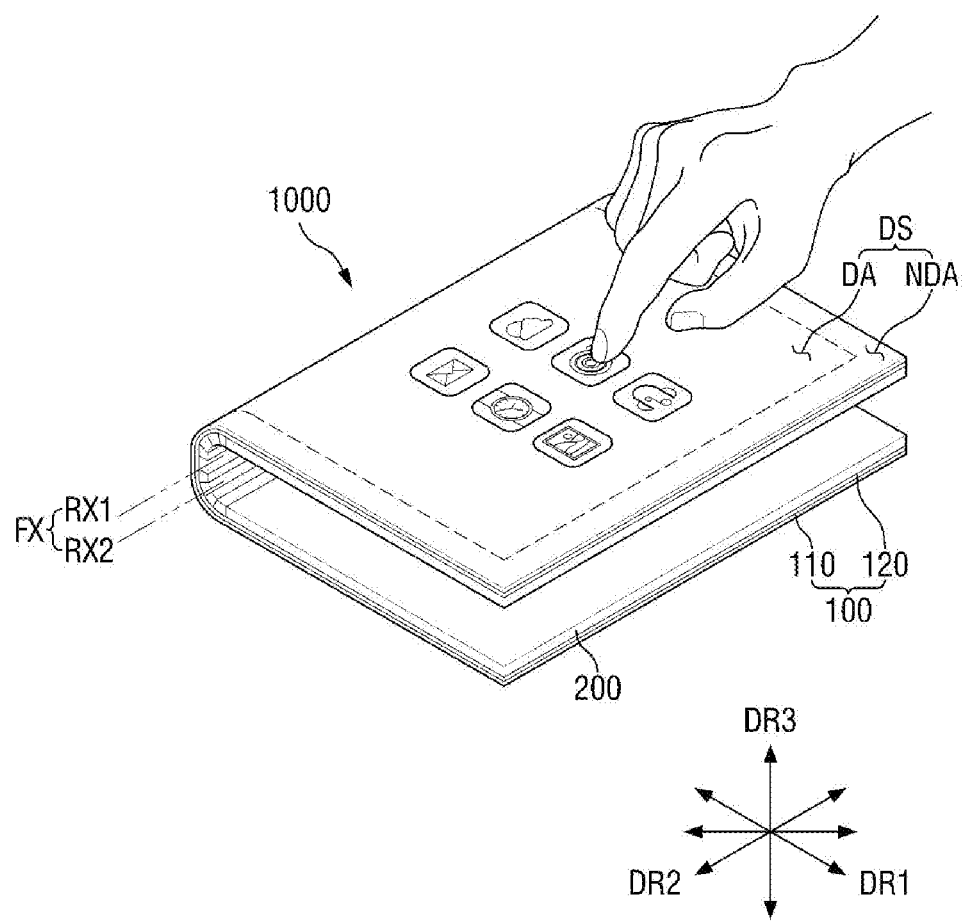
FIG. 2 is a perspective view illustrating the display device of FIG. 1 in its out-folded state.

FIG. 1 is a perspective view of an exemplary embodiment of a display device according to the invention. FIG. 2 is a perspective view illustrating the display device of FIG. 1 in its out-folded state.

Referring to FIGS. 1 and 2, a display device 1000 may have a rectangular shape having a pair of long sides extending in a first direction DR1 and a pair of short sides extending in a second direction DR2 which intersects the first direction DR1, but the invention is not limited thereto. That is, the display device 1000 may have various shapes other than the rectangular shape. The display device 1000 may be a flexible display device that may be folded or unfolded along a folding axis FX which extends in the second direction DR2.

The display device 1000 may be divided into a plurality of areas depending on whether the display device 1000 is folded or unfolded. In an exemplary embodiment, the display device 1000 may be divided into a folding area FA in which the display device 1000 may be folded and two non-folding areas NFA which are flat, for example. The two non-folding areas NFA are arranged in the first direction DR1, and the folding area FA is disposed between the two non-folding areas NFA. In the exemplary embodiment of FIGS. 1 and 2, a single folding area FA is defined in the display device 1000, but the invention is not limited thereto. In an alternative exemplary embodiment, multiple folding areas FA may be defined in the display device 1000.

In order to provide a double rotational axis to the display device 1000, the folding axis FX may include first and second rotational axes RX1 and RX2 which extend in the second direction DR2 and are disposed adjacent to each other. The folding area FA may overlap with the first and second rotational axes RX1 and RX2, and the display device 1000 may be folded along the first and second rotational axes RX1 and RX2.

The display device 1000 includes a display module 100 and a folding member 200 which is disposed below the display module 100. The top surface of the display module 100 may be defined as a display surface DS and may be a plane parallel to both the first and second directions DR1 and DR2. Images IM generated by the display module 100 may be provided to a user via the display surface DS.

The display surface DS includes a display area DA and a non-display area NDA which is on the periphery of the display area DA. The display area DA may display an image, and the non-display area NDA may not display an image. The non-display area NDA may surround the display area DA and may provide edge parts of the display device 1000 that are printed in a predetermined color.

The display module 100 has flexibility and includes a display panel 110 and a touch sensing unit 120 which is disposed on the display panel 110. The display panel 110 generates an image and provides the generated image to the user. In an exemplary embodiment, the display panel 110 may be one of a variety of display panels capable of displaying an image such as, for example, an organic light-emitting element display panel including organic light-emitting diodes ("OLEDs") or quantum dot-electroluminescence ("QD-EL") elements, an electrophoretic display panel, or an electrowetting display panel.

Quantum dots are a semiconductor material with a crystal structure of several nanometers in size and consist of hundreds to thousands of atoms. Since quantum dots are very small in size, they have a large surface area per unit volume, most of their atoms are provided on the surfaces of nanocrystals, and they provide a quantum confinement effect. Due to the quantum confinement effect, emission wavelengths may be controlled simply by adjusting the size of quantum dots, and excellent color purity and high photoluminescence ("PL") emission efficiency may be provided. QD-EL elements may be three-layer elements including a quantum dot emission layer and a hole transport layer ("HTL") and an electron transport layer ("ETL") which are disposed on both ends of the quantum dot emission layer.

The touch sensing unit 120 may detect external input (such as a hand of the user or a touch pen), may convert the external input into a predetermined input signal, and may provide the input signal to the display panel 110. The touch sensing unit 120 may include a plurality of touch sensors (not illustrated) for detecting the external input. The touch sensors may detect the external input in a capacitive manner. The display panel 110 may receive the input signal from the touch sensing unit 120 and may generate an image corresponding to the input signal.

The folding member 200 may support the display module 100 and may rotate with reference to the first and second rotational axes RX1 and RX2 to be folded. As the folding member 200 is folded, the display module 100, which has flexibility, may also be folded along with the folding member 200. The folding member 200 may out-fold the display device 1000 such that the display surface DS of the display module 100 may be exposed.

The structure of the folding member 200 will be described later in detail with reference to FIGS. 4 and 5. A direction that intersects the plane parallel to the first and second directions DR1 and DR2 may be defined as a third direction DR3. The third direction DR3 may include an upward direction and a downward direction which is opposite to the upward direction.

Figure 3:
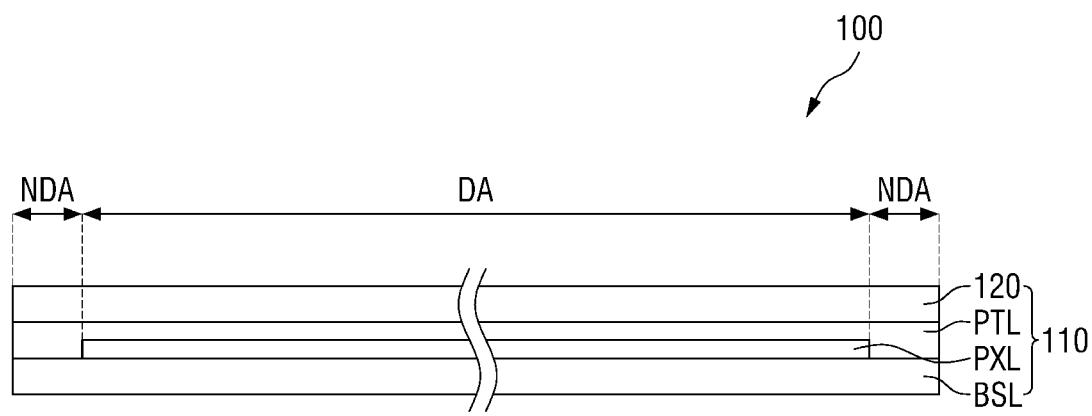
FIG. 3 is a cross-sectional view of the display device of FIG. 1.
Figure 3:
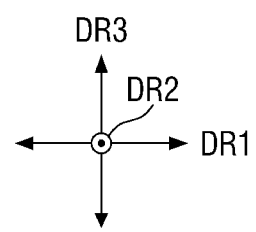

FIG. 3 is a cross-sectional view of the display device of FIG. 1.

Referring to FIG. 3, the display panel 110 includes a base layer BSL, a pixel layer PXL which is disposed on the base layer BSL, and a protective layer PTL which is disposed on the base layer BSL to cover the pixel layer PXL.

The base layer BSL defines the rear surface of the display module 100 and may have flexibility. The pixel layer PXL may include a plurality of pixels (not illustrated). The pixel layer PXL may receive electrical signals and may thus be driven to generate the images IM. The protective layer PTL may protect the pixel layer PXL, and the touch sensing unit 120 may be disposed on the protective layer PTL. The protective layer PTL may be provided as a multilayer film and may include an organic insulating film or an inorganic insulating film.

Figure 4:
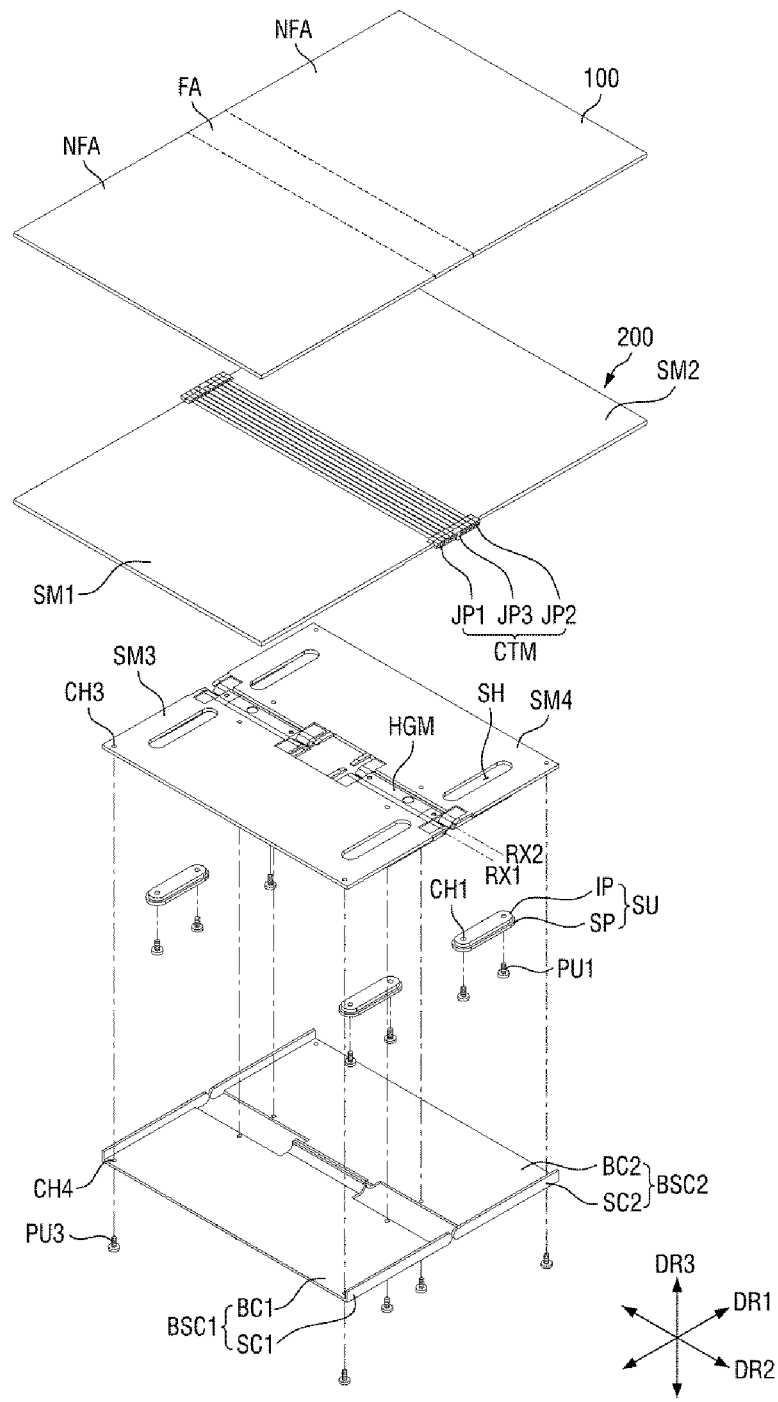
FIGS. 4 and 5 are exploded perspective view illustrating a folding member of FIG. 1.
Figure 5:
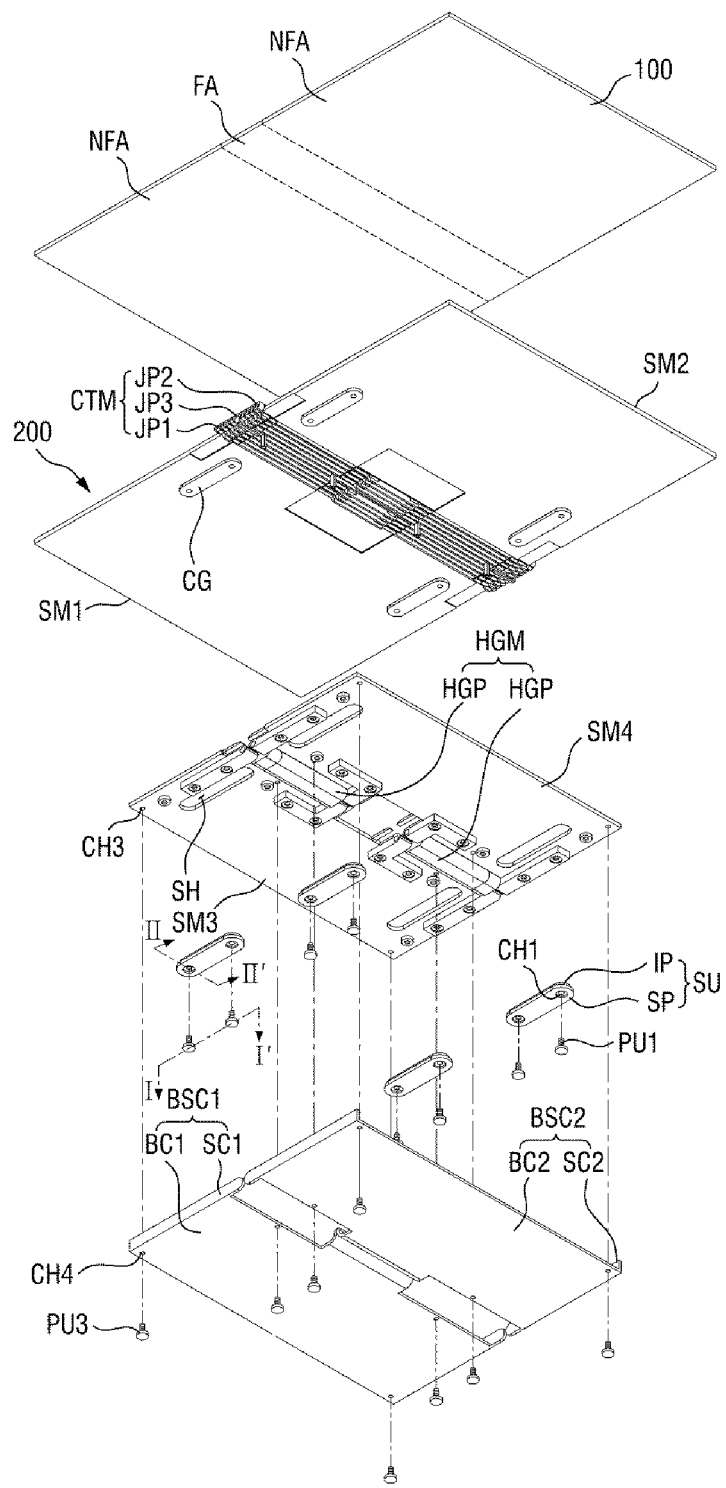

FIGS. 4 and 5 are exploded perspective view illustrating the folding member of FIG. 1.

Specifically, FIG. 4 is an exploded perspective view illustrating the top of the folding member 200, and FIG. 5 is an exploded perspective view illustrating the bottom of the folding member 200.

Referring to FIGS. 4 and 5, the folding member 200 includes a first supporting member SM1, a second supporting member SM2, a third supporting member SM3, a fourth supporting member SM4, a connecting member CTM, a hinge member HGM, a plurality of sliding units SU, a first rear cover BSC1, and a second rear cover BSC2.

The first and second supporting members SM1 and SM2 may be arranged along the first direction DR1, and the display module 100 is disposed on the first and second supporting members SM1 and SM2 and on the connecting member CTM. The connecting member CTM is disposed between the first and second supporting members SM1 and SM2 to connect first sides of the first and second supporting members SM1 and SM2 that are opposite to each other in the first direction DR1.

The first sides of the first and second supporting members SM1 and SM2 may be opposite to each other. The folding area FA of the display module 100 is disposed on the connecting member CTM, and the non-folding areas NFA of the display module 100 are disposed on the top surfaces of the first and second supporting members SM1 and SM2.

The connecting member CTM includes joint units (JP1, JP2, and JP3) which are arranged along the first direction DR1 and extend in the second direction DR2. The joint units (JP1, JP2, and JP3) are connected and rotatably coupled to the first and second supporting members SM1 and SM2.

The joint units (JP1, JP2, and JP3) include a plurality of first joint units JP1, a plurality of second joint units JP2, and a third joint unit JP3. The third joint unit JP3 is disposed between the first joint units JP1 and the second joint units JP2. The first joint units JP1 are disposed between the third joint unit JP3 and the first supporting member SM1. The second joint units JP2 are disposed between the third joint unit JP3 and the second supporting member SM2.

The first sides of the first and second supporting members SM1 and SM2 and the joint units (JP1, JP2, and JP3) are rotatably coupled to one another. The joint units (JP1, JP2, and JP3) may be arranged along at least one curved trajectory when the display device 1000 is folded. The joint units (JP1, JP2, and JP3) will be described later in detail with reference to FIGS. 12 through 25.

The term "hole", as used herein, refers to a space defined in an object by penetration, and the term "groove", as used herein, refers to a recess defined in an object to a predetermined depth.

The third and fourth supporting members SM3 and SM4 are arranged along the first direction DR1. The third supporting member SM3 is disposed below the first supporting member SM1, and the fourth supporting member SM4 is disposed below the second supporting member SM2. A plurality of sliding holes SH defined in each of the third and fourth supporting members SM3 and SM4. The sliding holes SH extend in the first direction DR1. The sliding units SU overlap one-to-one with the sliding holes SH.

The sliding units SU may be connected to the bottoms of the first and second supporting members SM1 and SM2 via the sliding holes SH. Specifically, each of the sliding units SU includes an inserting part IP which extends in the first direction DR1 to be inserted in one of the sliding holes SH and a supporting part SP which is connected to the bottom of the inserting part IP. The inserting parts IP of the sliding units SU are inserted in the sliding holes SH and are thus connected to the bottoms of the first and second supporting members SM1 and SM2.

As viewed from the third direction DR3, the supporting parts SP of the sliding units SU may be larger in size than the inserting parts IP of the sliding units SU. The width, in the second direction DR2, of the supporting parts SP of the sliding units SU may be greater than the width, in the second direction DR2, of the sliding holes SH. The length, in the first direction DR1, of the inserting parts IP of the sliding units SU may be smaller than the length, in the first direction DR1, of the sliding holes SH.

Lower protrusions LP (refer to FIG. 6) are disposed below each of the first and second supporting members SM1 and SM2. The lower protrusions LP may protrude from the bottom of the first or second supporting member SM1 or SM2 in the downward direction. The inserting parts IP of the sliding units SU are connected one-to-one to the lower protrusions LP. As viewed from the third direction DR3, the inserting parts IP of the sliding units SU may have the same size as the lower protrusions LP. The length, in the first direction DR1, of the lower protrusions LP may be smaller than the length, in the first direction DR1, of the sliding holes SH.

A plurality of first connecting holes CH1 may be defined in each of the sliding units SU, and a plurality of connecting grooves CG may be defined in each of the lower protrusions LP. The inserting parts IP of the sliding units SU and the lower protrusions LP are inserted in the sliding holes SH, and the first connecting holes CH1 overlap one-to-one with the connecting grooves CG. A plurality of first pin units PU1 is inserted in the first connecting holes CH1 and the connecting grooves CG such that the inserting parts IP of the sliding units SU and the lower protrusions LP may be connected. As a result, the sliding units SU may be connected to the bottoms of the first and second supporting members SM1 and SM2.

FIGS. 4 and 5 illustrate four sliding units SU, four lower protrusions LP, and four sliding holes SH, but the numbers of sliding units SU, lower protrusions LP, and sliding holes SH are not particularly limited.

Each of the third and fourth supporting members SM3 and SM4 may include one or more second guide parts. The second guide parts will be described later in detail with reference to FIGS. 26 through 29.

The hinge member HGM overlaps with the connecting member CTM and is disposed between the third and fourth supporting members SM3 and SM4. The hinge member HGM is connected to first sides of the third and fourth supporting members SM3 and SM4 that are opposite to each other in the first direction DR1. The hinge member HGM provides rotational axes (RX1 and RX2) to the first sides of the third and fourth supporting members SM3 and SM4. The rotational axes (RX1 and RX2) provided by the hinge member HGM include the first and second rotational axes RX1 and RX2, which are provided to the first sides of the third and fourth supporting members SM3 and SM4, respectively.

The hinge member HGM includes a plurality of hinge parts HGP which are arranged along the second direction DR2 and are disposed between the third and fourth supporting members SM3 and SM4. In an exemplary embodiment, the hinge member HGM may include two hinge parts HGP, for example, but the number of hinge parts HGP is not particularly limited. In another example, the hinge member HGM may include only one hinge part HGP or may include more than two hinge parts HGP.

The hinge parts HGP are connected to the first sides of the third and fourth supporting members SM3 and SM4 to provide the first and second rotational axes RX1 and RX2 to the first sides of the third and fourth supporting members SM3 and SM4, respectively. Each of the hinge parts HGP includes a body part BDP (refer to FIG. 9) which extends in the second direction DR2 and a plurality of sub-connecting parts SCP (refer to FIG. 9) which are disposed on opposite sides, in the second direction DR2, of the body part BDP.

The body part BDP includes a first rotation unit RU1 (refer to FIG. 9) which provides the first rotational axis RX1 and a second rotation unit RU2 (refer to FIG. 9) which provides the second rotational axis RX2. The first rotation unit RU1 extends in the second direction DR2 and rotates with reference to the first rotational axis RX1, and the second rotation unit RU2 extends in the second direction DR2 and rotates with reference to the second rotational axis RX2. In an exemplary embodiment, the first and second rotation units RU1 and RU2 may have a D shape in a cross-sectional view, but the invention is not limited thereto. That is, the shape of the first and second rotation units RU1 and RU2 is not particularly limited as long as the first and second rotation units RU1 and RU2 and the sub-connecting parts SCP may be coupled to be able to rotate together. In an exemplary embodiment, the first and second rotation units RU1 and RU2 may have a circular shape with a pair of parallel cutting lines on both sides, for example.

The sub-connecting parts SCP are connected to the first and second rotation units RU1 and RU2. Specifically, two sub-connecting parts SCP may be disposed on each of two sides of the body part BDP, a first side of one of the two sub-connecting parts SCP may be connected to the first rotation unit RU1, and a first side of the other sub-connecting part SCP may be connected to the second rotation unit RU2. The first sides of the two sub-connecting parts SCP may be opposite to each other in the first direction DR1.

The sub-connecting parts SCP extend in the first direction DR1 and are connected to the bottoms of the third and fourth supporting members SM3 and SM4, close to the first sides of the third and fourth supporting members SM3 and SM4. In an exemplary embodiment, a plurality of second pin units PU2 may be inserted in a plurality of second connecting holes CH2 which are defined in the sub-connecting parts SCP and may thus be connected to the bottoms of the third and fourth supporting members SM3 and SM4, for example.

The first rear cover BSC1 is disposed below the third supporting member SM3, and the second rear cover BSC2 is disposed below the fourth supporting member SM4. The first and second rear covers BSC1 and BSC2 are connected to the bottoms of the third and fourth supporting members SM3 and SM4 to cover the sliding units SU.

A plurality of third connecting holes CH3 is defined in each of the third and fourth supporting members SM3 and SM4, and a plurality of fourth connecting holes CH4 is defined in each of the first and second rear covers BSC1 and BSC2.

The fourth connecting holes CH4 overlap one-to-one with the third connecting holes CH3. A plurality of third pin units PU3 may be inserted in the fourth connecting holes CH4 and the third connecting holes CH3 such that the first and second rear covers BSC1 and BSC2 may be connected to the third and fourth supporting members SM3 and SM4, respectively.

The first rear cover BSC1 includes a first bottom cover BC1 and two first side covers SC1 which extend upwardly from both sides of the first bottom cover BC1 that are defined as being opposite to each other in the second direction DR2.

The second rear cover BSC2 is symmetrical with the first rear cover BSC1. The second rear cover BSC2 includes a second bottom cover BC2 which is symmetrical with the first bottom cover BC1 and second side covers SC2 which are symmetrical with the first side covers SC1.

The fourth connecting holes CH4 are defined in the first and second bottom covers BC1 and BC2. The first side covers SC1 cover opposite sides, in the second direction DR2, of the third supporting member SM3, and the second side covers SC2 cover opposite sides, in the second direction DR2, of the fourth supporting member SM4. As viewed from the second direction DR2, the first side covers SC1 and the second side covers SC2 may cover the sidewalls of each of the joint units (JP1, JP2, and JP3) and the sub-connecting parts SCP of each of the hinge parts HGP of the hinge member HGM.

Figure 6:
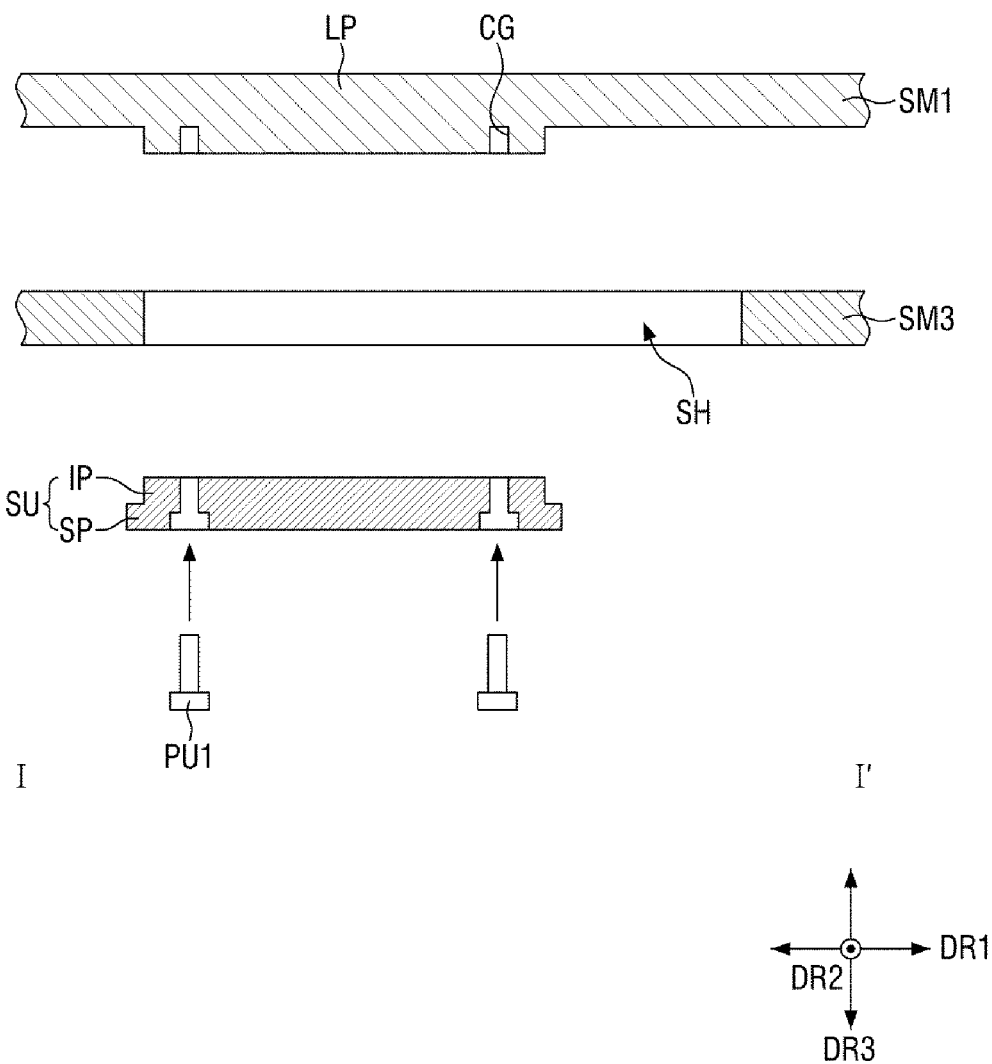
FIG. 6 is a cross-sectional view taken along line I-I' of FIG. 5.
Figure 7:
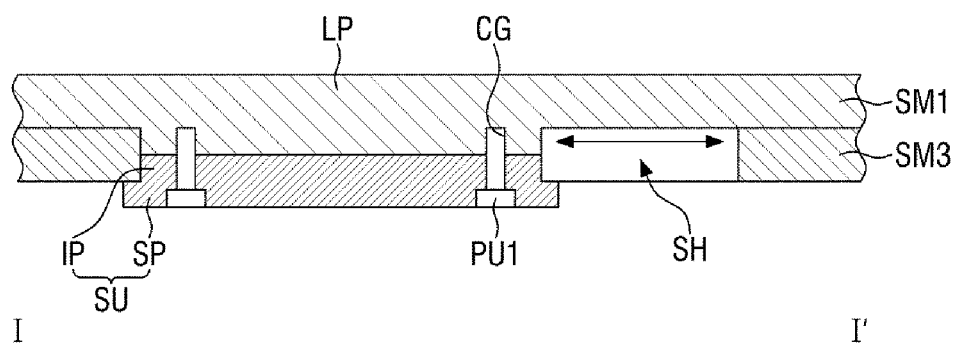
FIG. 7 is a cross-sectional view illustrating how a first supporting member and sliding units of FIG. 6 are connected.
Figure 7:
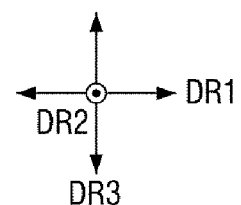
Figure 8:
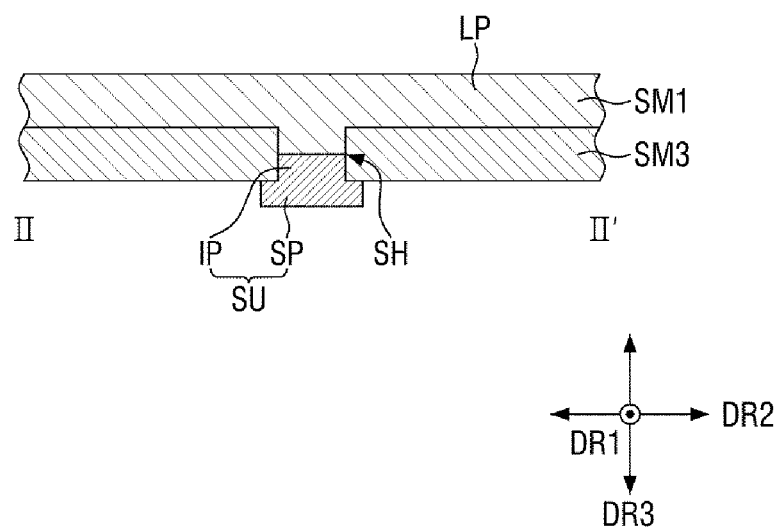
FIG. 8 is a cross-sectional view taken along line II-II' of FIG. 5.

FIG. 6 is a cross-sectional view taken along line I-I' of FIG. 5. FIG. 7 is a cross-sectional view illustrating how a first supporting member and sliding units of FIG. 6 are connected. FIG. 8 is a cross-sectional view taken along line II-II' of FIG. 5.

FIGS. 6, 7, and 8 illustrate the first supporting member SM1, the third supporting member SM3, and a single sliding unit SU to explain how the first supporting member SM1 and the sliding unit SU are connected.

Referring to FIGS. 6, 7, and 8, an inserting part IP and a lower protruding part LP are inserted in a sliding hole SH, and first connecting holes CH1 overlap with connecting grooves CG. First pin units PU1 are inserted in the first connecting holes CH1 and the connecting grooves CG so that the inserting part IP and the lower protruding part LP are connected.

Since the width, in the second direction DR2, of a supporting part SP is greater than the width, in the second direction DR2, of the sliding hole SH, the supporting part SP is not inserted in the sliding hole SH. The supporting part SP may be in contact with the bottom surface of the third supporting member SM3, adjacent to the sliding hole SH.

The length, in the first direction DR1, of the lower protruding part LP is smaller than the length, in the first direction DR1, of the sliding hole SH, and the length, in the first direction DR1, of the inserting part IP is smaller than the length, in the first direction DR1, of the sliding hole SH. Thus, when the inserting part IP is connected to the lower protruding part LP, the inserting part IP and the lower protruding part LP may reciprocate in the first direction DR1 within the sliding hole SH. As a result, the first supporting member SM1 may reciprocate in the first direction DR1 along the sliding hole SH.

The connection between a single lower protruding part LP and a single sliding unit SU has been described above, but other lower protrusions LP and other sliding units SU may also be connected in the same manner described above with reference to FIGS. 6 through 8.

Figure 9:
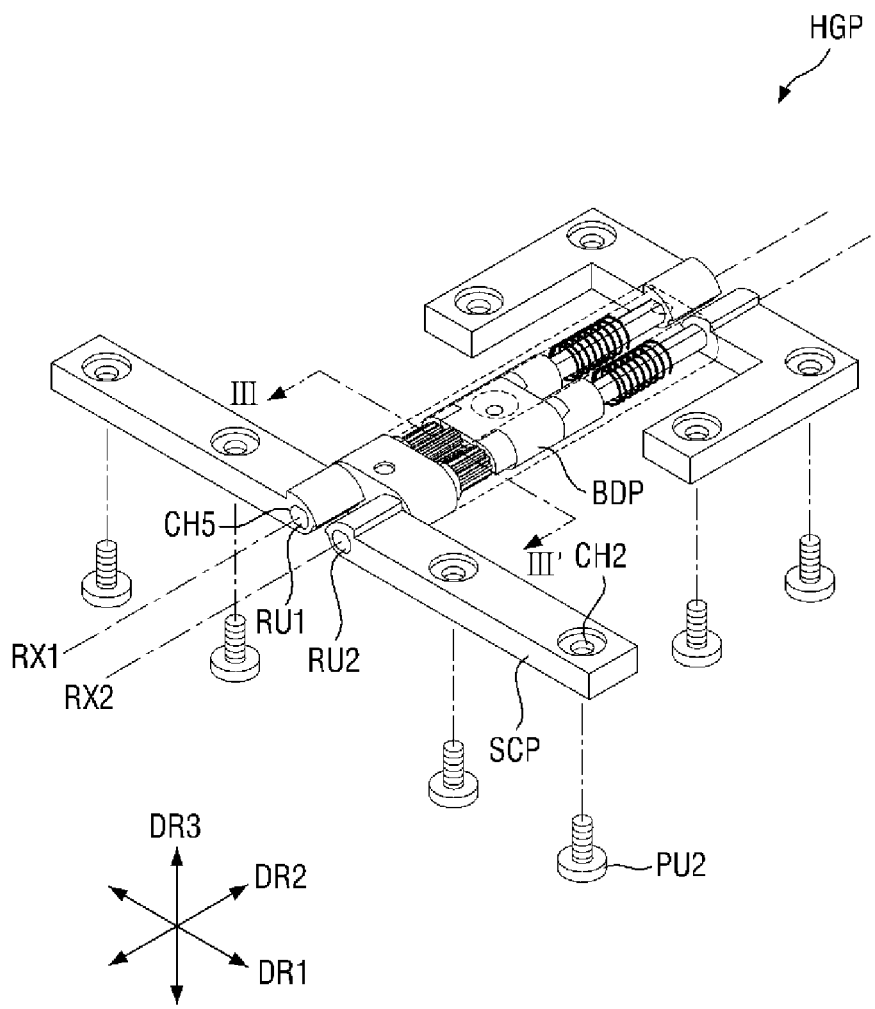
FIG. 9 is a perspective view illustrating one of hinge parts of FIGS. 4 and 5 and sub-connecting parts on one side of the corresponding hinge part.
Figure 10A:
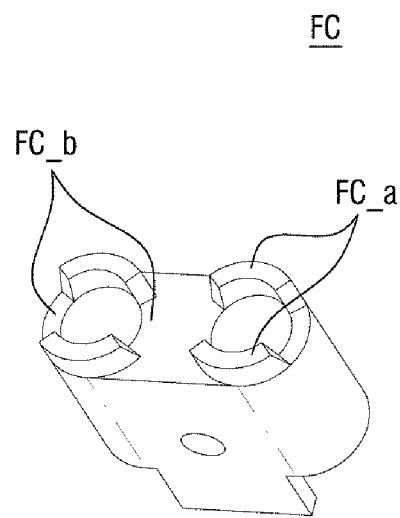
FIG. 10A is a perspective view illustrating an exemplary fixed cam.
Figure 10B:
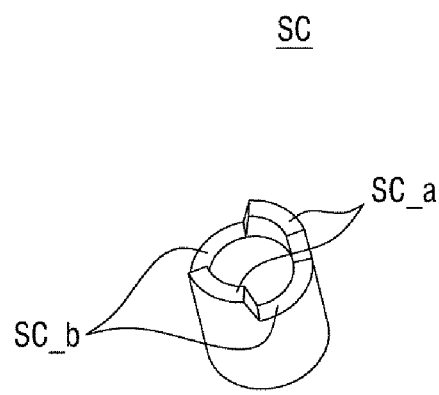
FIG. 10B is a perspective view illustrating an exemplary rotary cam.
Figure 11:
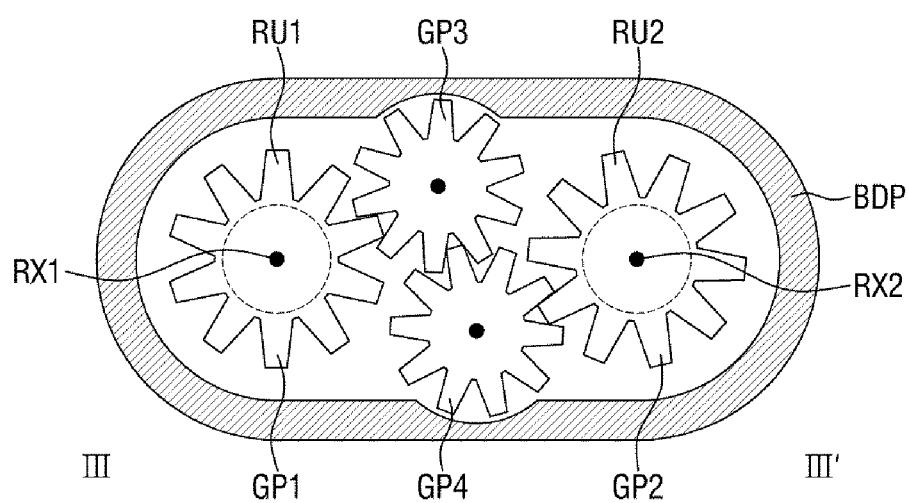
FIG. 11 is a cross-sectional view taken along line III-III' of FIG. 9.

FIG. 9 is a perspective view illustrating one of hinge parts of FIGS. 4 and 5 and sub-connecting parts on one side of the corresponding hinge part. FIG. 10A is a perspective view an exemplary fixed cam. FIG. 10B is a perspective view illustrating an exemplary rotary cam. FIG. 11 is a cross-sectional view taken along line III-III' of FIG. 9.

Referring to FIGS. 9 through 11, first and second rotation units RU1 and RU2 of a body part BDP of a hinge part HGP may extend in the second direction DR2 and may rotate with reference to the first and second rotational axes RX1 and RX2, respectively. In the body part BDP, a first gear part GP1 which provides the first rotational axis RX1, a second gear part GP2 which provides the second rotational axis RX2, and third and fourth gear parts GP3 and GP4 which are disposed between the first and second gear parts GP1 and GP2 are disposed.

Referring to FIGS. 9, 10A, and 10B, a fixed cam FC is fixed, on a first side thereof, to the body part BDP and includes, on a second side thereof, mountain-shaped parts FC_a which are disposed on upper and lower parts of the second side and valley-shaped parts FC_b which are disposed on left and right parts of the second side. The rotary cam SC forms valley-shaped parts SC_b which engage with the mountain-shaped parts FC_a of the fixed cam FC to be in sliding surface contact with the mountain-shaped parts FC_a of the fixed cam FC. Thus, mountain-shaped parts SC_a are disposed on both sides of the array of the valley-shaped parts SC_b. An elastic member is installed at one side of the rotary cam SC to firmly attach the fixed cam FC and the rotary cam SC together. In an exemplary embodiment, the elastic member may be, for example, a compressed coil spring.

While the folding member 200 is being folded, the mountain-shaped parts FC_a of the rotary cam SC rotate toward the highest points of the mountain-shaped parts FC_a of the fixed cam FC, and the rotary cam SC moves in a first direction. As the mountain-shaped parts SC_a of the rotary cam SC pass by the highest points of the mountain-shaped parts FC_a of the fixed cam FC, the rotary cam SC moves in a second direction and rotates due to the force from the elastic member, and as a result, the folding member 200 may be automatically folded without the need to apply a force.

As illustrated in FIG. 11, the first, second, third, and fourth gear parts GP1, GP2, GP3, and GP4, like the first and second rotation units RU1 and RU2, extend in the second direction DR2. As viewed from the second direction DR2, the outer circumferences of the first, second, third, and fourth gear parts GP1, GP2, GP3, and GP4 are gear-shaped, and the first, second, third, and fourth gear parts GP1, GP2, GP3, and GP4 engage with one another.

The first gear part GP1 is disposed on the same line as the first rotation unit RU1 and is connected to the first rotation unit RU1. The first rotational axis RX1 may form the central axis of the first rotation unit RU1 and the first gear unit GP1 that extend substantially in the second direction DR2. The second gear part GP2 is disposed on the same line as the second rotation unit RU2 and is connected to the second rotation unit RU2. The second rotation axis RX2 may form the central axis of the second rotation unit RU2 and the second gear part GP2 that extend substantially in the second direction DR2.

Fifth connection holes CH5 which extend in the second direction DR2 are defined at one side of each of the sub-connecting parts SCP. The first and second rotation units RU1 and RU2 are inserted in the fifth connection holes CH5 of the sub-connecting parts SCP so that the sub-connecting parts SCP are connected to the first and second rotation units RU1 and RU2. The first rotation unit RU1 and the first gear part GP1 rotate with reference to the first rotational axis RX1, and the second rotation unit RU2 and the second gear part GP2 rotate with reference to the second rotational axis RX2.

The third and fourth gear parts GP3 and GP4, which are disposed between the first and second gear parts GP1 and GP2, may be idle gears which perform two-axis rotation control by connecting two gears. That is, the third and fourth gear parts GP3 and GP4 engage with the first and second gear parts GP1 and GP2 and may thus allow the first and second gear parts GP1 and GP2 to rotate simultaneously, rather than independently. Accordingly, the third and fourth supporting members SM3 and SM4, which are connected to the first and second gear parts GP1 and GP2, respectively, may be folded and unfolded symmetrically.

Figure 12:
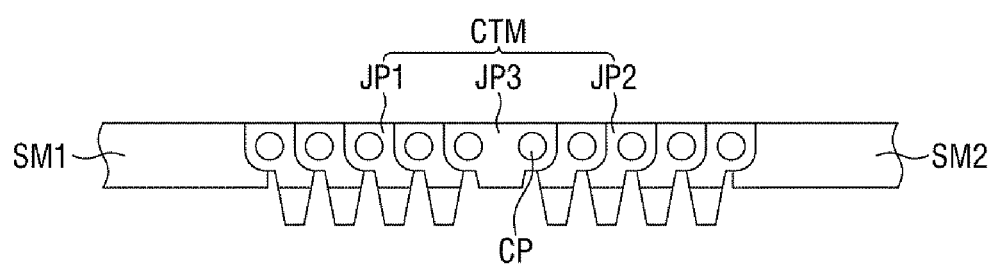
FIG. 12 is a side view illustrating joint units of FIGS. 4 and 5 as viewed from a second direction.
Figure 13:
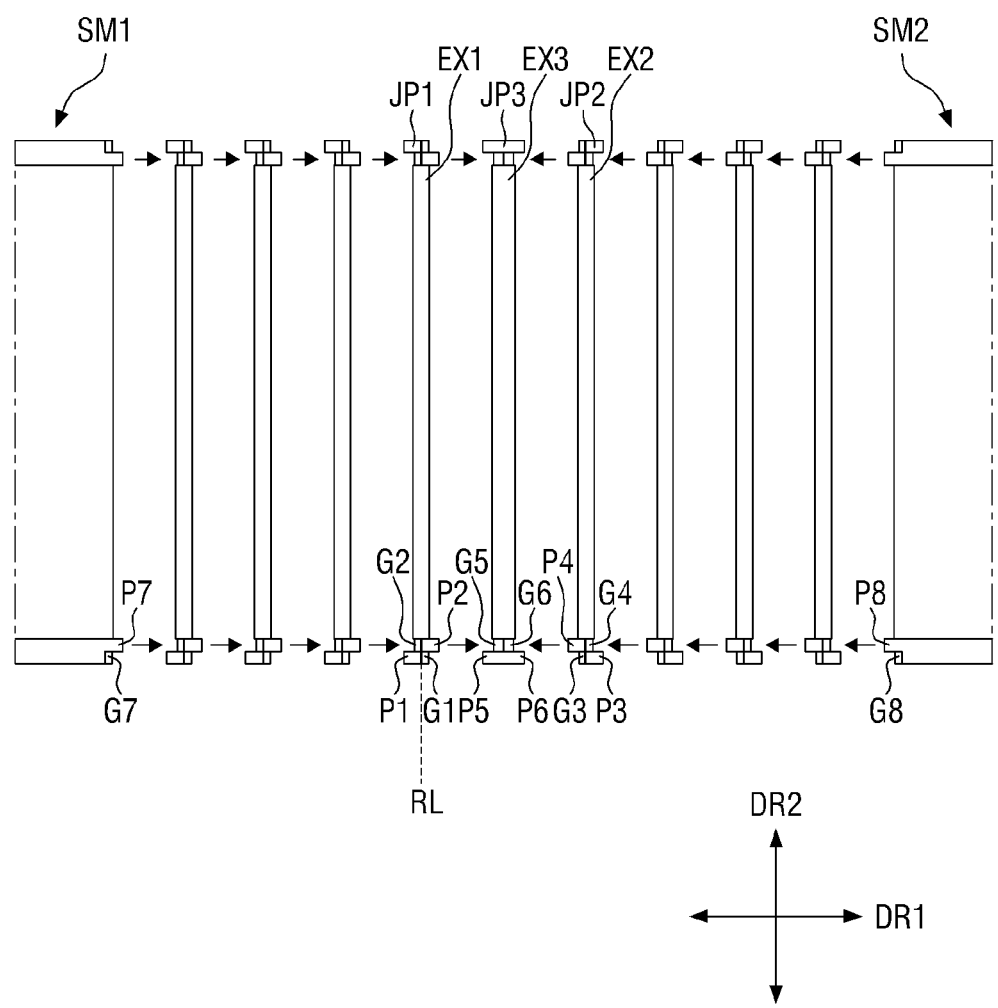
FIG. 13 is an exploded top view illustrating first joint units, second joint units, a third joint unit, and the first and second supporting members of FIGS. 4 and 5.
Figure 14:
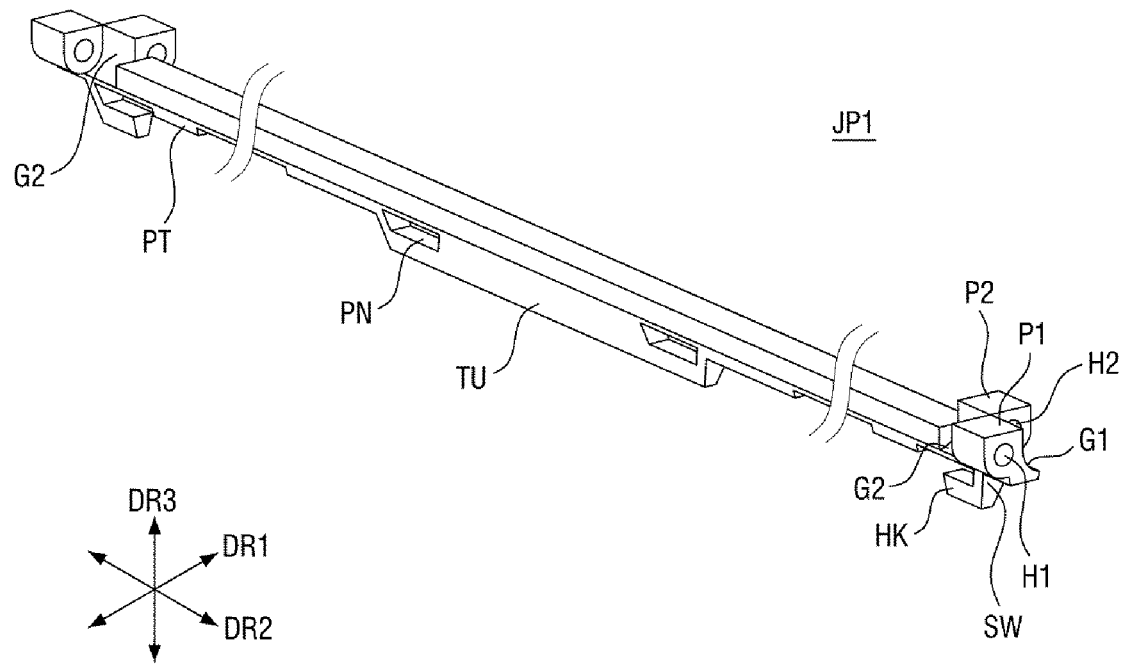
FIG. 14 is a perspective view illustrating one of the first joint units of FIG. 13.
Figure 15:
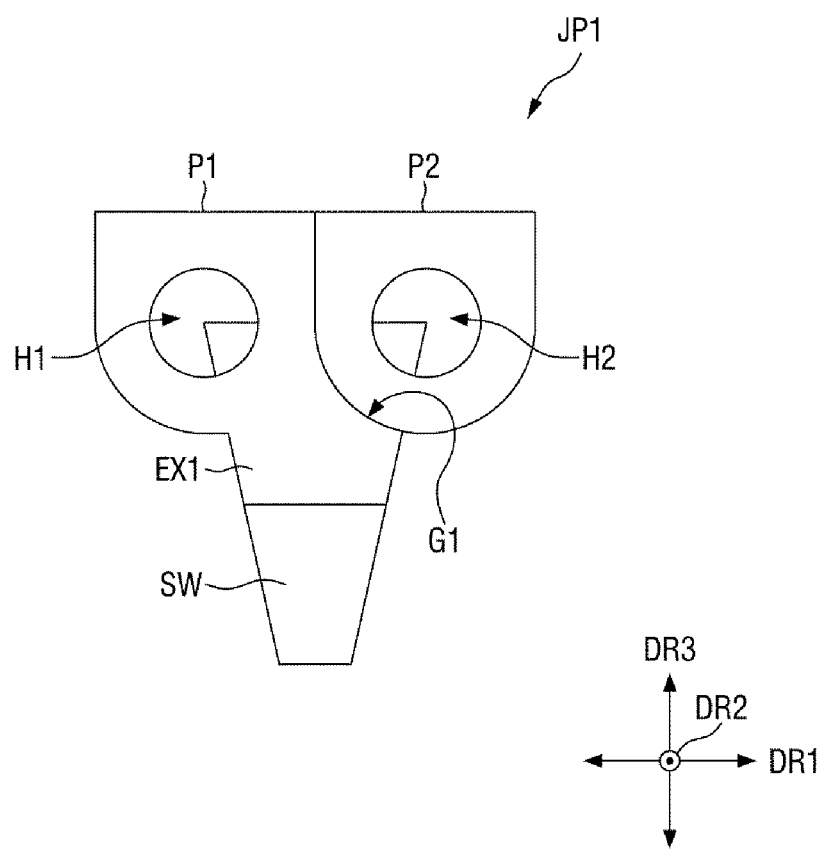
FIG. 15 is a side view illustrating the first joint unit of FIG. 14 as viewed from the second direction.
Figure 16:
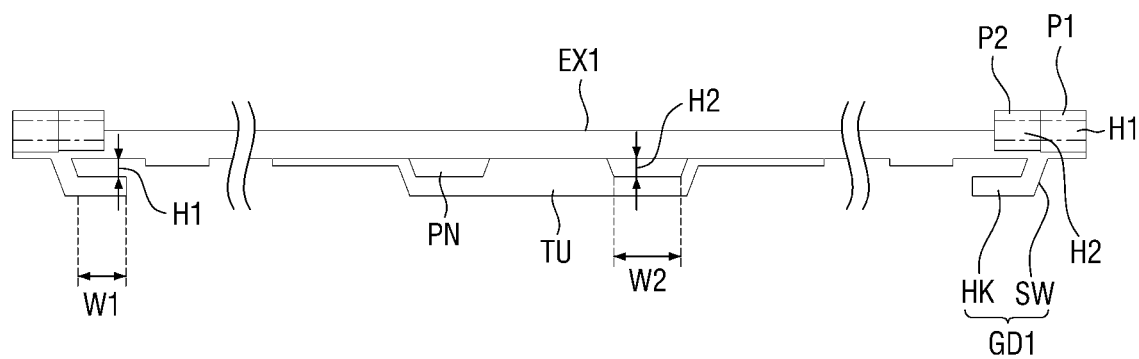
FIG. 16 is a front view illustrating the first joint unit of FIG. 14 as viewed from a first direction.
Figure 17:
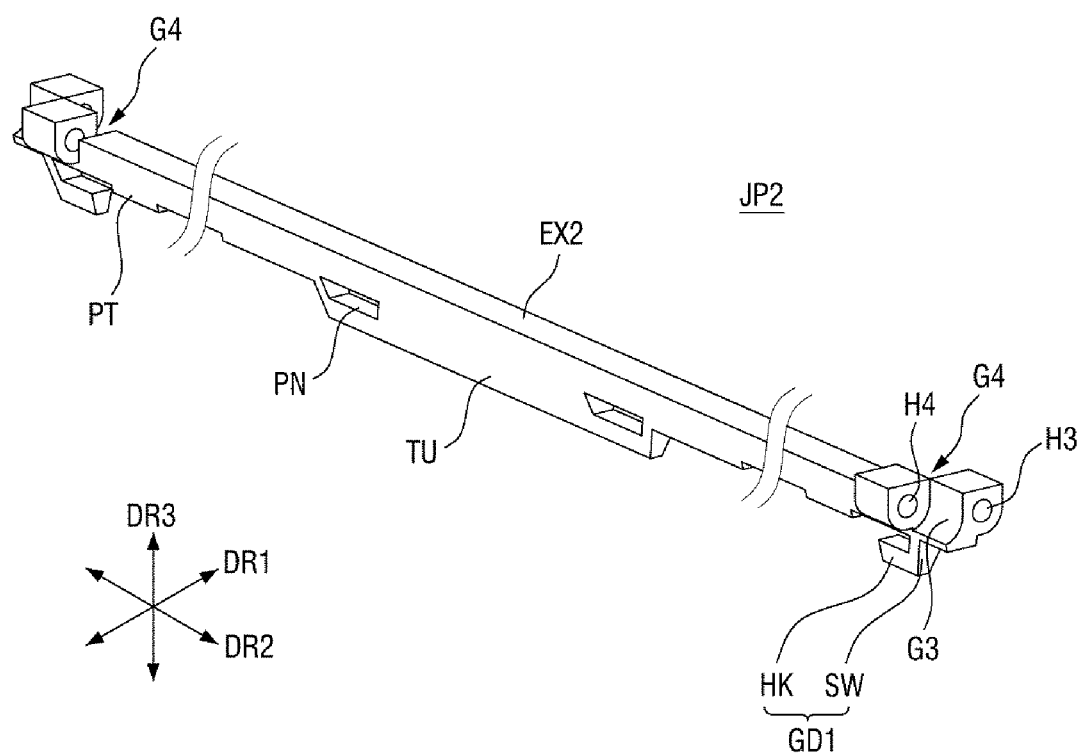
FIG. 17 is a perspective view illustrating one of the second joint units of FIG. 13.

FIG. 12 is a side view illustrating the joint units of FIGS. 4 and 5 as viewed from the second direction. FIG. 13 is an exploded top view illustrating the first joint units, the second joint units, the third joint unit, and the first and second supporting members of FIGS. 4 and 5. FIG. 14 is a perspective view illustrating one of the first joint units of FIG. 13. FIG. 15 is a side view illustrating the first joint unit of FIG. 14 as viewed from the second direction. FIG. 16 is a front view illustrating the first joint unit of FIG. 14 as viewed from the first direction. FIG. 17 is a perspective view illustrating one of the second joint units of FIG. 13.

Referring to FIGS. 12 and 13, the joint units (JP1, JP2, and JP3), the first side of the first supporting member SM1, a first joint unit JP1 adjacent to the first supporting member SM1, the first side of the second supporting member SM2, and a second joint unit JP2 adjacent to the second supporting member SM2 may be rotatably coupled to one another.

Each of the joint units (JP1, JP2, and JP3) includes a first, second, or third extension EX1, EX2, or EX3 and first and second protrusions P1 and P2, third and fourth protrusions P3 and P4, or fifth and sixth protrusions P5 and P6 disposed at each of both ends of the first, second, or third extension EX1, EX2, or EX3 to be projected in the first direction DR1. As viewed from the second direction DR2, the first and second protrusions P1 and P2 may protrude in opposite directions, the third and fourth protrusions P3 and P4 may protrude in opposite directions, and the fifth and sixth protrusions P5 and P6 may protrude in opposite directions. As viewed from the first direction DR1, the first and second protrusions P1 and P2 may be alternately arranged not to overlap, and the third and fourth protrusions P3 and P4 may be alternately arranged not to overlap. In each pair of adjacent joint units, protrusions from different joint units may be coupled to each other to be able to rotate while overlapping with each other.

The structure of the protrusions of each of the joint units (JP1, JP2, and JP3), the structure of first guide parts GD1, and the connection structure of the joint units (JP1, JP2, and JP3) will hereinafter be described.

The number of joint units (JP1, JP2, and JP3) may be an odd number, the number of first joint units JP1 and the number of second joint units JP2 may be even numbers, and the number of third joint units JP3 may be an odd number. The structure of the first joint units JP1 and the structure of the second joint units JP2 may be symmetrical with each other.

The joint units (JP1, JP2, and JP3) are rotatably coupled by a plurality of coupling pins CP. The first side of the first supporting member SM1 and the first joint unit JP1 adjacent to the first supporting member SM1 are rotatably coupled by the coupling pins CP. Also, the first side of the second supporting member SM2 and the second joint unit JP2 adjacent to the second supporting member SM2 are rotatably coupled by the coupling pins CP.

Referring to FIG. 13, each of the first joint units JP1 includes a first extension EX1, a plurality of first protrusions P1, and a plurality of second protrusions P2. A plurality of first grooves G1 and a plurality of second grooves G2 are defined in the first extension EX1.

The first extension EX1 extends in the second direction DR2 and is in the shape of an inverted trapezoid as viewed from the second direction DR2. In the description that follows, both sides of the first extension EX1 are defined as first and second sides of the first extension EX1 that are opposite to each other. The first direction DR1 may include a leftward direction and a rightward direction, which is opposite to the leftward direction.

The first protrusions P1 are disposed at each of both ends of the first extension EX1 to be projected in the first direction DR1. The second protrusions P2 are disposed adjacent to the first protrusions P1 to be projected in the first direction DR1. The first protrusions P1 and the second protrusions P2 protrude in opposite directions. In an exemplary embodiment, the first protrusions P1 may protrude in the leftward direction, and the second protrusions P2 may protrude in the rightward direction, for example.

An imaginary line extending from the center of the first extension EX1 in the second direction DR2 may be defined as a reference line RL. The first protrusions P1 may be projected in the leftward direction from the reference line RL, and the second protrusions P2 may be projected in the rightward direction from the reference line RL.

Referring to FIGS. 14 through 16, as viewed from the second direction DR2, the first protrusions P1 and the second protrusions P2 may be symmetrical. As viewed from the first direction DR1, the first protrusions P1 and the second protrusions P2 may be alternately arranged not to overlap. As viewed from the first direction DR1, the second protrusions P2 may be disposed on the inside of the first protrusions P1 with respect to the first extension EX1, but the invention is not limited thereto. In an alternative exemplary embodiment, the first protrusions P1 may be disposed on the inside of the second protrusions P2 with respect to the first extension EX1.

In an exemplary embodiment, one first protrusion P1 and one second protrusion P2 may be alternately arranged at each of two sides of the first extension EX1, for example, but the invention is not limited thereto. In another example, multiple first protrusions P1 and multiple second protrusions P2 may be alternately arranged at each of the two sides of the first extension EX1.

As viewed from the second direction DR2, the first extension EX1 is in the shape of an inverted trapezoid having an upper side which is parallel to the first direction DR1, a lower side which is parallel to the first direction DR1 and is longer than the upper side, and two lateral sides which connect the upper and lower sides.

As viewed from the second direction DR2, the first protrusions P1 and the second protrusions P2 protrude beyond the upper side of the first extension EX1. As viewed from the second direction DR2, the first protrusions P1 protrude beyond the left side of the first extension EX1 in the leftward direction, and the second protrusions P2 protrude beyond the right side of the first extension EX1 in the rightward direction.

The first extension EX1 includes a top surface which extends from the upper side of the inverted trapezoidal shape of the first extension EX1 in the second direction DR2, a bottom surface which extends from the lower side of the first extension EX1 in the second direction DR2, and side surfaces which extend from the two lateral sides of the first extension EX1 in the first direction DR1. The side surface on the left of the first extension EX1 may be defined as a left-side surface, and the side surface on the right of the first extension EX1 may be defined as a right-side surface.

The first grooves G1 are defined in the first extension EX1 on the right sides of the first protrusions P1, and the second grooves G2 are defined in the first extension EX1 on the left sides of the second protrusions P2. The first grooves G1 may be defined as recesses from parts of the top surface and right-side surface of the first extension EX1 that are on the right sides of the first protrusions P1. The second grooves G2 may be defined as recesses from parts of the top surface and left-side surface of the first extension EX1 that are on the left sides of the second protrusions P2. Parts of the first extension EX1 that define the first grooves G1 and the second grooves G2 may be concavely curved.

First holes H1 which are cylindrical in shape and extend in the second direction DR2 are defined in the first protrusions P1, and second holes H2 which are cylindrical in shape and extend in the second direction DR2 are defined in the second protrusions P2. As viewed from the second direction DR2, a vertex connecting the upper side and the left side of the first extension EX1 may overlap with the center of each of the first holes H1, and a vertex connecting the upper side and the right side of the first extension EX1 may overlap with the center of each of the second holes H2.

Referring back to FIGS. 13 through 16, each of the first joint units JP1 further includes one or more first guide parts GD1 which extend from the bottom surface of the first extension EX1 in the third direction DR3. The first guide parts GD1 guide second guide parts GD2 (refer to FIGS. 24 to 26), which are included in each of the third and fourth supporting members SM3 and SM4, to be folded along a predetermined curved trajectory.

The first guide parts GD1 include sidewalls SW which extend from the bottom surface of the first extension EX1, at each of both ends of the first extension EX1, in the third direction DR3 and hooks HK which extend from the sidewalls SW in the second direction DR2.

As viewed from the first direction DR1, outer sides of the sidewalls SW may have a predetermined slope with respect to the bottom surface of the respective first joint unit JP1 and may extend slantingly in the third direction DR3, and inner sides of the sidewalls SW may extend perpendicularly from the bottom surface of the respective first joint unit JP1 in the third direction DR3. However, the invention is not limited to this. In an alternative exemplary embodiment, the outer sides and inner sides of the sidewalls SW may be parallel and may extend either slantingly or perpendicularly from the bottom surface of the respective first joint unit JP1 in the third direction DR3.

The hooks HK may extend from the sidewalls SW in the second direction DR2. Upper sides of the hooks HK may be parallel to the upper side of the first extension EX1. The top surfaces of the hooks HK may be in contact with the second guide parts GD2, which are included in each of the third and fourth supporting members SM3 and SM4, and may be flat or curved for smooth sliding of the second guide parts GD2.

As viewed from the second direction DR2, the hooks HK may be in the shape of a rectangle, an inverted trapezoid, a circle, or a semicircle. The flatter the top surfaces of the hooks HK are, the more firmly the hooks HK may support the second guide parts GD2, and the more curved the top surfaces of the hooks HK are, the more smoothly the second guide parts GD2 may slide.

Each of the first joint units JP1 further includes protrusions PT which extend from the bottom surface of the first extension EX1, at each of both ends of the first extension EX1, in the third direction DR3. The protrusions PT may be a predetermined distance apart from the hooks HK. In this case, as viewed from the first direction DR1, the protrusions PT may substantially form rectangular holes. As a result, shakes in the second guide parts GD2 during the sliding of the second guide parts GD2 along the hooks HK may be prevented.

Each of the first joint units JP1 may further include a tunnel unit TU which extends from the bottom surface of the first extension EX1, in the middle of the first extension EX1, in the third direction DR3.

As viewed from the first direction DR1, the tunnel unit TU may be in the shape of an inverted trapezoid, but the invention is not limited thereto. In an alternative exemplary embodiment, as viewed from the first direction DR1, the tunnel unit TU may be in the shape of a rectangle or an ellipse. The thickness, in the first direction DR1, of the tunnel unit TU may be substantially the same as the thickness, in the first direction DR1, of the first extension EX1.

One or more penetrations PN may be defined in the tunnel unit TU. The penetrations PN are holes that penetrate both sides of the tunnel unit TU in the first direction DR1 and are passages that guide arms GA of the second guide parts GD2 slide along. The top surfaces and the bottom surfaces of the penetrations PN may be substantially parallel to the top surface of the first extension EX1.

Two penetrations PN may be disposed, one at each of two sides of the tunnel unit TU, symmetrically, but the invention is not limited thereto. The number and locations of penetrations PN may vary depending on the size of the third and fourth supporting members SM3 and SM4. The penetrations PN may be in the shape of rectangles, inverted trapezoids, or rectangles with semicircular shapes on both sides in a cross-sectional view.

A height HT1 from the top surfaces of the hooks HK to the bottom surface of the first extension EX1 may be the same as a height HT2 from the bottom surfaces of the penetrations PN to the top surfaces of the penetrations PN. A width W1, in the second direction DR2, of the hooks HK may be the same as a width W2, in the second direction DR2, of the penetrations PN. That is, the size of rectangular openings defined by the sidewalls SW, the hooks HK, and the protrusions PT may be the same as the size of the penetrations PN defined in the tunnel unit TU, but the invention is not limited thereto. In an alternative exemplary embodiment, the size of the rectangular openings defined by the sidewalls SW, the hooks HK, and the protrusions PT may differ from the size of the penetrations PN defined in the tunnel unit TU depending on the shape of the second guide parts GD2.

Referring to FIGS. 13 and 17, the second joint units JP2 have substantially the same structure as the first joint units JP1 and are disposed symmetrically with the first joint units JP1. That is, when the second joint units JP2 are rotated 180 degrees, the structure of the second joint units JP2 become the same as the structure of the first joint units JP1. Each of the second joint units JP2 includes a second extension EX2 which is symmetrical with the first extension EX1, a plurality of third protrusions P3 which are symmetrical with the first protrusions P1, and a plurality of fourth protrusions P4 which are symmetrical with the second protrusions P2.

The second extension EX2 has substantially the same structure as the first extension EX1. In the second extension EX2, a plurality of third grooves G3 which are symmetrical with the first grooves G1 and a plurality of fourth grooves G4 which are symmetrical with the second grooves G2 are defined. In the third protrusions P3, a plurality of third holes H3 which are symmetrical with the first holes H1 are defined, and in the fourth protrusions P4, a plurality of fourth holes H4 which are symmetrical with the second holes H2 are defined.

Figure 18:
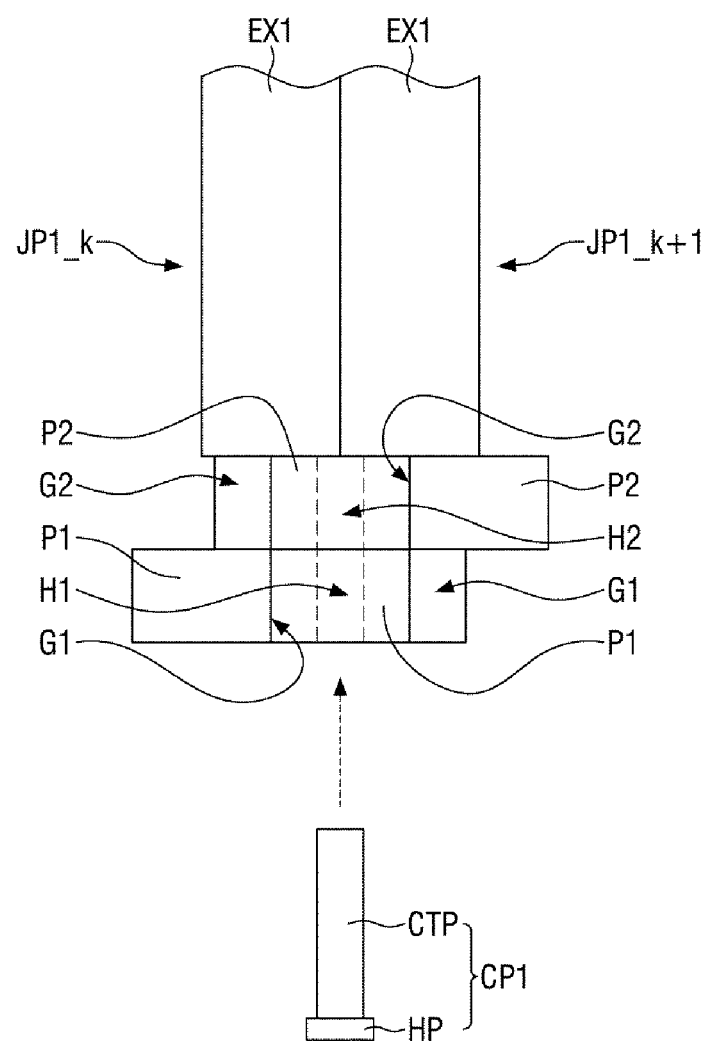
FIG. 18 illustrates how each pair of adjacent first joint units of FIG. 13 is connected.
Figure 19:
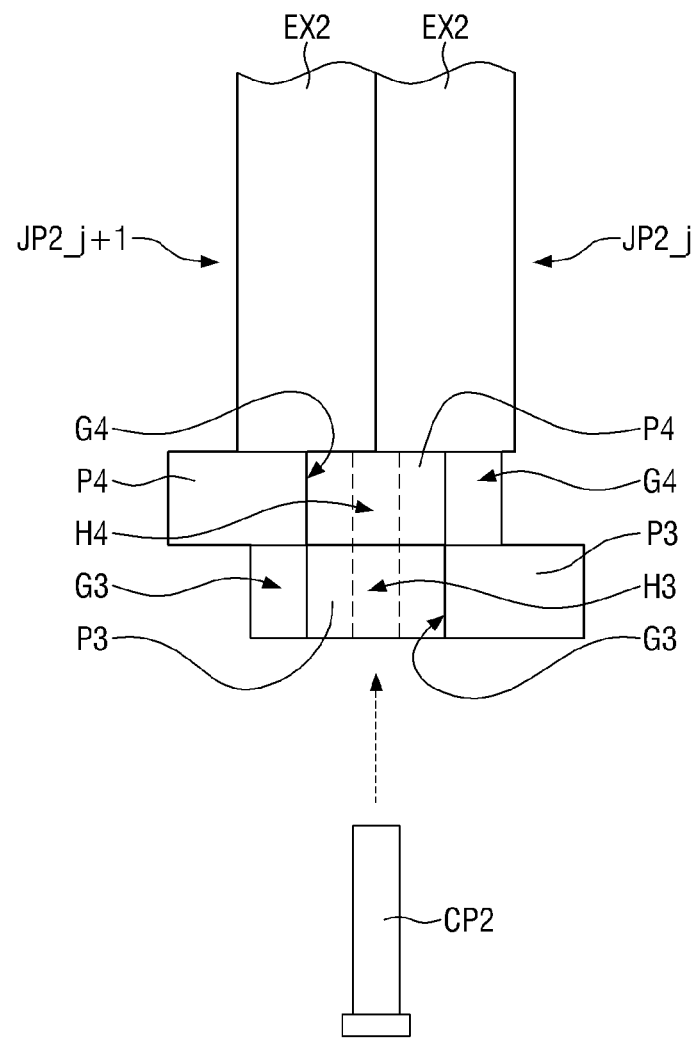
FIG. 19 illustrates how each pair of adjacent second joint units of FIG. 13 is connected.

FIG. 18 illustrates how each pair of adjacent first joint units of FIG. 13 are connected. FIG. 19 illustrates how each pair of adjacent second joint units of FIG. 13 are connected.

For convenience, FIGS. 18 and 19 illustrate parts of two first joint units JP1 or parts of two second joint units JP2.

Referring to FIG. 18, a (k+1)-th first joint unit JP1_$k$+1 may be disposed on the right side of a k-th first joint unit JP1_$k$. Second protrusions P2 of the k-th first joint unit JP1_$k$ are disposed in second grooves G2 of the (k+1)-th first joint unit JP1_$k$+1, and first protrusions P1 of the (k+1)-th first joint unit JP1_$k$+1 are disposed in first grooves of the k-th first joint unit JP1_$k$.

Accordingly, the first protrusions P1 of the (k+1)-th first joint unit JP1_$k$+1 overlap with the second protrusions P2 of the k-th first joint unit JP1_$k$. Second holes H2 defined in the second protrusions P2 of the k-th first joint unit JP1_$k$ overlap with first holes H1 defined in the first protrusions P1 of the (k+1)-th first joint unit JP1_$k$+1. Referring to FIG. 13, in order to be placed in first grooves G1 and second grooves G2, the first protrusions P1 and the second protrusions may be convexly curved to correspond to parts of first extensions EX1 that are concavely curved to define the first grooves G1 and the second grooves G2.

Referring back to FIG. 18, first coupling pins CP1 which are coupling pins CP for coupling the k-th and (k+1)-th first joint units JP1_$k$ and JP1_$k$+1 are inserted in the first holes H1 of the first protrusions P1 of the (k+1)-th first joint unit JP1_$k$+1 and in the second holes H2 of the second protrusions P2 of the k-th first joint unit JP1_$k$. For convenience, FIG. 18 illustrates only one first coupling pin CP1, but two first coupling pins CP1 may actually be provided at both ends of each of the k-th and (k+1)-th first joint units JP1_$k$ and JP1_$k$+1. The first coupling pins CP1 are connected to the second protrusions P2 of the k-th first joint unit JP1_$k$.

As viewed from the second direction DR2, each of the first coupling pins CP1 includes a head part HP which is larger than the first holes H1 of the (k+1)-th first joint unit JP1_$k$+1 and the second holes H2 of the k-th first joint unit JP1_$k$ and a coupling part CTP which extends from the head part HP in the second direction DR2. Other coupling pins CP have the same structure as the first coupling pins CP1. The coupling parts CTP of the first coupling pins CP1 may be cylindrical in shape.

The coupling parts CTP of the first coupling pins CP1 are inserted in the first holes H1 of the (k+1)-th first joint unit JP1_$k$+1 and in the second holes H2 of the k-th first joint unit JP1_$k$, which overlaps with the (k+1)-th first joint unit JP1_$k$+1, and are thus connected to the second protrusions P2 of the k-th first joint unit JP1_$k$. The coupling parts CTP of the first coupling pins CP1 are not connected to the first protrusions P1 of the (k+1)-th first joint unit JP1_$k$+1.

In an exemplary embodiment, the coupling parts CTP of the first coupling pins CP1 and the inner sides of the second protrusions P2 of the k-th first joint unit JP1_$k$ that define the second holes H2 may be in the shape of bolts and nuts and may be coupled together, for example. The head parts HP of the first coupling pins CP1 are not inserted in the first holes H1 of the (k+1)-th first joint unit JP1_$k$+1, but are in contact with the sides of the first protrusions P1 of the (k+1)-th first joint unit JP_$k$+1.

Since the first coupling pins CP1 are not connected to the first protrusions P1 of the (k+1)-th first joint unit JP1_$k$+1, but connected to the second protrusions P2 of the k-th first joint unit JP1_k, the k-th and (k+1)-th first joint units JP1_k and JP1_k+1 may rotate together with reference to the first coupling pins CP1.

Referring to FIG. 19, the second joint units JP2 are connected substantially in the same manner as the first joint units JP1. In an exemplary embodiment, a (j+1)-th second joint unit JP2_j+1 is disposed on the left side of a j-th second joint unit JP2_j, and fourth protrusions P4 of the j-th second joint unit JP2_j are disposed in fourth grooves G4 of the (j+1)-th second joint unit JP2_j+1, for example. Third protrusions P3 of the (j+1)-th second joint unit JP2_j+1 are disposed in third grooves G3 of the j-th second joint unit JP2_j.

Accordingly, the third protrusions P3 of the (j+1)-th second joint unit JP2_j+1 overlap with the fourth protrusions P4 of the j-th second joint unit JP2_j. Third holes H3 defined in the third protrusions P3 of the (j+1)-th second joint unit JP2_j+1 overlap with fourth holes H4 defined in the fourth protrusions P4 of the j-th second joint unit JP2_j.

Second coupling pins CP2 which are coupling pins CP for coupling the j-th and (j+1)-th second joint units JP2_j and JP2_j+1 are inserted in the third holes H3 of the third protrusions P3 of the (j+1)-th second joint unit JP2_j+1 and in the fourth holes H4 of the fourth protrusions P4 of the j-th second joint unit JP2_j, which overlaps with the (j+1)-th second joint unit JP2_j+1, and are thus connected to the fourth protrusions P4 of the j-th second joint unit JP2_j. Thus, the j-th and (j+1)-th second joint units JP2_j and JP2_j+1 may rotate together with reference to the second coupling pins CP2.

Figure 20:
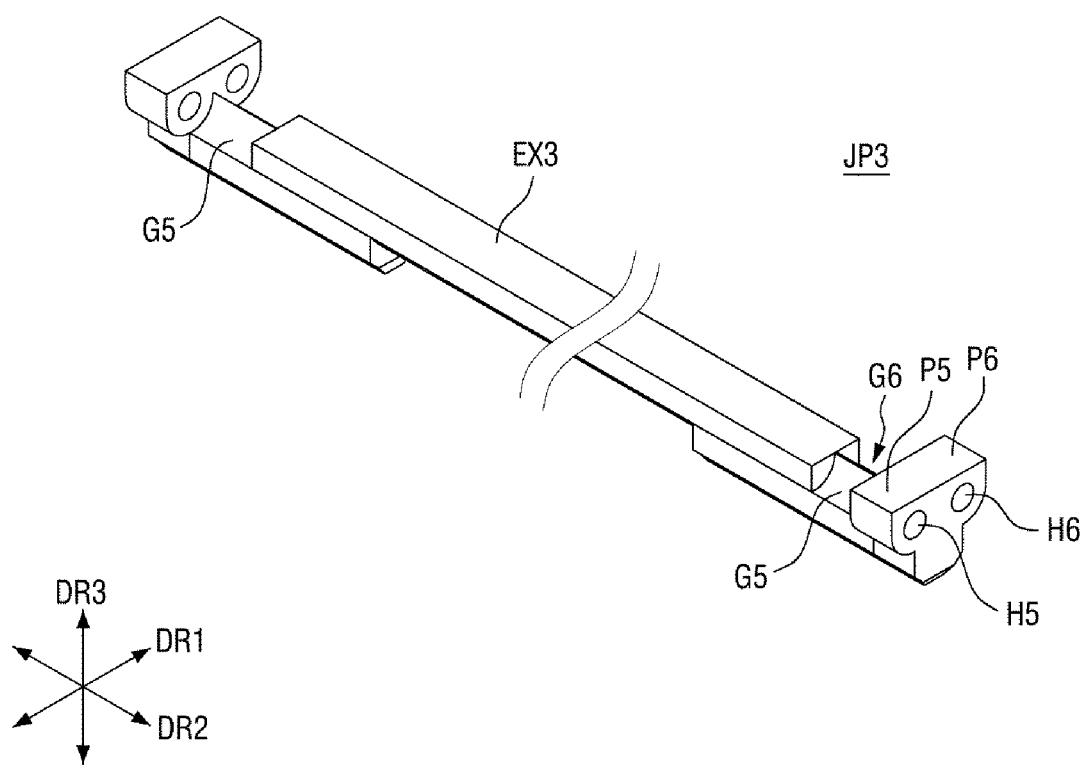
FIG. 20 is a perspective view illustrating the third joint unit of FIG. 13.
Figure 21:
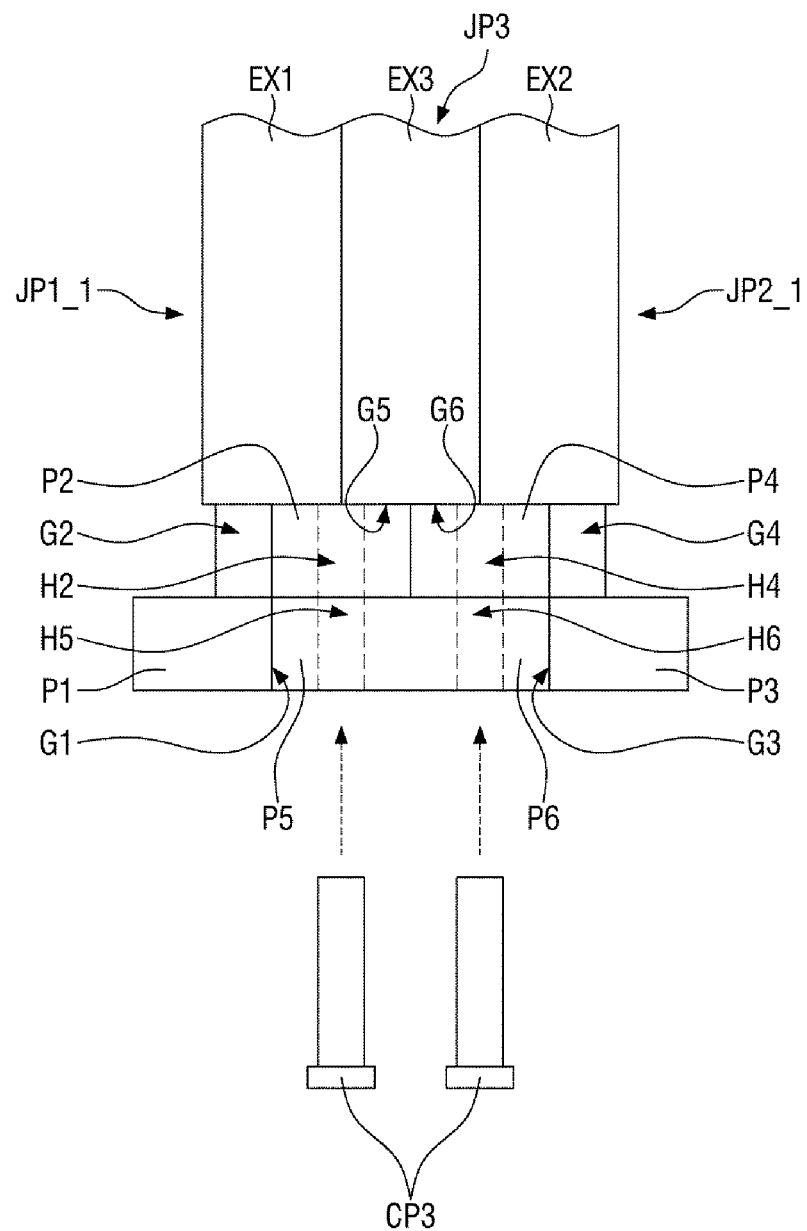
FIG. 21 illustrates how the third joint unit of FIG. 13, a first joint unit adjacent to the third joint unit, and a second joint unit adjacent to the third joint unit are connected.

FIG. 20 is a perspective view illustrating a third joint unit of FIG. 13. FIG. 21 illustrates how the third joint unit of FIG. 13, a first joint unit adjacent to the third joint unit, and a second joint unit adjacent to the third joint unit are connected.

For convenience, FIG. 21 illustrates parts of first, second, and third joint units JP1, JP2, and JP3 that are adjacent to one another.

Referring to FIGS. 13 and 20, the third joint unit JP3 includes a third extension EX3, a plurality of fifth protrusions P5, and a plurality of sixth protrusions P6. As viewed from the second direction DR2, the third extension EX3 is in the shape of an inverted trapezoid. The fifth protrusions P5 and the sixth protrusions P6 protrude in the first direction DR1 at both ends of the third extension EX3, which are defined as being opposite to each other in the second direction DR2.

The fifth protrusions P5 have the same structure as first protrusions P1 of a first joint unit JP1 adjacent to the third joint unit JP3 and overlap with the first protrusions P1, as viewed from the first direction DR1. The sixth protrusions P6 have the same structure as third protrusions P3 of a second joint unit JP2 adjacent to the third joint unit JP3 and overlap with the third protrusions P3, as viewed from the first direction DR1. The fifth protrusions P5 and the sixth protrusions P6 protrude in opposite directions at both ends of the third extension EX3. The fifth protrusions P5 protrude in the leftward direction, and the sixth protrusions P6 protrude in the rightward direction.

Fifth holes H5 which extend in the second direction DR2 are defined in the fifth protrusions P5, and sixth holes H6 which extend in the second direction Dr2 are defined in the sixth protrusions P6. The fifth holes H5 and the sixth holes H6 have the same shapes as the first holes H1 and the third holes H3, respectively.

Fifth grooves G5 which have the same shape as second grooves G2 of the first joint unit JP1 adjacent to the third joint unit JP3 and sixth grooves G6 which have the same shape as fourth grooves G4 of the second joint unit JP2 adjacent to the third joint unit JP3 are defined in the third extension EX3. As viewed from the first direction DR1, the second grooves G2 overlap with the fifth grooves G5, and the fourth grooves G4 overlap with the sixth grooves G6.

The first joint unit JP1 adjacent to the third joint unit JP3 will hereinafter be referred to as a first sub-joint unit JP1_1, and the second joint unit JP2 adjacent to the third joint unit JP3 will hereinafter be referred to as a second sub-joint unit JP2_1.

Referring to FIG. 21, the third joint unit JP3, the first sub-joint unit JP1_1, and the second sub-joint unit JP2_1 are connected substantially in the same manner as the first joint units JP1. In an exemplary embodiment, second protrusions P2 of the first sub-joint unit JP1_1 are disposed in the fifth grooves G5, and the fifth protrusions P5 are disposed in first grooves G1 of the first sub-joint unit JP1_1, for example. Fourth protrusions P4 of the second sub-joint unit JP2_1 are disposed in the sixth grooves G6, and the sixth protrusions P6 are disposed in third grooves G3 of the second sub-joint unit JP2_1.

The second protrusions P2 of the first sub-joint unit JP1_1 overlap with the fifth protrusions P5, and the fourth protrusions P4 of the second sub-joint unit JP2_1 overlap with the sixth protrusions P6. Third coupling pins CP3 which are coupling pins CP for coupling the third joint unit JP3 and the first and second sub-joint units JP1_1 and JP2_1 are inserted in the fifth holes H5 of the third joint unit JP3 and in the second holes H2 of the first sub-joint unit JP1_1, which overlaps with the third joint unit JP3, and are also inserted in the sixth holes H6 of the third joint unit JP3 and in the fourth holes H4 of the second sub-joint unit JP2_1, which also overlaps with the third joint unit JP3.

The third coupling pins CP3 are connected to the second protrusions P2 of the first sub-joint unit JP1_1 and the fourth protrusions P4 of the second sub-joint unit JP2_1. Thus, the third joint unit JP3, the first sub-joint unit JP1_1, and the second sub-joint unit JP2_1 may be rotatably connected to one another.

Figure 22:
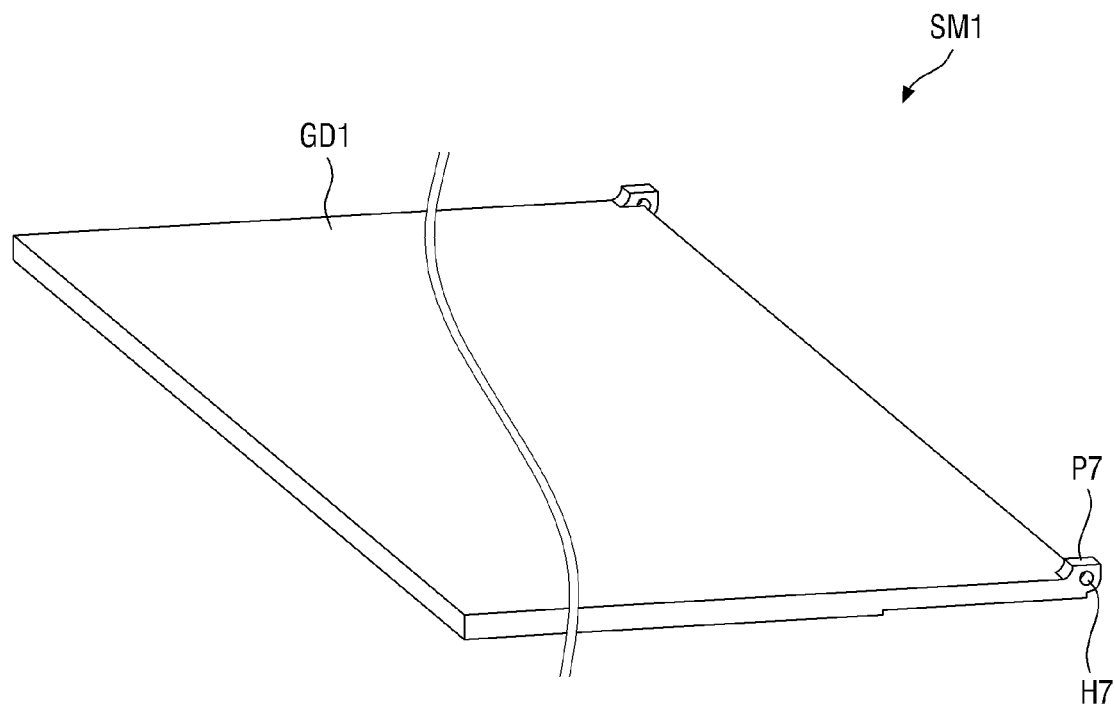
FIG. 22 is a perspective view illustrating a first side of the first supporting member of FIG. 13.
Figure 23:
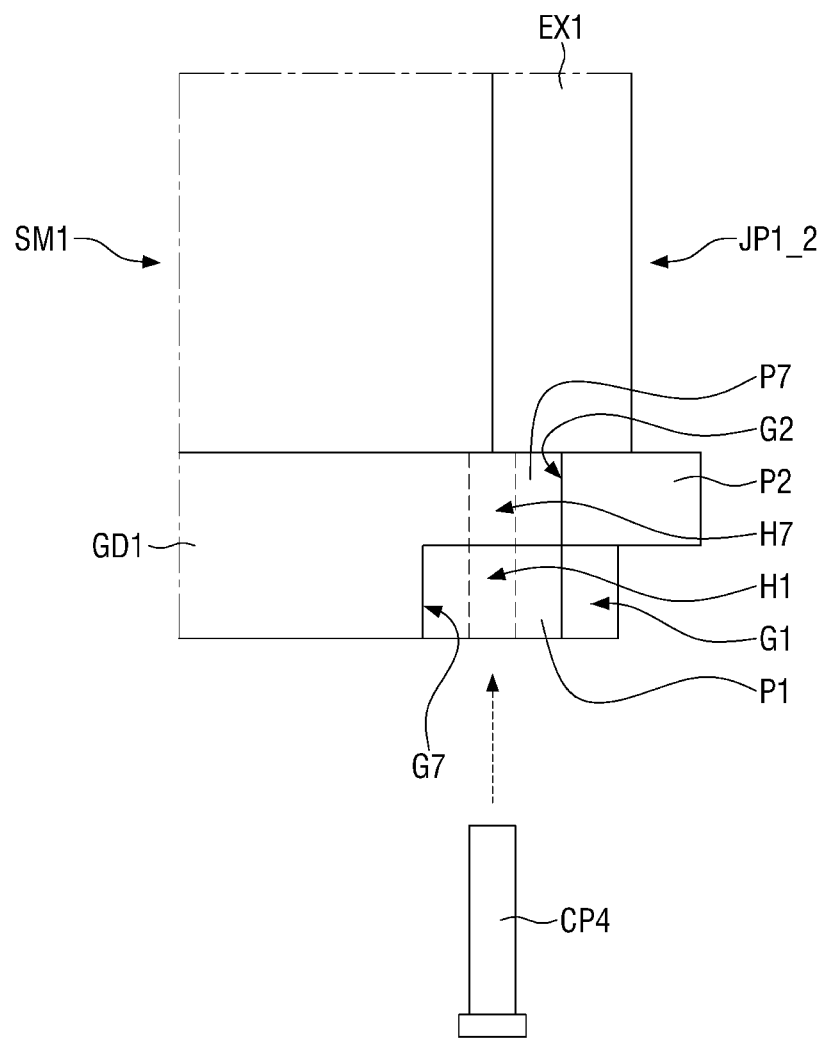
FIG. 23 illustrates how the first side of the first supporting member of FIG. 22 and a first joint unit adjacent to the first supporting member are connected.

FIG. 22 is a perspective view illustrating the first side of the first supporting member of FIG. 13. FIG. 23 illustrates how the first side of the first supporting member of FIG. 22 and a first joint unit adjacent to the first supporting member are connected.

Referring to FIGS. 13 and 22, the first supporting member SM1 includes a plurality of seventh protrusions P7 which are projected from the first side of the first supporting member SM1 and have the same structure as second protrusions P2 of a first joint unit JP1 adjacent to the first supporting member SM1. As viewed from the first direction DR1, the seventh protrusions P7 overlap the second protrusions P2. The seventh protrusions P7 protrude substantially from the first guide parts GD1.

A plurality of seventh grooves G7 which have the same shape as first grooves G1 of the first joint unit JP1 adjacent to the first supporting member SM1 are defined on the first side of the first supporting member SM1. As viewed from the first direction DR1, the seventh grooves G7 overlap with the first grooves G1. Seventh holes H7 which extend in the second direction DR2 are defined in the seventh protrusions P7. The seventh holes H7 have the same shape as second holes H2 of the first joint unit JP1 adjacent to the first supporting member SM1.

The first joint unit JP1 adjacent to the first supporting member SM1 will be referred to as a third sub-joint unit JP1_2.

Referring to FIG. 23, first protrusions P1 of the third sub-joint unit JP1_2 are disposed in the seventh grooves G7, and the seventh protrusions P7 are disposed in second grooves G2 of the third sub-joint unit JP1_2. The first protrusions P1 of the third sub-joint unit JP1_2 overlap with the seventh protrusions P7.

Fourth coupling pins CP4 which are coupling pins CP for coupling the first side of the first supporting member SM1 and the third sub-joint unit JP1_2 are inserted in the first holes H1 of the third sub-joint unit JP1_2, which overlaps with the first supporting member SM1, and in the seventh holes H7 of the first supporting member SM1, and are thus connected to the seventh protrusions P7. Thus, the first side of the first supporting member SM1 and the third sub-joint unit JP1_2 may be rotatably connected to each other.

Figure 24:
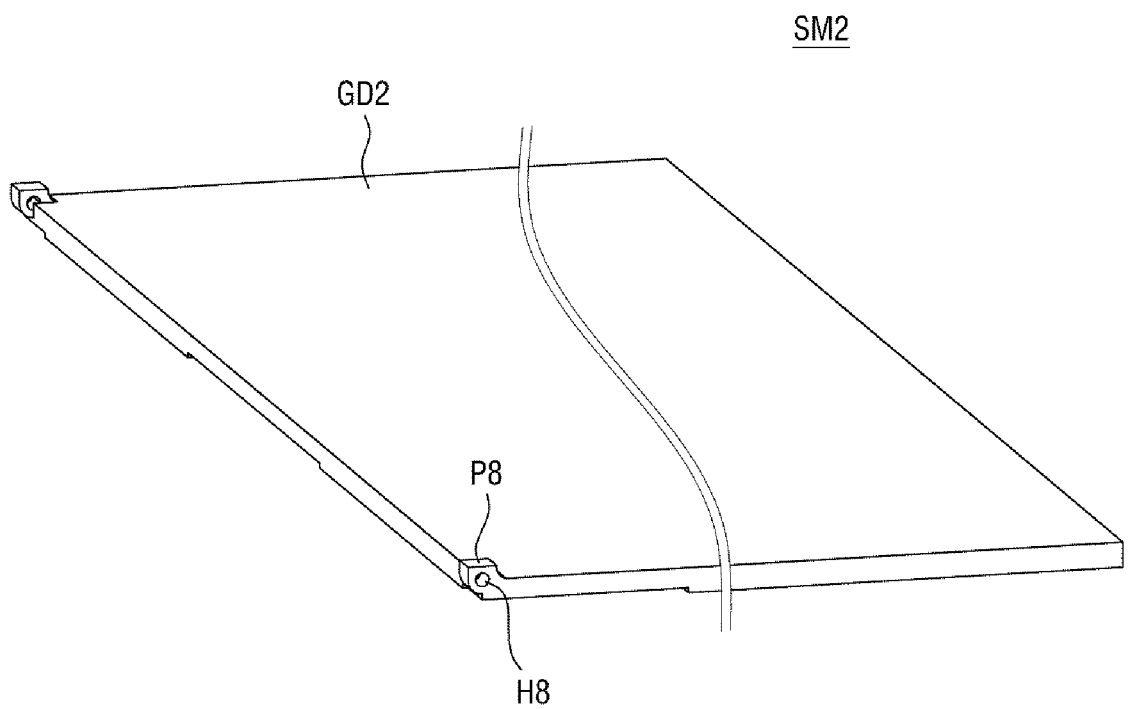
FIG. 24 is a perspective view illustrating a first side of the second supporting member of FIG. 13.
Figure 25:
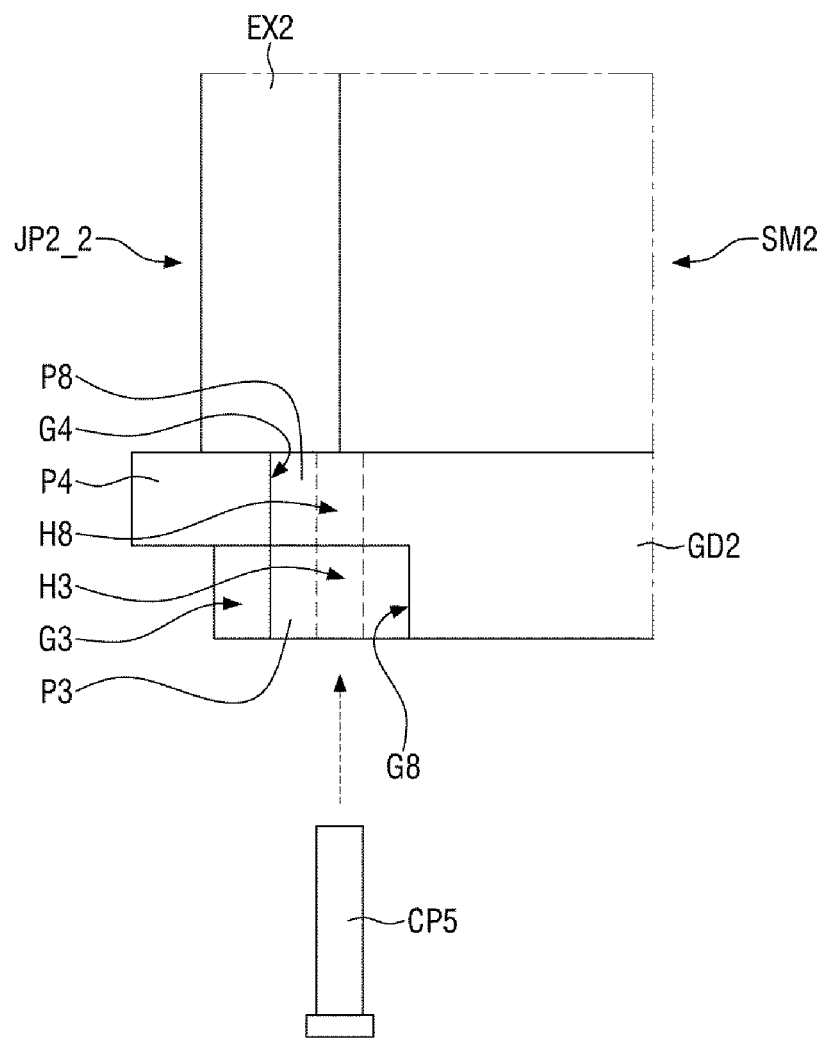
FIG. 25 illustrates how the first side of the second supporting member of FIG. 24 and a second joint unit adjacent to the second supporting member are connected.

FIG. 24 is a perspective view illustrating the first side of the second supporting member of FIG. 13. FIG. 25 illustrates how the first side of the second supporting member of FIG. 24 and a second joint unit adjacent to the second supporting member are connected.

Referring to FIGS. 13 and 24, the first side of the second supporting member SM2 is symmetrical with the first side of the first supporting member SM1. The second supporting member SM2 includes a plurality of eighth protrusions P8 which are projected from the first side of the second supporting member SM2 and have the same structure as fourth protrusions P4 of a second joint unit JP2 adjacent to the second supporting member SM2. As viewed from the first direction DR1, the eighth protrusions P8 overlap with the fourth protrusions P4.

A plurality of eighth grooves G8 which have the same shape as third grooves G3 of the second joint unit JP2 adjacent to the second supporting member SM2 are defined on the first side of the second supporting member SM2. As viewed from the first direction DR1, the eighth grooves G8 overlap with the third grooves G3. Eighth holes H8 which extend in the second direction DR2 are defined in the eighth protrusions P8. The eighth holes H8 have the same shape as fourth holes H4 of the second joint unit JP2 adjacent to the second supporting member SM2.

The second joint unit JP2 adjacent to the second supporting member SM2 will hereinafter be referred to as a fourth sub-joint unit JP2_2.

Referring to FIG. 25, third protrusions P3 of the fourth sub-joint unit JP2_2 are disposed in the eighth grooves G8, and the eighth protrusions P8 are disposed in fourth grooves G4 of the fourth sub-joint unit JP2_2. The third protrusions P3 of the fourth sub-joint unit JP2_2 overlap with the eighth protrusions P8.

Fifth coupling pins CP5 which are coupling pins CP for coupling the first side of the second supporting member SM2 and the fourth sub-joint unit JP2_2 are inserted in the third holes H3 of the fourth sub-joint unit JP22, which overlaps with the second supporting member SM2, and in the eighth holes H8 of the second supporting member SM2 and are thus connected to the eighth protrusions P8. Thus, the first side of the second supporting member SM2 and the fourth sub-joint unit JP2_2 may be rotatably connected to each other.

Figure 26:
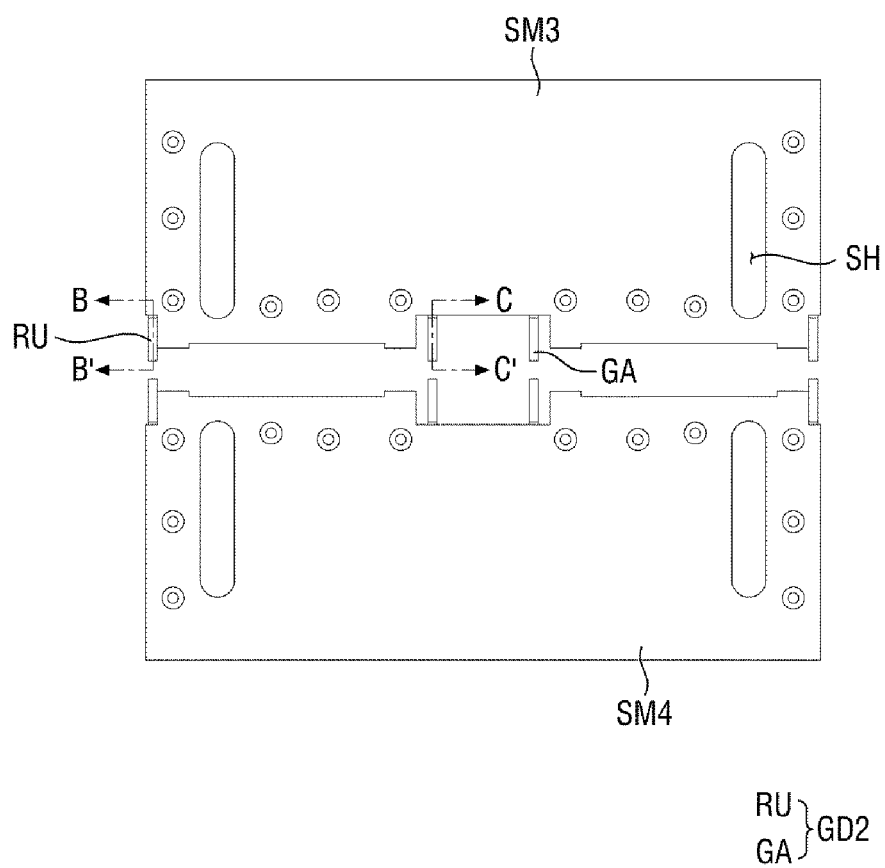
FIG. 26 is a plan view illustrating third and fourth supporting members of FIGS. 4 and 5.
Figure 27:
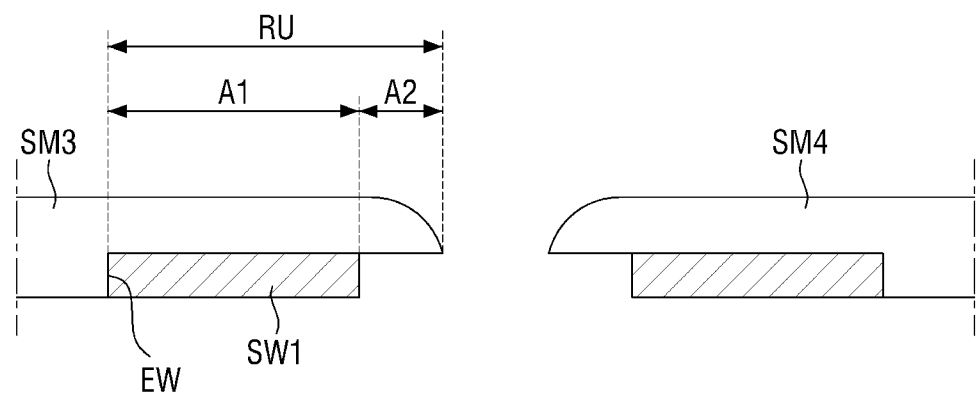
FIG. 27 is a cross-sectional view, taken along line B-B' of FIG. 26, of the third supporting member of FIG. 26.
Figure 27:
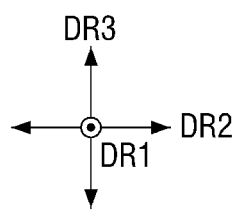
Figure 28:
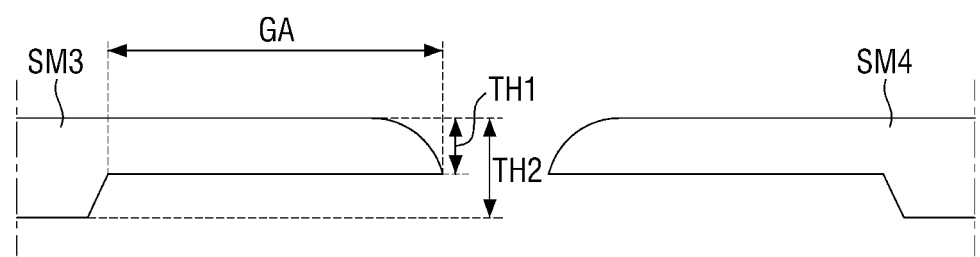
FIG. 28 is a cross-sectional view, taken along line C-C' of FIG. 26, of one of guide arms of FIG. 26.
Figure 28:
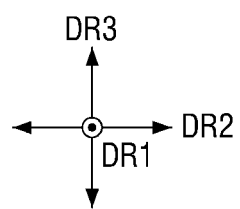
Figure 29:
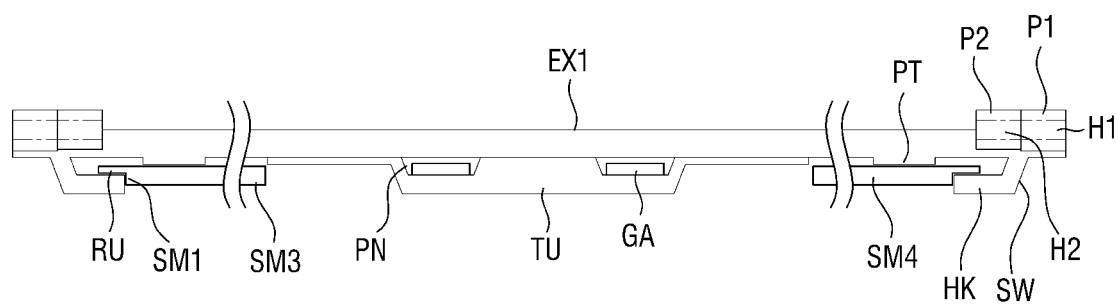
FIG. 29 illustrates how second guide parts of FIG. 26 are coupled first guide parts of FIG. 16.
Figure 29:
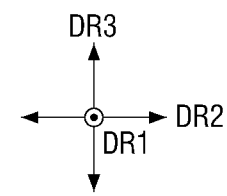

FIG. 26 is a plan view illustrating the third and fourth supporting members of FIGS. 4 and 5. FIG. 27 is a cross-sectional view, taken along line B-B' of FIG. 26, of the third supporting member of FIG. 26. FIG. 28 is a cross-sectional view, taken along line C-C' of FIG. 26, of one of guide arms of FIG. 26. FIG. 29 illustrates how second guide parts of FIG. 26 are coupled first guide parts of FIG. 16.

Referring to FIGS. 26 through 29, the third and fourth supporting members SM3 and SM4 may be opposite to each other, and one or more second guide parts GD2 may be provided on the first sides of the third and fourth supporting members SM3 and SM4 that are opposite to each other.

The second guide parts GD2 include rail units RU which overlap with the hooks HK of the first guide parts GD1 and along which the hooks HK may slide. The rail units RU may be disposed symmetrically on both sides of the array of the third and fourth supporting members SM3 and SM4.

Each of the rail units RU may be divided into a first area A1 including a sidewall SW1 and a second area A2 not including the sidewall SW1. The total length, in the first direction DR1, of the first and second regions A1 and A2 may be the same as the total length of the first joint units JP1 when unfolded completely. In an exemplary embodiment, when there are provided four first joint units JP1, the length of the first area A1 may be the same as the total length of three first joint units JP1, and the length of the second area A2 may be the same as the length of a single first joint unit JP1, for example. However, the lengths of the first and second areas A1 and A2 may vary depending on the size of the first guide parts GD1.

A blocking wall EW may be disposed at one end of the first area A1. The blocking wall EW may extend perpendicularly from the sidewall SW1 of the first area A1 in the second direction DR2. Due to the presence of the sidewall SW1 and the blocking wall EW, a height difference may be generated between the third and fourth supporting members SM3 and SM4.

The second guide parts GD2 may further include one or more guide arms GA which overlap with the tunnel units TU of the first joint units JP1 and slide along the penetrations PN of each of the tunnel units TU. The guide arms GA may be disposed in the middle of the third and fourth supporting members SM3 and SM4. In an exemplary embodiment, two guide arms GA may be disposed symmetrically in the middle of the third and fourth supporting members SM3 and SM4, for example.

A thickness TH1, in the third direction DR3, of the guide arms GA may be smaller than a thickness TH2, in the third direction DR3, of the third and fourth supporting members SM3 and SM4. Due to the thickness difference between the guide arms GA and the third and fourth supporting members SM3 and SM4, a height difference may be generated between the guide arms GA and the third and fourth supporting members SM3 and SM4, and as a result, the third and fourth supporting members SM3 and SM4 may be prevented from advancing further when the folding member 200 is unfolded.

Ends of the guide arms GA and ends of the rail units RU may be aligned with imaginary lines connecting the penetrations PN and the hooks HK. As a result, when the folding member 200 is switched from its unfolded state to its folded state, the ends of the guide arms GA and the ends of the rail units RU may slide into the penetrations PN and the hooks HK, respectively, at the same time.

In an exemplary embodiment, the ends of the guide arms GA and the ends of the rail units RU may be semicircular in shape in a cross-sectional view. The ends of the guide arms GA and the ends of the rail units RU may be placed in contact with the top surfaces of the penetrations PN and the top surfaces of the hooks HK, respectively, when the folding member 200 is switched from its unfolded state to its folded state. Accordingly, for smooth sliding, the ends of the guide arms GA and the ends of the rail units RU may be rounded.

Figure 30:
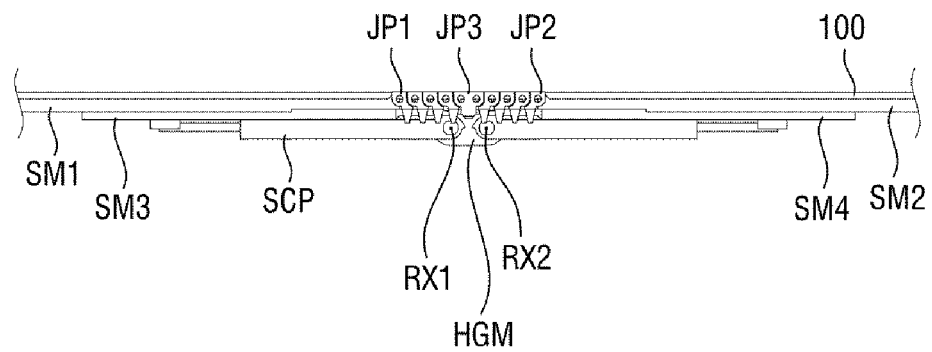
FIG. 30 is a side view illustrating how the first, second, third, and fourth supporting members, a connecting member, a hinge member, sliding units, and first and second rear covers of FIGS. 4 and 5 are coupled.
Figure 31:
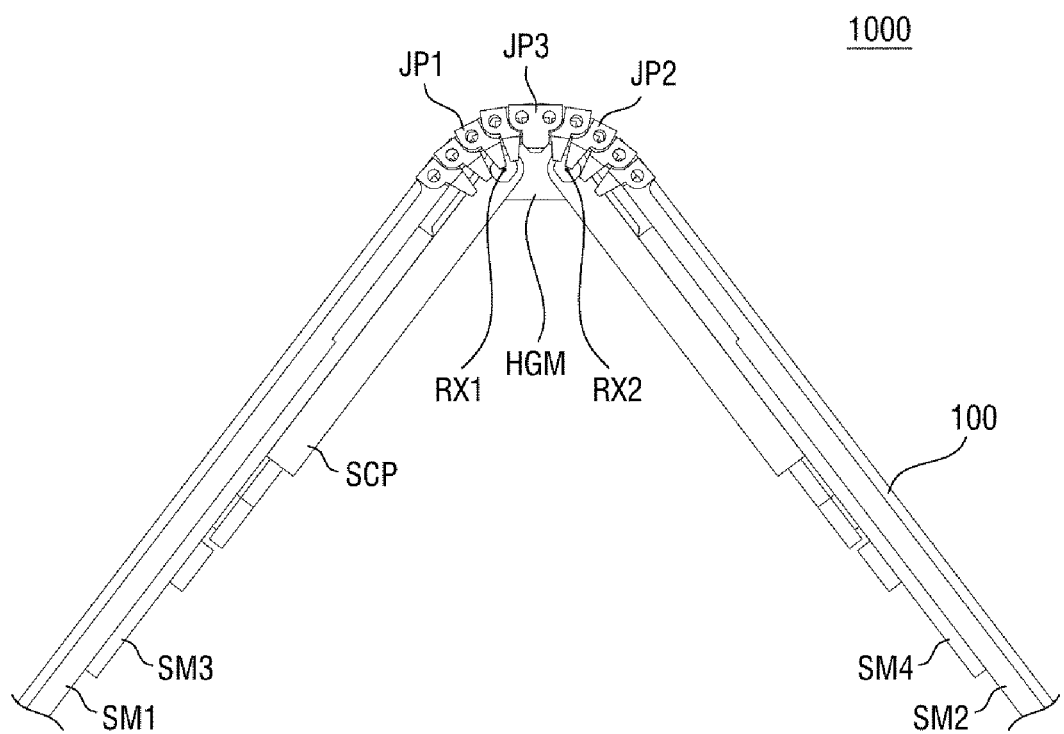
FIGS. 31 and 32 illustrate the display device of FIG. 1 in its folded state.
Figure 32:
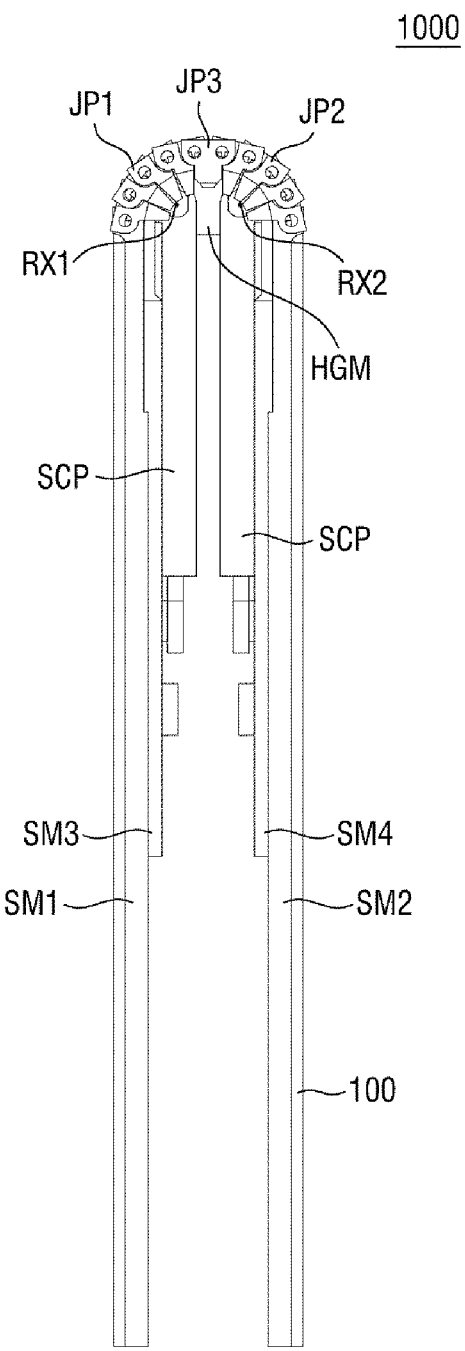

FIG. 30 is a side view illustrating how the first, second, third, and fourth supporting members, the connecting member, the hinge member, the sliding units, and the first and second rear covers of FIGS. 4 and 5 are coupled. FIGS. 31 and 32 illustrate how the display device of FIG. 1 is folded.

Referring to FIGS. 5 and 30, the display module 100 is disposed on the top surfaces of the first and second supporting members SM1 and SM2 and on the first extensions EX1, the second extensions EX2, and the third extension EX3.

Referring to FIGS. 31 and 32, the display device 1000 may be folded about the first and second rotational axes RX1 and RX2 of the hinge member HGM. The folding member 200 may out-fold the display device 1000 such that the display surface DS of the display module 100 may be exposed.

When the display device 1000 is out-folded, the first and second supporting members SM1 and SM2 and the third and fourth supporting members SM3 and SM4 may slide in relatively opposite directions. In an exemplary embodiment, the first and second supporting members SM1 and SM2 may move toward the center of the display device 1000, and the third and fourth supporting members SM3 and SM4 may move in the opposite direction to the moving direction of the first and second supporting members SM1 and SM2, for example.

The top surfaces of the hooks HK of the first guide parts GD1 of each of the first joint units JP1 or the second joint units JP2 and the bottom surfaces of the rail units RU of the third and fourth supporting members SM3 and SM4 are firmly attached and may thus slide against one another. As a result, the joint units (JP1, JP2, and JP3) may be prevented from rotating beyond a predefined curved trajectory when folded or unfolded.

Figure 33:
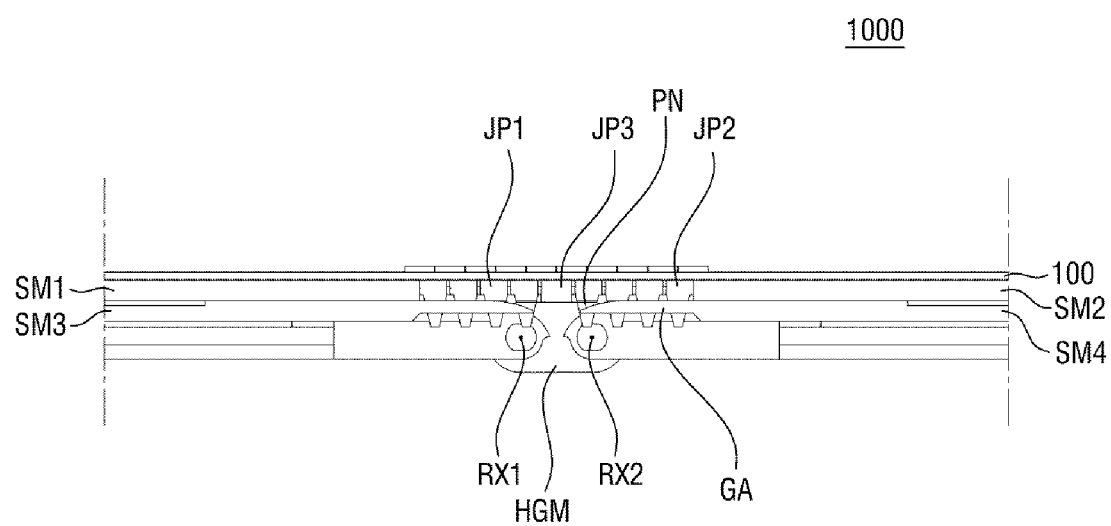
FIG. 33 is a cross-sectional view of the display device of FIG. 1 into which the first, second, third, and fourth supporting members, the connecting member, the hinge member, the sliding units, and the first and second rear covers of FIGS. 4 and 5 are all assembled.
Figure 34:
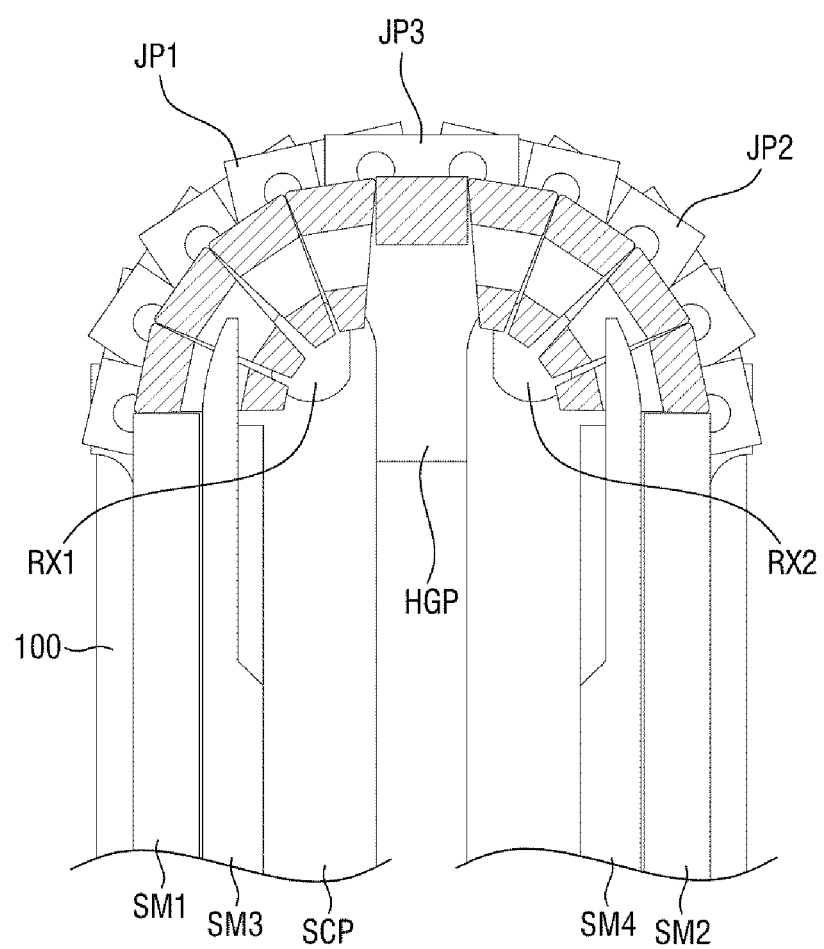
FIGS. 34 and 35 are partial side views of the display device 1 in its folded state.
Figure 35:
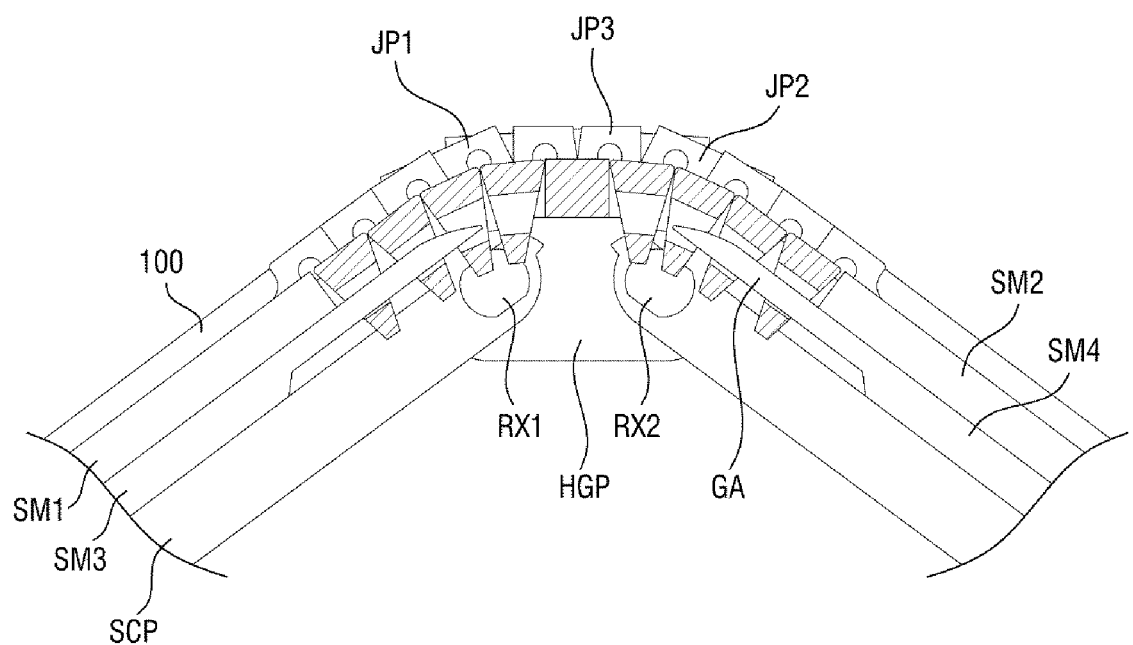

FIG. 33 is a cross-sectional view of the display device of FIG. 1 into which the first, second, third, and fourth supporting members, the connecting member, the hinge member, the sliding units, and the first and second rear covers of FIGS. 4 and 5 are all assembled. FIGS. 34 and 35 are partial side views of the display device 1 in its folded state.

Referring to FIGS. 33 through 35, the bottom surfaces of the penetrations PN of the first guide parts GD1 of each of the first joint units JP1 or the second joint units JP2 and the bottom surfaces of the guide arms GA of the third and fourth supporting members SM3 and SM4 are firmly attached and may thus slide against one another. As a result, the joint units (JP1, JP2, and JP3) may be prevented from rotating beyond a predefined curved trajectory when folded or unfolded.

Figure 36:
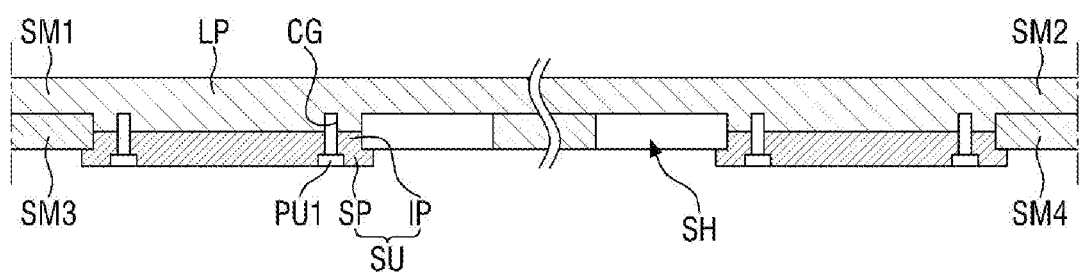
FIG. 36 is a cross-sectional view illustrating how the sliding units of FIGS. 4 and 5 are arranged when the display device of FIG. 1 is unfolded, as illustrated in FIG. 30.
Figure 37:
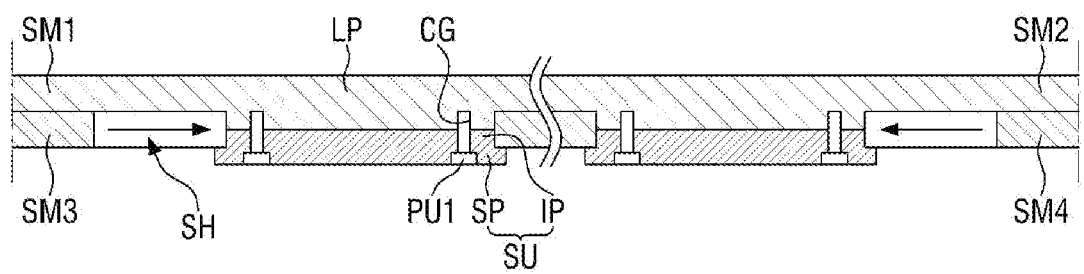
FIG. 37 is a cross-sectional view illustrating how the sliding units of FIGS. 4 and 5 are arranged when the display device of FIG. 1 is folded, as illustrated in FIG. 32.

FIG. 36 is a cross-sectional view illustrating how the sliding units of FIGS. 4 and 5 are arranged when the display device of FIG. 1 is unfolded, as illustrated in FIG. 30. FIG. 37 is a cross-sectional view illustrating how the sliding units of FIGS. 4 and 5 are arranged when the display device of FIG. 1 is folded, as illustrated in FIG. 32.

Specifically, FIGS. 36 and 37, like FIG. 7, are cross-sectional view taken along line I-I' of FIG. 5.

Referring to FIG. 36, when the display device 1000 is unfolded, the sliding units SU and the lower protrusions LP are disposed on first sides of the sliding holes SH.

Referring to FIG. 37, when the display device 1000 is out-folded, the sliding units SU and the lower protrusions LP move in an opposite direction to the second supporting member SM2. As a result, the sliding units SU and the lower protrusions LP move along the sliding holes SH to be disposed on second sides of the sliding holes SH.

If the first and second supporting members SM1 and SM2 are connected and fixed to the third and fourth supporting members SM3 and SM4, the display device 1000 cannot be folded. However, since the first and second supporting members SM1 and SM2 may slide against the third and fourth supporting members SM3 and SM4 and may thus move in an opposite direction to the third and fourth supporting members SM3 and SM4, the display device 1000 may be folded properly.

Figure 38:
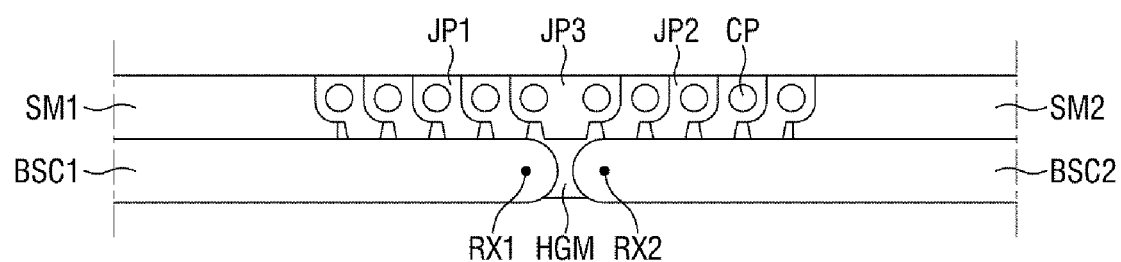
FIG. 38 is an enlarged side view illustrating the joint units of FIG. 30.
Figure 39:
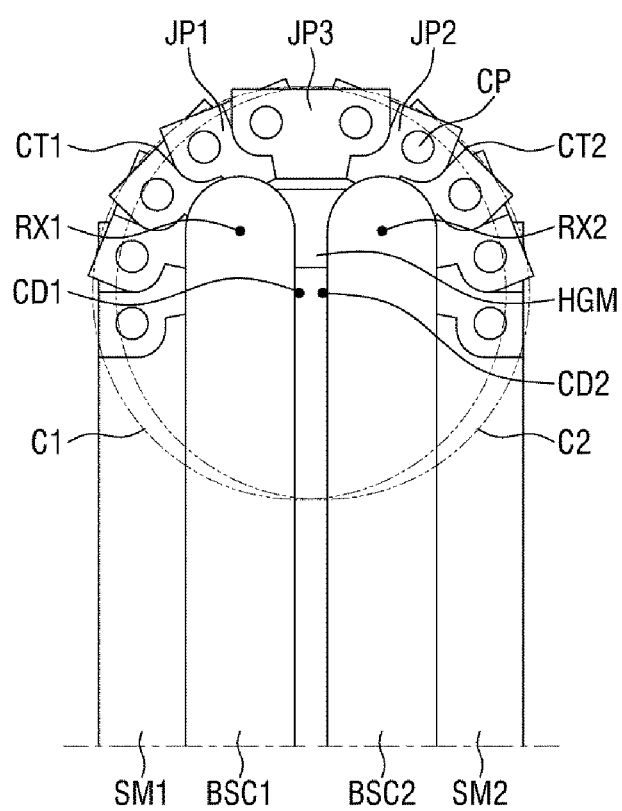
FIG. 39 is an enlarged side view illustrating the joint units of FIG. 32.
Figure 40:
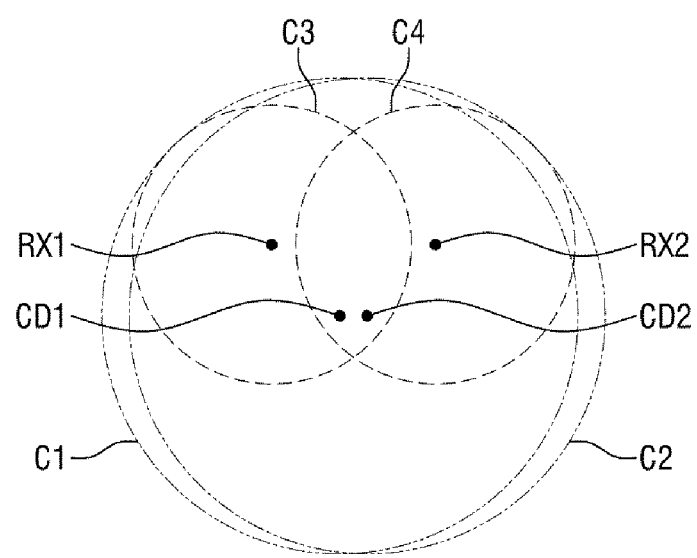
FIG. 40 illustrates first and second reference circles of FIG. 39 and third and fourth circles having first and second rotational axes, respectively, as their centers.

FIG. 38 is an enlarged side view illustrating the joint units of FIG. 30. FIG. 39 is an enlarged side view illustrating the joint units of FIG. 32. FIG. 40 illustrates first and second reference circles of FIG. 39 and third and fourth circles having first and second rotational axes, respectively, as their centers.

Referring to FIGS. 38, 39, and 40, the joint units (JP1, JP2, and JP3) may be arranged along one or more curved trajectories when the folding member 200 rotates with reference to the first and second rotational axes RX1 and RX2. The curved trajectories may be defined as parts of reference circles. In the description that follows, it is assumed that there are provided two curved trajectories which are defined as parts of two reference circles.

When the folding member 200 rotates with reference to the first and second rotational axes RX1 and RX2 to fold the display module 100, the first joint units JP1 rotate together and are thus arranged along a first curved trajectory CT1, and the second joint units JP2 rotate together and are thus arranged along a second curved trajectory CT2. The first curved trajectory CT1 may be symmetrical with the second curved trajectory CT2. The two reference circles may include first and second reference circles C1 and C2. The first curved trajectory CT1 may be defined as a part of the first reference circle C1, and the second curved trajectory CT2 may be defined as a part of the second reference circle C2.

The folding area FA of the display module 100 may be bent by the joint units (JP1, JP2, and JP3). When the folding member 200 is folded, the first extensions EX1 of the first joint units JP1 may be placed in contact with one another on their sides, and the second extensions EX2 of the second joint units JP2 may be placed in contact with one another on their sides.

A first center CD1 of the first reference circle C1, which is obtained by extending the first curved trajectory CT1, does not overlap with the first rotational axis RX1, and a second center CD2 of the second reference circle C2, which is obtained by extending the second curved trajectory CT2, does not overlap with the second rotational axis RX2. The first and second centers CD1 and CD2 are spaced apart from the first and second rotational axes RX1 and RX2. The distance between the first and second centers CD1 and CD2 is smaller than the distance between the first and second rotational axes RX1 and RX2.

The first and second circles C1 and C2 having the first and second centers CD1 and CD2, respectively, may have a first curvature, and third and fourth circles C3 and C4 having the first and second rotational axes RX1 and RX2, respectively, as their centers may have a second curvature. The first and second circles C1 and C2 may be larger than the third and fourth circles C3 and C4. Since the larger a circle is, the smaller the curvature of the circle becomes, the first curvature is smaller than the second curvature.

When the folding area FA of the display module 100 is bent, stress may be generated in the folding area FA. The more bent the folding area FA (i.e., the smaller the curvature of the folding area FA), the more the stress in the folding area FA, and the more likely the folding area FA is to be deformed. The stress in the folding area FA decreases when the folding area FA is bent with the first curvature than when the folding area FA is bent with the second curvature, and as a result, the deformation of the folding area FA may be reduced.

In short, when the display module 100 is folded, the first joint units JP1 and the second joint units JP2 are arranged along the first and second curved trajectories CT1 and CT2, respectively, having the second curvature, and thus, the folding area FA of the display module 100 may be smoothly folded. Accordingly, the display device 1000 may reduce the deformation of the folding area FA by reducing the stress in the folding area FA.

Other exemplary embodiments of the invention will hereinafter be described, focusing mainly on differences with the above-described embodiment.

Figure 41:
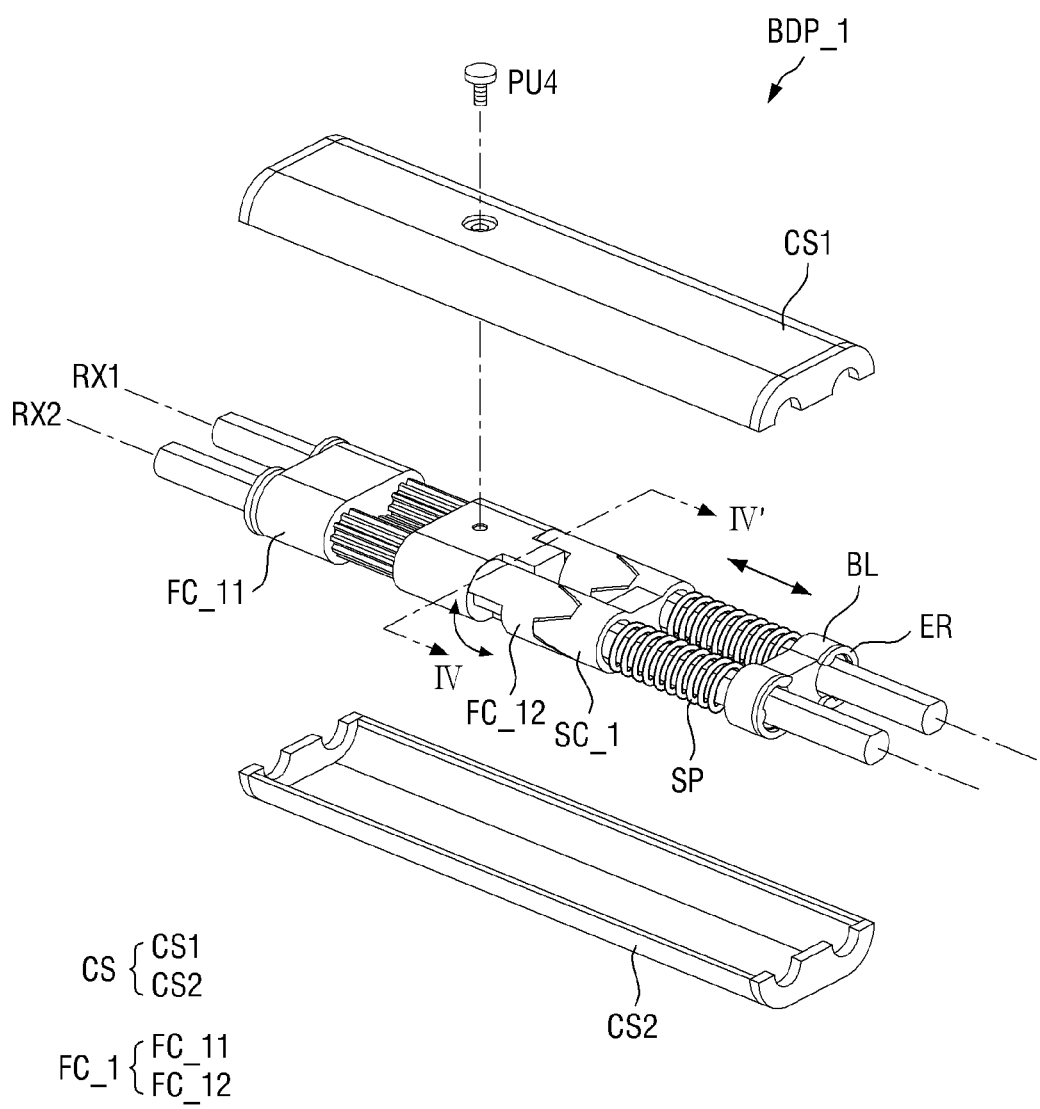
FIG. 41 is an exploded perspective view illustrating another exemplary embodiment of a body part of a hinge part according to the invention.
Figure 42A:
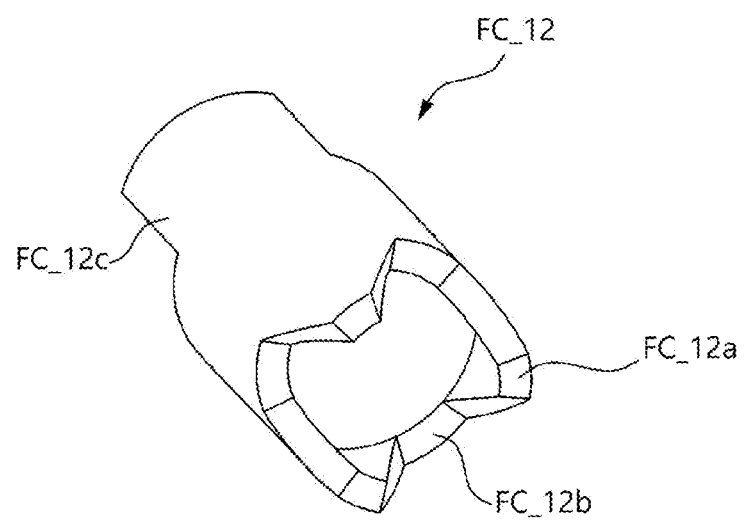
FIG. 42A is a perspective view illustrating a fixed cam of FIG. 41.
Figure 42B:
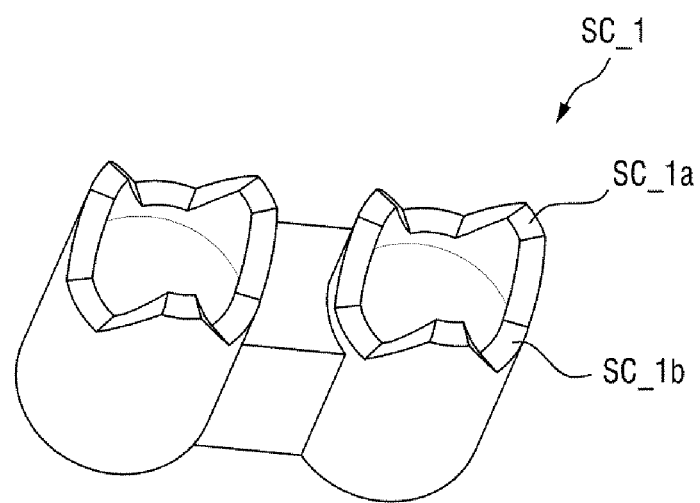
FIG. 42B is a perspective view illustrating a rotary cam of FIG. 41.
Figure 43:
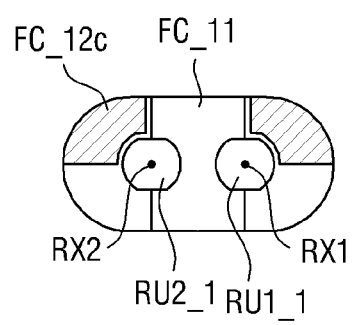
FIG. 43 is a cross-sectional view taken along line IV-IV' of FIG. 41.

FIG. 41 is an exploded perspective view illustrating another exemplary embodiment of a body part of a hinge part according to the invention. FIG. 42A is a perspective view illustrating a fixed cam of FIG. 41. FIG. 42B is a perspective view illustrating a rotary cam of FIG. 41. FIG. 43 is a cross-sectional view taken along line IV-IV' of FIG. 41.

Referring to FIGS. 41 through 43, a body part BDP_1 differs from the body part BDP of FIG. 9 in that part of a fixed cam FC_1 is rotatable, that parts of a rotary cam SC_1 which are disposed in first and second rotation units RU1_1 and RU2_1 are connected, that the fixed cam FC_1 and the rotary cam SC_1 include three mountain-shaped parts FC_12a and three mountain-shaped parts SC_1a, respectively, and that the body part BDP_1 further includes a fixing member BL and E-rings ER which support elastic members SP.

Specifically, the fixed cam FC_1 may include a coupling part FC_11 which is coupled to a hinge case CS and rotating parts FC_12 which are rotatably coupled to the coupling part FC_11. The coupling part FC_11 may be coupled to a hinge part top surface CS1 and a hinge part bottom surface CS2 by a fourth pin unit PU4.

The first and second rotation units RU1_1 and RU2_1 may be coupled through the fixed cam FC_1. The rotating parts FC_12 may be rotatably coupled to the first and second rotation units RU1_1 and RU2_1, which are coupled to the fixed cam FC_1. In an exemplary embodiment, as illustrated in FIG. 43, the rotating part FC_12 coupled to the first rotation unit RU1_1 may rotate clockwise, and the rotating part FC_12 coupled to the second rotation unit RU2_1 may rotate counterclockwise, for example.

In an exemplary embodiment, each of the rotating parts FC_12 may include mountain-shaped parts FC_12a which are arranged at intervals of 120 degrees, valley-shaped parts FC_12b which are disposed between the mountain-shaped parts FC_12a, and a stopper part FC_12c which determines the rotation angle of the rotating parts FC_12. A direction in which the mountain-shaped parts FC_12a and the valley-shaped parts FC_12b are disposed may be in consideration of an angle at which a folding member 200 is opened and closed. The distance between the mountain-shaped parts FC_12a is not particularly limited. In an exemplary embodiment, the mountain-shaped parts FC_12a may be disposed at intervals of about 90 degrees, for example.

The rotary cam SC_1 includes valley-shaped parts SC_1b which engage with the mountain-shaped parts FC_12a of the fixed cam FC_1 to be in slidable surface contact with the mountain-shaped parts FC_12a of the fixed cam FC_1. Accordingly, the mountain-shaped parts SC_1a are disposed on both sides of each of the valley-shaped parts SC_1b.

In an exemplary embodiment, the folding angle of the folding member 200 may be 180 degrees. That is, the folding degree between parts of the fixed cam FC_1 and the rotary cam SC_1 that are coupled to the first rotation unit RU1_1 may be 90 degrees, and the folding degree between parts of the fixed cam FC_1 and the rotary cam SC_1 that are coupled to the second rotation unit RU2_1 may be 90 degrees. In a case where the mountain-shaped parts FC_12a of each of the rotating parts FC_12 and the mountain-shaped parts SC_1a of the rotary cam SC_1 are disposed at intervals of 120 degrees, the operational range of the fixed cam FC_1 and the rotary cam SC_1 may be 90 degrees, the preload range of the fixed cam FC_1 and the rotary cam SC_1 may be 15 degrees, and the afterload range of the fixed cam FC_1 and the rotary cam SC_1 may be 15 degrees. Accordingly, the folding member 200 may maintain its folded state when folded and may maintain its unfolded state when unfolded.

The parts of the rotary cam SC_1 that are coupled to the first and second rotation units RU1_1 and RC2_1 may be unitary. The rotary cam SC of FIG. 10B is coupled to each of the first and second rotation units RU1_1 and RU2_1 and rotates independently, but the rotary cam SC_1 of FIG. 41 does not rotate, but slides back and forth along the second direction DR2. That is, torque loss may be reduced when the rotating parts FC_12 of the fixed cam FC_1 rotate and the rotary cam SC_1 only slides than when the rotary cam SC_1 both rotates and slides. As a result, the folding member 200 may be smoothly folded.

The elastic members SP are installed on one side of the rotary cam SC_1 and firmly attach the fixed cam FC_1 and the rotary cam SC_1. In an exemplary embodiment, the elastic members SP may be, for example, compressed coil springs. The fixing member BL and the E-rings ER may be provided on one side of the elastic members SP. The first and second rotation units RU1_1 and RU2_1 may be coupled through the fixing member BL. A surface that supports the elastic member SP may be provided on one side of the fixing member BL, and a surface that is in contact with the E-rings ER may be provided on the other side of the fixing member BL. The E-rings ER, which are E-shaped rings, may be inserted and coupled into grooves defined in the first and second rotation units RU1_1 and RU2_1.

Figure 44A:
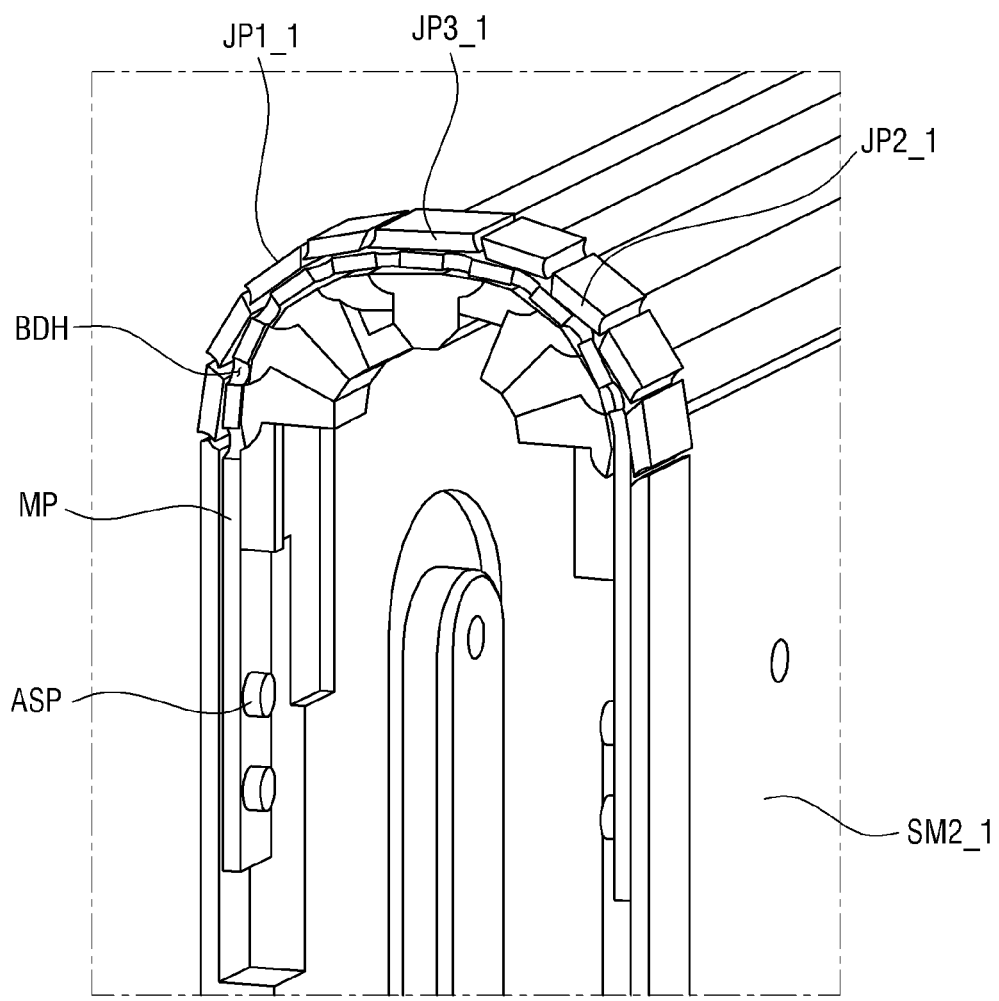
FIG. 44A is an exploded perspective view illustrating another exemplary embodiment of joint units according to the invention in their folded state.
Figure 44B:
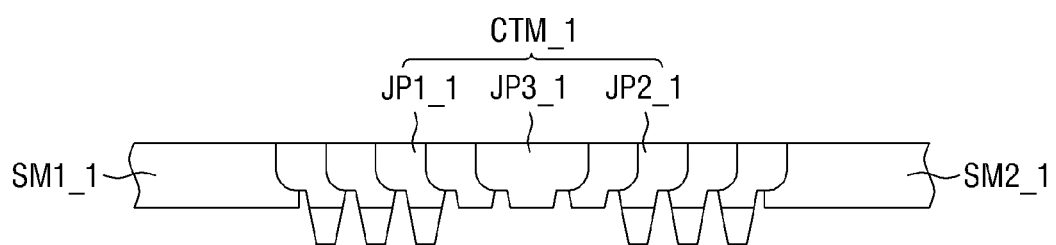
FIG. 44B is a side view illustrating the joint units of FIG. 44A in their unfolded state.
Figure 45:
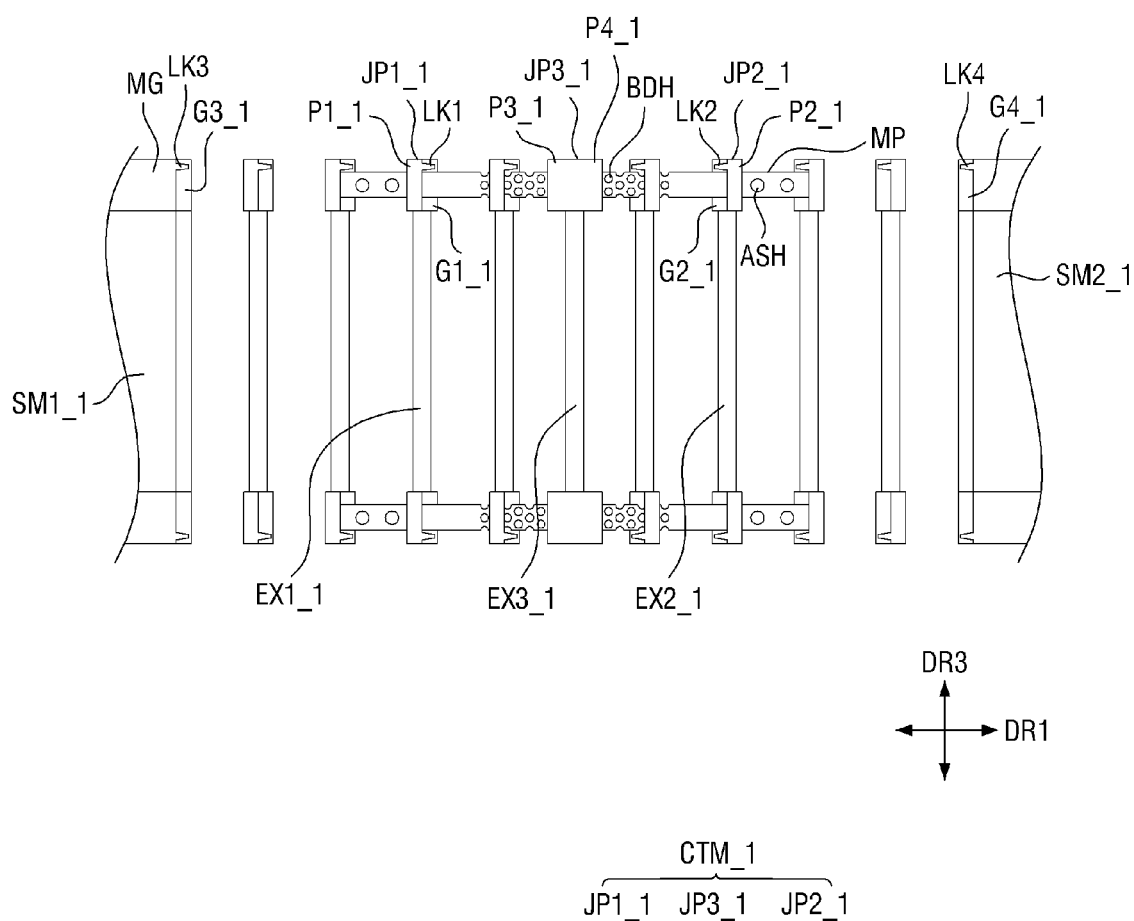
FIG. 45 is an exploded top view illustrating first joint units, second joint units, a third joint unit, and first and second supporting members of FIG. 44A.
Figure 46A:
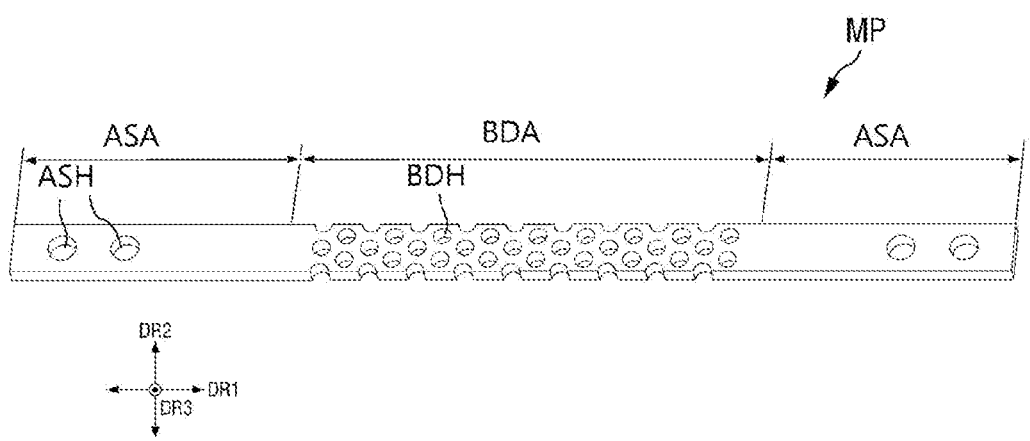
FIG. 46A is a perspective view illustrating an exemplary metal plate in its unfolded state.
Figure 46B:
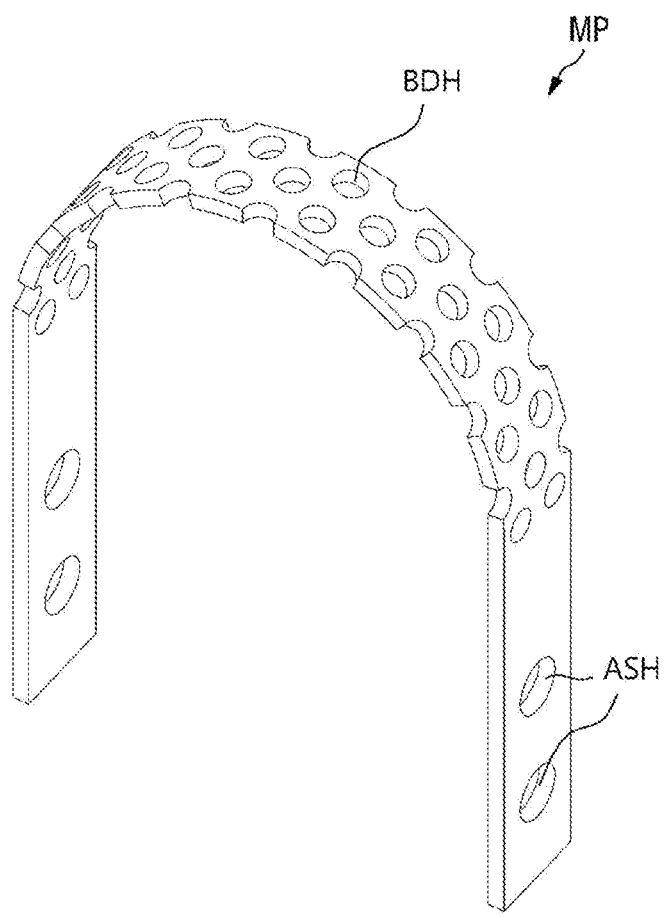
FIG. 46B is a perspective view illustrating the metal plate of FIG. 46A in its folded state.
Figure 47:
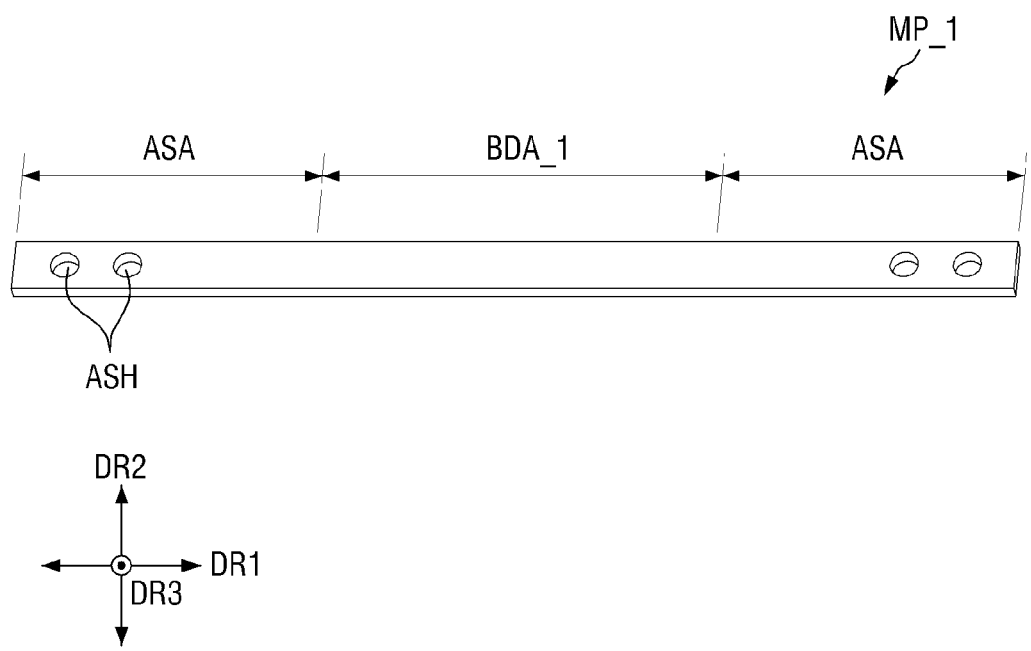
FIG. 47 is a perspective view illustrating another exemplary metal plate.
Figure 48:
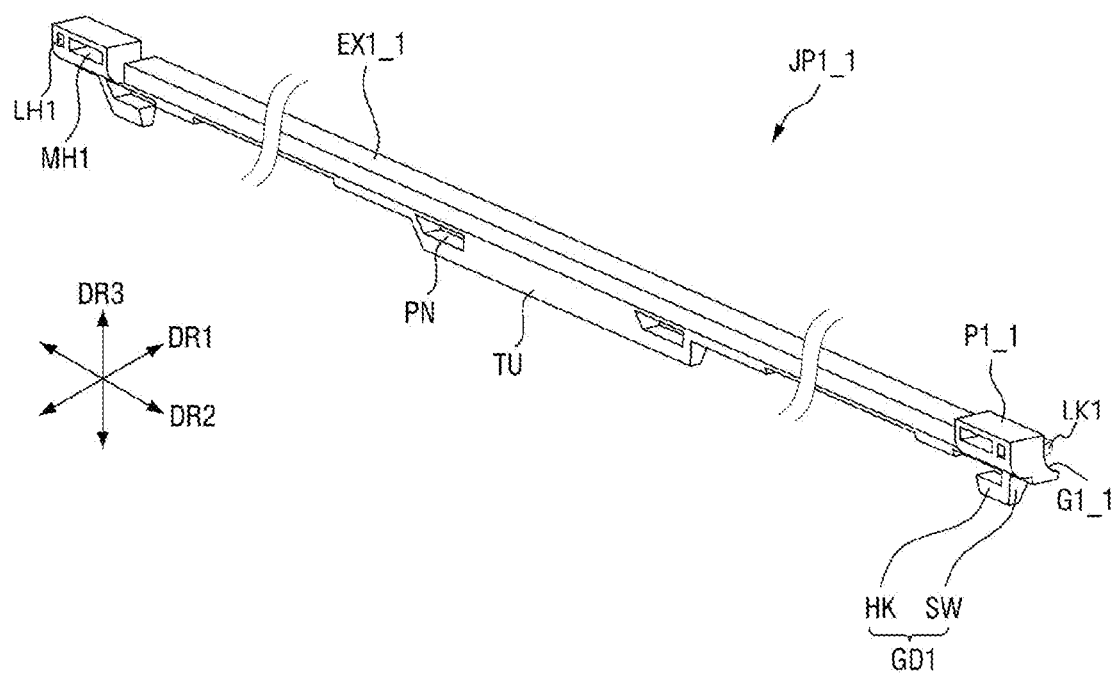
FIG. 48 is a perspective view illustrating one of the first joint units of FIG. 45.
Figure 49:
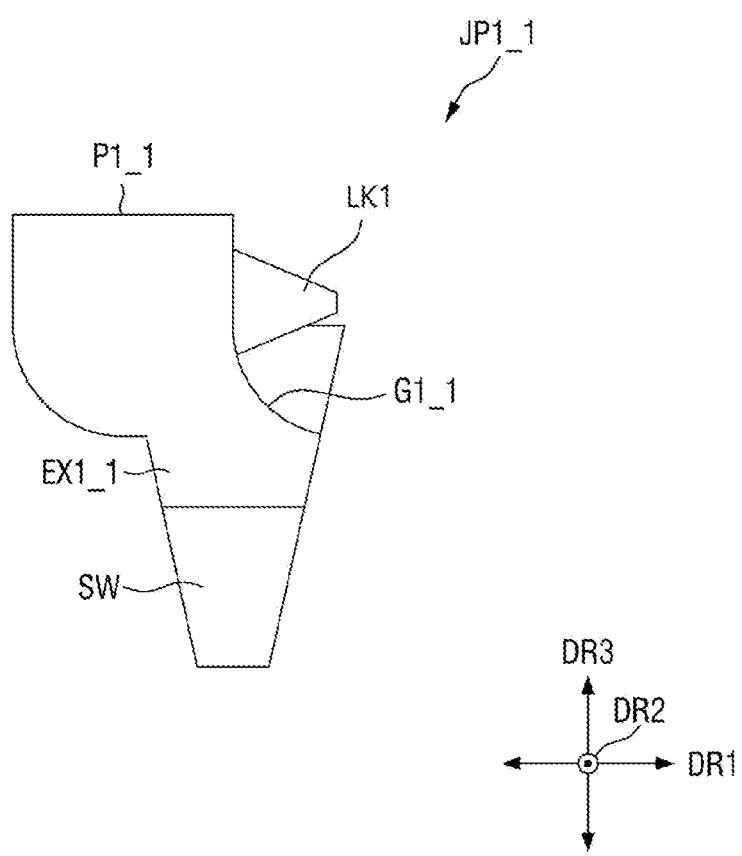
FIG. 49 is a side view illustrating the first joint unit of FIG. 48 as viewed from the second direction.
Figure 50:
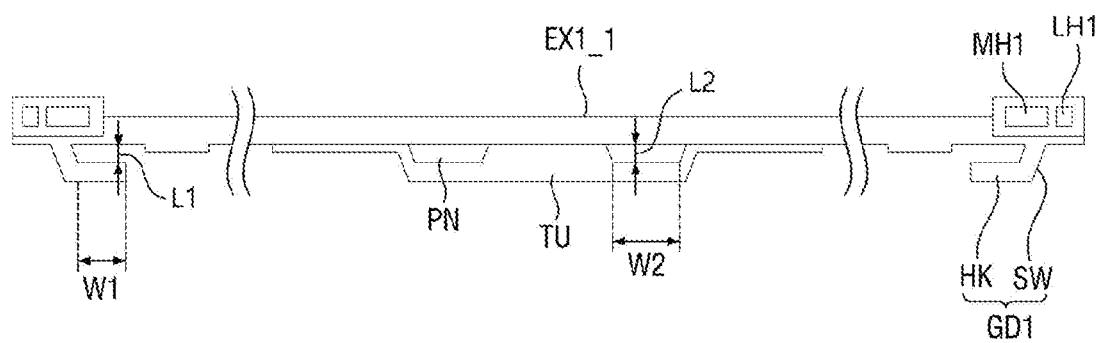
FIG. 50 is a front view illustrating the first joint unit of FIG. 48 as viewed from the first direction.
Figure 50:
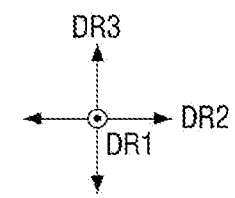
Figure 51:
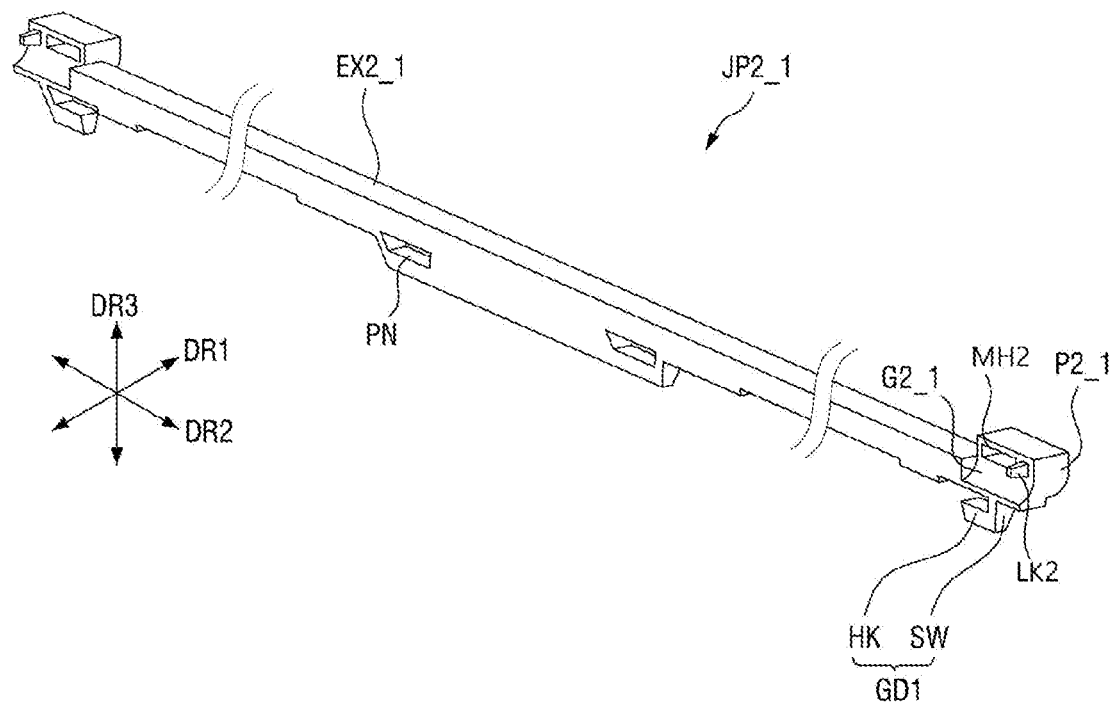
FIG. 51 is a perspective view illustrating one of the second joint units of FIG. 45.

FIG. 44A is an exploded perspective view illustrating another exemplary embodiment of joint units according to the invention in their folded state. FIG. 44B is a side view illustrating the joint units of FIG. 44A in their unfolded state. FIG. 45 is an exploded top view illustrating first joint units, second joint units, a third joint unit, and first and second supporting members of FIG. 44A. FIG. 46A is a perspective view illustrating an exemplary metal plate in its unfolded state. FIG. 46B is a perspective view illustrating the metal plate of FIG. 46A in its folded state. FIG. 47 is a perspective view illustrating another exemplary metal plate. FIG. 48 is a perspective view illustrating one of the first joint units of FIG. 45. FIG. 49 is a side view illustrating the first joint unit of FIG. 48 as viewed from the second direction. FIG. 50 is a front view illustrating the first joint unit of FIG. 48 as viewed from the first direction. FIG. 51 is a perspective view illustrating one of the second joint units of FIG. 45.

The exemplary embodiment of FIGS. 44A, 44B, and 45 through 47 differs from the exemplary embodiment of FIGS. 12 and 13 in that joint units (JP1_1, JP2_1, and JP3_1), a first side of a first supporting member SM1_1 and a first joint unit JP1_1 adjacent to the first supporting member SM1_1, a first side of a second supporting member SM2_1, and a second joint unit JP2_1 adjacent to the second supporting member SM2_1 are all rotatably coupled to one another using metal plates MP.

Specifically, each of the joint units (JP1_1, JP2_1, and JP3_1) includes an extension (EX1_1, EX2_1, or EX3_1) which extends in the second direction DR2 and protrusions (P1_1, P2_1, or P3_1) which are disposed at both ends of the extension (EX1_1, EX2_1, or EX3_1) to be projected in the first direction DR1. As viewed from the second direction DR2, first protrusions P1_1 which are disposed at both ends of each of first extensions EX1_1 of first joint units JP1_1 and protrusions P2_1 which are disposed at both ends of each of second extensions EX2_1 of second joint units JP2_1 may protrude in opposite directions. As viewed from the second direction DR2, third and fourth protrusions P3_1 and P4_1 which are disposed at both ends of a third extension EX3_1 of a third joint unit JP3_1 may protrude in two directions. Protrusions (P1_1 and P1_1, P1_1 and P3_1, or P2_1 and P3_1) at each of both ends of the extensions (EX1_1 and EX1_1, EX1_1 and EX3_1, and EX2_1 and EX3_1) of each pair of adjacent joint units (JP1_1 and JP1_1, JP1_1 and JP3_1, or JP2_1 and JP3_1) may be coupled to be able to rotate while overlapping with one another.

The structures of the protrusions (P1_1, P2_1, P3_1, or P4_1) of each of the joint units (JP1_1, JP2_1, and JP3_1), the structure of the metal plates MP, and how the joint units (JP1_1, JP2_1, and JP3_1) are connected to one another will hereinafter be described.

The number of joint units (JP1_1, JP2_1, and JP3_1) may be an odd number, the numbers of first joint units JP1_1 and second joint units JP2_1 may be even numbers, and the number of third joint units JP3_1 may be an odd number. The structure of the first joint units JP1_1 and the structure of the second joint units JP2_1 may be symmetrical with each other.

The joint units (JP1, JP2, and JP3) are rotatably coupled by the metal plates MP. The first side of the first supporting member SM1_1 and a first joint unit JP1_1 adjacent to the first supporting member SM1_1 are rotatably coupled by the metal plates MP. Also, the first side of the second supporting member SM2_1 and a second joint unit JP2_1 adjacent to the second supporting member SM2_1 are rotatably coupled by the metal plates MP.

Referring to FIG. 45, each of the first joint units JP1_1 includes a first extension EX1_1, first protrusions P1_1, first grooves G1_1, and link parts LK1.

The first extension EX1_1 extends in the second direction DR2 and is in the shape of an inverted trapezoid as viewed from the second direction DR2. In the description that follows, both sides of the first extension EX1_1 are defined as first and second sides of the first extension EX1_1 that are opposite to each other. The first direction DR1 may include the leftward direction and the rightward direction, which is opposite to the leftward direction.

The first protrusions P1_1 may protrude in the first direction DR1 at both ends of the first extension EX1_1. The first grooves G1_1 may be defined at both ends of the first extension EX1_1 to be opposite to the first protrusions P1_1. In an exemplary embodiment, the first protrusions P1_1 may protrude in the leftward direction, and the first grooves G1_1 may be defined in the rightward direction, for example.

As illustrated in FIG. 46A, the metal plates MP may be superelastic metal sheets extending in the first direction DR1. In an exemplary embodiment, the metal plates MP may include a superelastic metal alloy such as nickel titanium/nitinol, for example. However, the metal plates MP are not limited to being in the form of metal sheets, but may be in the form of, for example, wires. The metal plates MP allow the folding member 200 to remain unfolded due to their characteristic of maintaining their shape. As illustrated in FIG. 46B, the metal plates MP may be bent along at least one curved trajectory when the folding member 200 is folded by an external force. However, once the external force is removed, the metal plates MP may return to their original shape due to their characteristic of maintaining their shape. That is, the metal plates MP may return to the state as illustrated in FIG. 46A.

Each of the metal plates MP includes coupling areas ASA and a bending area BDA. Each of the coupling areas ASA may include a plurality of coupling holes ASH. The coupling holes ASH may be circular holes that penetrate the top and bottom surfaces of the respective metal plate MP. As illustrated in FIGS. 46A and 46B, the coupling holes ASH may be defined, two at each of both ends of the respective metal plate MP. However, the number and shape of coupling holes ASH are not particularly limited.

A plurality of coupling protrusions ASP may be disposed on each of the first and second supporting members SM1_1 and SM2_1 to correspond to the coupling holes ASH. The metal plates MP may be coupled to the first and second supporting members SM1_1 and SM2_1 by inserting the coupling protrusions ASP into the coupling holes ASH.

A plurality of bending holes BDH may be defined in the bending area BDA. The shape and the number of bending holes BDH, which are means for controlling the elastic force of the metal plates MP, may be designed in consideration of the elastic force that the metal plates MP are desired of. The greater the number of bending holes BDH, the weaker the elastic force of the metal plates MP, and the less the number of bending holes BDH, the stronger the elastic force of the metal plates MP. That is, as the number of bending holes BDH decreases, the folding member 200 increasingly tends to maintain its unfolded state, and as the number of bending holes BDH increases, the folding member 200 increasingly tends to maintain its folded state.

In an exemplary embodiment, the bending holes BDH are circular in shape. The bending holes BDH may be defined in succession along the first direction DR1, two in each row in the first direction DR1. In an exemplary embodiment, two circular bending holes BDH may be defined in every two rows in the first direction DR1, and one circular bending hole BDH and two semicircular bending holes BDH may be defined in the alternating rows in the first direction DR1, for example. In this manner, the bending holes BDH may be defined in the bending area BDA along the first direction DR1.

A metal plate MP_1 of FIG. 47 differs from the metal plate MP of FIGS. 46A and 46B in that bending holes BDH are not defined in a bending area BDA_1.

Specifically, referring to FIG. 47, the metal plate MP_1 may include coupling areas ASA and the bending area BDA_1. Each of the coupling areas ASA may include a plurality of coupling holes ASH. The coupling holes ASH may be circular holes that penetrate the top and bottom surfaces of the metal plate MP_1. As illustrated in FIG. 47, the coupling holes ASH may be defined, two at each of both ends of the metal plate MP_1. However, the number and shape of coupling holes ASH are not particularly limited.

A plurality of coupling protrusions ASP may be disposed on each of the first and second supporting members SM1_1 and SM2_1 to correspond to the coupling holes ASH of the metal plate MP_1. The metal plates MP_1 may be coupled to the first and second supporting members SM1_1 and SM2_1 by inserting the coupling protrusions ASP into the coupling holes ASH of the metal plate MP_1.

The bending area BDA_1 may not include a plurality of bending holes BDH. In an exemplary embodiment, the metal plate MP_1 of FIG. 47 may be thinner than the metal plate MP of FIGS. 46A and 46B, for example. By controlling the thickness of the metal plate MP_1, the elastic force of the metal plate MP_1 may be controlled. The thicker the metal plate MP_1, the stronger the elastic force of the metal plate MP_1, and the thinner the metal plate MP_1, the weaker the elastic force of the metal plate MP_1. That is, as the thickness of the metal plate MP_1 increases, the folding member 200 increasingly tends to maintain its unfolded state, and as the thickness of the metal plate MP_1 decreases, the folding member 200 increasingly tends to maintain its folded state.

Referring to FIGS. 48 through 50, the first joint units JP1_1 differ from the first joint units JP1 of FIGS. 14 through 16 in that metal plate holes MH, first link parts LK1, and first link part grooves LH_1 are further provided, and that the structures of the first protrusions P1_1 and the first grooves G1_1 differ from the structures of their respective counterparts.

Specifically, the first protrusions P1_1 may include first metal plate holes MH1 which may be penetrated by the metal plates MP. As viewed from the first direction DR1, the cross-sectional area of the first metal plate holes MH1 may be greater than the cross-sectional area of the metal plates MP. As viewed from the second direction DR2, the first metal plate holes MH1 may be holes that penetrate the left and right sides of the respective first protrusions P1_1.

The first link parts LK1 may be disposed on the rear surfaces of the first protrusions P1_1 to prevent the first joint units JP1_1 and the third joint unit JP3_1 from being spaced apart from one another in the second direction DR2 when the first joint units JP1_1 and the third joint unit JP3_1 are coupled to one another. The first link parts LK1 may extend in the first direction DR1 from the rear surfaces of the first protrusions P1_1. The length by which the first link parts LK1 extend in the first direction DR1 may be smaller than the length by which the first protrusions P1_1 extend in the first direction DR1.

The first link part grooves LH1 may be defined to correspond to the first link parts LK1 of a corresponding adjacent first joint unit JP1_1. As viewed from the first direction DR1, the first link parts LK1 and the first link part grooves LH1 may overlap. As viewed from the first direction DR1, the cross-sectional area of the first link part grooves LH1 may be greater than the cross-sectional area of the first link parts LK1. As viewed from the second direction DR2, the first link part grooves LH1 may not penetrate the left and right sides of the respective first protrusions P1_1. That is, the first link part grooves LH1 may be recesses that are defined in the left sides of the respective first protrusions P1_1.

The first extension EX1_1 is in the shape of an inverted trapezoid having an upper side which is parallel to the first direction DR1, a lower side which is parallel to the first direction DR1 and is shorter than the upper side, and two lateral sides which connect the upper and lower sides.

As viewed from the second direction DR2, the first protrusions P1_1 protrude beyond the upper side of the first extension EX1_1. As viewed from the second direction DR2, the first protrusions P1_1 protrude beyond the left side of the first extension EX1 in the leftward direction.

The first extension EX1_1 includes a top surface which extends from the upper side of the inverted trapezoidal shape of the first extension EX1_1 in the second direction DR2, a bottom surface which extends from the lower side of the first extension EX1_1 in the second direction DR2, and side surfaces which extend from the two lateral sides of the first extension EX1_1 in the first direction DR1. The side surface on the left of the first extension EX1_1 may be defined as a left-side surface, and the side surface on the right of the first extension EX1_1 may be defined as a right-side surface.

As viewed from the second direction DR2, the first grooves G1_1 are defined in the first extension EX1 on the right sides of the first protrusions P1_1. The first grooves G1_1 may be defined as recesses from parts of the top surface and right-side surface of the first extension EX1_1 that are on the right sides of the first protrusions P1_1. Parts of the first extension EX1_1 that define the first grooves G1_1 may be concavely curved.

Referring back to FIGS. 45 through 50, as viewed from the first direction DR1, the cross-sectional area of the first link part grooves LH1 may be smaller than the cross-sectional area of the first metal plate holes MH1. As viewed from the first direction DR1, the first metal plate holes MH1 may be disposed closer than the first link part grooves LH1 to the first extension EX1_1. That is, the first metal plate holes MH1 may be disposed between the first extension EX1_1 and the first link part grooves LH1.

Each of the first joint units JP1_1 further includes one or more first guide parts GD1 which extend from the bottom surface of the first extension EX1_1 in the third direction DR3. The first guide parts GD1 guide second guide parts GD2 (refer to FIGS. 24 to 26), which are included in each of third and fourth supporting members SM3_1 and SM4_1, to be folded along a predetermined curved trajectory.

The first guide parts GD1 include sidewalls SW which extend from the bottom surface of the first extension EX1_1, at each of both ends of the first extension EX1, in the third direction DR3 and hooks HK which extend from the sidewalls SW in the second direction DR2.

As viewed from the first direction DR1, outer sides of the sidewalls SW may have a predetermined slope with respect to the bottom surface of the respective first joint unit JP1_1 and may extend slantingly in the third direction DR3, and inner sides of the sidewalls SW may extend perpendicularly from the bottom surface of the respective first joint unit JP1_1 in the third direction DR3. However, the invention is not limited to this. In an exemplary embodiment, the outer sides and inner sides of the sidewalls SW may be parallel and may extend either slantingly or perpendicularly from the bottom surface of the respective first joint unit JP1_1 in the third direction DR3, for example.

The hooks HK may extend from the sidewalls SW in the second direction DR2. Upper sides of the hooks HK may be parallel to the upper side of the first extension EX1_1. The top surfaces of the hooks HK may be in contact with the second guide parts GD2, which are included in each of the third and fourth supporting members SM3_1 and SM4_1, and may be flat or curved for smooth sliding of the second guide parts GD2.

As viewed from the second direction DR2, the hooks HK may be in the shape of a rectangle, an inverted trapezoid, a circle, or a semicircle. The flatter the top surfaces of the hooks HK are, the more firmly the hooks HK may support the second guide parts GD2, and the more curved the top surfaces of the hooks HK are, the more smoothly the second guide parts GD2 may slide.

Each of the first joint units JP1_1 further includes protrusions PT (refer to FIG. 14) which extend from the bottom surface of the first extension EX1_1, at each of both ends of the first extension EX1_1, in the third direction DR3. The protrusions PT may be a predetermined distance apart from the hooks HK. In this case, as viewed from the first direction DR1, the protrusions PT may substantially form rectangular holes. As a result, shakes in the second guide parts GD2 during the sliding of the second guide parts GD2 along the hooks HK may be prevented.

Each of the first joint units JP1_1 may further include a tunnel unit TU which extends from the bottom surface of the first extension EX1_1, in the middle of the first extension EX1_1, in the third direction DR3.

As viewed from the first direction DR1, the tunnel unit TU may be in the shape of an inverted trapezoid, but the invention is not limited thereto. In an alternative exemplary embodiment, as viewed from the first direction DR1, the tunnel unit TU may be in the shape of a rectangle or an ellipse. The thickness, in the first direction DR1, of the tunnel unit TU may be substantially the same as the thickness, in the first direction DR1, of the first extension EX1_1.

One or more penetrations PN may be defined in the tunnel unit TU. The penetrations PN are holes that penetrate both sides of the tunnel unit TU in the first direction DR1 and are passages that guide arms GA of the second guide parts GD2 slide along. The top surfaces and the bottom surfaces of the penetrations PN may be substantially parallel to the top surface of the first extension EX1_1.

Two penetrations PN may be defined, one at each of two sides of the tunnel unit TU, symmetrically, but the invention is not limited thereto. The number and locations of penetrations PN may vary depending on the size of the third and fourth supporting members SM3_1 and SM4_1. The penetrations PN may be in the shape of rectangles, inverted trapezoids, or rectangles with semicircular shapes on both sides in a cross-sectional view.

A height L1 from the top surfaces of the hooks HK to the bottom surface of the first extension EX1_1 may be the same as a height L2 from the bottom surfaces of the penetrations PN to the top surfaces of the penetrations PN. A width W1, in the second direction DR2, of the hooks HK may be the same as a width W2, in the second direction DR2, of the penetrations PN. That is, the size of rectangular openings defined by the sidewalls SW, the hooks HK, and the protrusions PT may be the same as the size of the penetrations PN defined in the tunnel unit TU, but the invention is not limited thereto. In an alternative exemplary embodiment, the size of the rectangular openings defined by the sidewalls SW, the hooks HK, and the protrusions PT may differ from the size of the penetrations PN defined in the tunnel unit TU depending on the shape of the second guide parts GD2.

Referring to FIGS. 45 and 51, the second joint units JP2_1 have substantially the same structure as the first joint units JP1_1 and are disposed symmetrically with the first joint units JP1_1. That is, when the second joint units JP2_1 are rotated 180 degrees, the structure of the second joint units JP2_1 becomes the same as the structure of the first joint units JP1. Each of the second joint units JP2_1 includes a second extension EX2_1 which is symmetrical with the first extension EX1_1 and second protrusions P2_1 which are symmetrical with the first protrusions P1_1.

The second extension EX2_1 has substantially the same structure as the first extension EX1. In the second extension EX2_1, second grooves G2_1 which are symmetrical with the first grooves G1_1 are defined. In the second protrusions P2_1, second holes H2_1 which are symmetrical with first holes H1_1 are defined.

Second metal plate holes MH2 that the metal plates MP may penetrate may be defined in the second protrusions P2_1. As viewed from the first direction DR1, the cross-sectional area of the second metal plate holes MH2 may be greater than the cross-sectional area of the metal plates MP. As viewed from the second direction DR2, the second metal plate holes MH2 may be holes that penetrate the right and left sides of the respective second protrusions P2_1.

Second link parts LK2 may be disposed on the rear surfaces of the second protrusions P2_1 to prevent the second joint units JP2_1 and the third joint unit JP3_1 from being spaced apart from one another in the second direction DR2 when the second joint units JP2_1 and the third joint unit JP3_1 are coupled to one another. The second link parts LK2 may extend in the first direction DR1 from the rear surfaces of the second protrusions P2_1. The length by which the second link parts LK2 extend in the first direction DR1 may be smaller than the length by which the second protrusions P2_1 extend in the first direction DR1.

In an exemplary embodiment, second link part grooves may be defined to correspond to the second link parts LK2 of a corresponding adjacent second joint unit JP2_1. As viewed from the first direction DR1, the second link parts LK2 and the second link part grooves may overlap. As viewed from the first direction DR1, the cross-sectional area of the second link part grooves may be greater than the cross-sectional area of the second link parts LK2. As viewed from the second direction DR2, the second link part grooves may not penetrate the left and right sides of the respective second protrusions P2_1. That is, the second link part grooves may be recesses that are defined on the left sides of the respective second protrusions P2_1.

The second extension EX2_1 is in the shape of an inverted trapezoid having an upper side which is parallel to the first direction DR1, a lower side which is parallel to the first direction DR1 and is shorter than the upper side, and two lateral sides which connect the upper and lower sides.

As viewed from the second direction DR2, the second protrusions P2_1 protrude beyond the upper side of the second extension EX2_1. As viewed from the second direction DR2, the second protrusions P2_1 protrude beyond the right side of the second extension EX2 in the rightward direction.

The second extension EX2_1 includes a top surface which extends from the upper side of the inverted trapezoidal shape of the second extension EX2_1 in the second direction DR2, a bottom surface which extends from the lower side of the second extension EX2_1 in the second direction DR2, and side surfaces which extend from the two lateral sides of the second extension EX2_1 in the first direction DR1. The side surface on the left of the second extension EX2_1 may be defined as a left-side surface, and the side surface on the right of the second extension EX2_1 may be defined as a right-side surface.

As viewed from the second direction DR2, the second grooves G2_1 are defined in the second extension EX2_1 on the right sides of the second protrusions P2_1. The second grooves G2_1 may be defined as recesses from parts of the top surface and right-side surface of the second extension EX2_1 that are on the left sides of the second protrusions P2_1. Parts of the second extension EX2_1 that define the second grooves G2_1 may be concavely curved.

Figure 52:
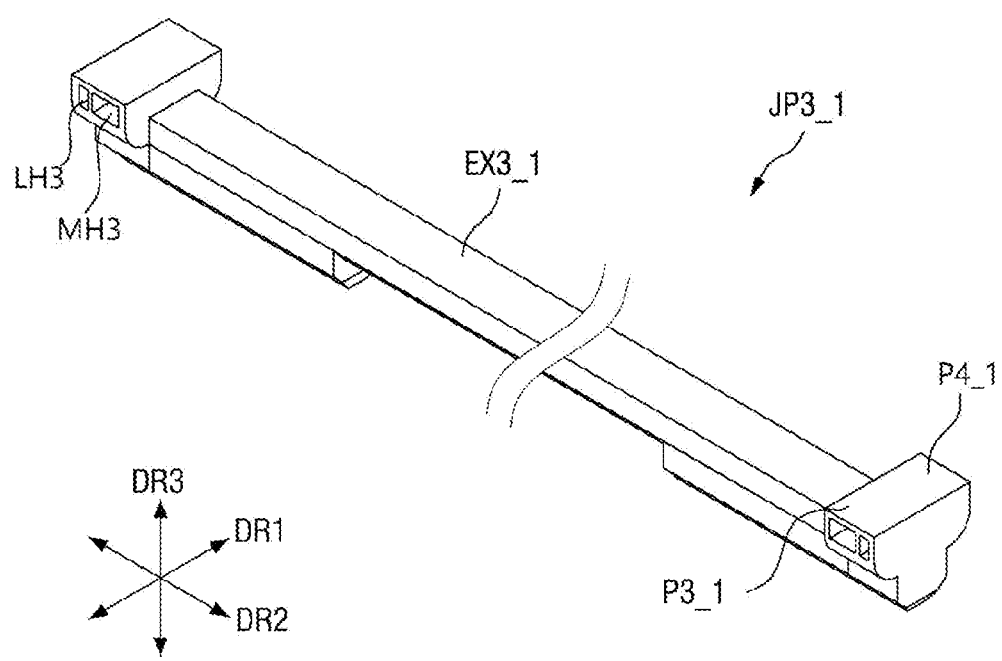
FIG. 52 is a perspective view illustrating the third joint unit of FIG. 45.

FIG. 52 is a perspective view illustrating the third joint unit of FIG. 45.

Referring to FIGS. 45 and 52, the third joint unit JP3_1 includes a third extension EX3_1, third protrusions P3_1, and fourth protrusions P4_1. As viewed from the second direction DR2, the third extension EX3_1 is in the shape of an inverted trapezoid. The third protrusions P3_1 and the fourth protrusions P4_1 protrude in the first direction DR1 at both ends of the third extension EX3_1, which are defined as being opposite to each other when viewed from the second direction DR2.

The third protrusions P3_1 have the same structure as the first protrusions P1_1 and overlap with the first protrusions P1_1, as viewed from the first direction DR1. The fourth protrusions P4_1 have the same structure as the second protrusions P2_1 and overlap with the second protrusions P2_1, as viewed from the first direction DR1. The third protrusions P3_1 and the fourth protrusions P4_1 protrude in opposite directions at both ends of the third extension EX3_1. The third protrusions P3_1 protrude in the leftward direction, and the fourth protrusions P4_1 protrude in the rightward direction.

The third protrusions P3_1 and the fourth protrusions P4_1 may include third metal plate holes MH3 that the metal plates MP may penetrate. As viewed from the second direction DR2, the third metal plate holes MH3 may be holes that penetrate the left and right sides of the respective third or fourth protrusions P3_1 or P4_1.

Third link part grooves LH3 may be defined in the third protrusions P3_1. As viewed from the first direction DR1, the third link part grooves LH3 may overlap with the first link parts LK1. Fourth link parts grooves LH4 may be defined in the fourth protrusions P4_1. As viewed from the first direction DR1, the fourth link part grooves LH4 may overlap with second link parts LK2 of a second joint unit JP2_1 adjacent to the third joint unit JP3_1.

Figure 53:
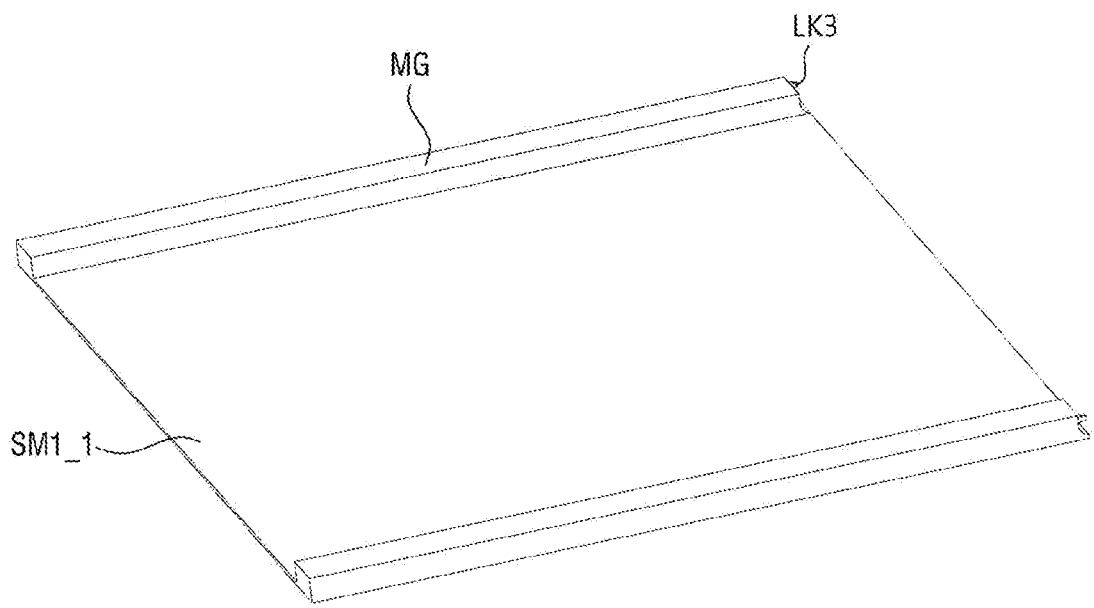
FIG. 53 is a perspective view illustrating a first side of the first supporting member of FIG. 45.

FIG. 53 is a perspective view illustrating the first side of the first supporting member of FIG. 45.

Referring to FIGS. 45 and 53, the first supporting member SM1_1 may include metal plate guide parts MG which are disposed at both ends, in the second direction DR2, of the first supporting member SM1_1. The metal plate guide parts MG may include metal plate holes (not shown), third link parts LK3, and third grooves G3_1 in areas where the first supporting member SM1_1 is coupled to a first joint unit JP1_1 adjacent to the first supporting member SM1_1. As illustrated in FIG. 53, coupling protrusions ASP which are coupled to the coupling holes ASH in each of the coupling areas ASA of each of the metal plates MP may be provided on the inside of each of the metal plate guide parts MG.

In the areas where the first supporting member SM1_1 is coupled to the first joint unit JP1_1 adjacent to the first supporting member SM1_1, the third grooves G3_1, which have the same shape as first grooves G1_1 of the first joint unit JP1_1 adjacent to the first supporting member SM1_1, are defined. As viewed from the first direction DR1, the third grooves G3_1 overlap with the first protrusions P1_1.

Figure 54:
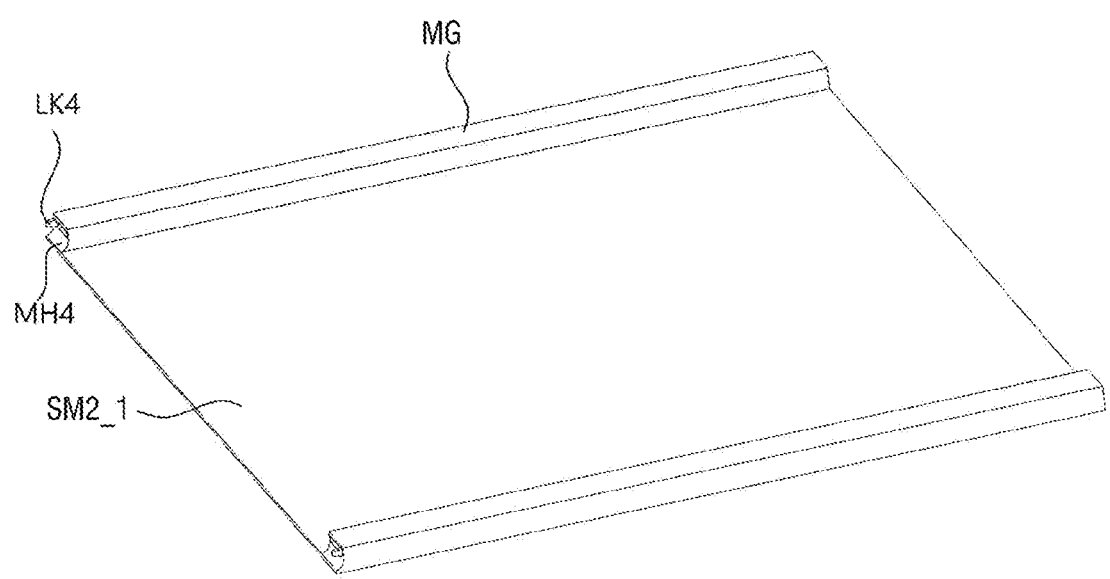
FIG. 54 is a perspective view illustrating a first side of the second supporting member of FIG. 45.

FIG. 54 is a perspective view illustrating the first side of the second supporting member of FIG. 45.

Referring to FIGS. 45 and 54, the second supporting member SM2_1 may include metal plate guide parts MG which are disposed at both ends, in the second direction DR2, of the second supporting member SM2_1. The metal plate guide parts MG may include fourth metal plate holes MH4, fourth link parts LK4, and fourth grooves G4_1 in areas where the second supporting member SM2_1 is coupled to a second joint unit JP2_1 adjacent to the second supporting member SM2_1. As illustrated in FIG. 54, coupling protrusions ASP which are coupled to the coupling holes ASH in each of the coupling areas ASA of each of the metal plates MP may be provided on the inside of each of the metal plate guide parts MG.

In the areas where the second supporting member SM2_1 is coupled to the second joint unit JP2_1 adjacent to the second supporting member SM2_1, the fourth grooves G4_1, which have the same shape as second grooves G2_1 of the second joint unit JP2_1 adjacent to the second supporting member SM2_1, are defined. As viewed from the first direction DR1, the fourth grooves G4_1 overlap with the second protrusions P2_1.

Figure 55:
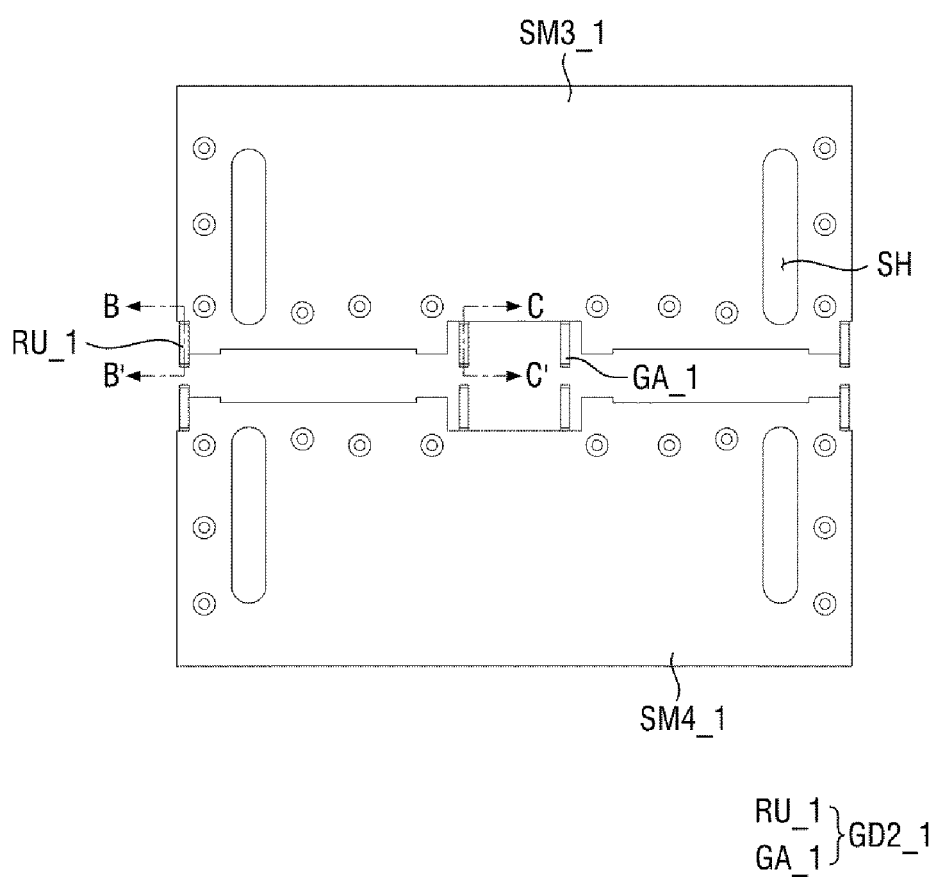
FIG. 55 is a plan view illustrating another exemplary embodiment of third and fourth supporting members according to the invention.
Figure 56:
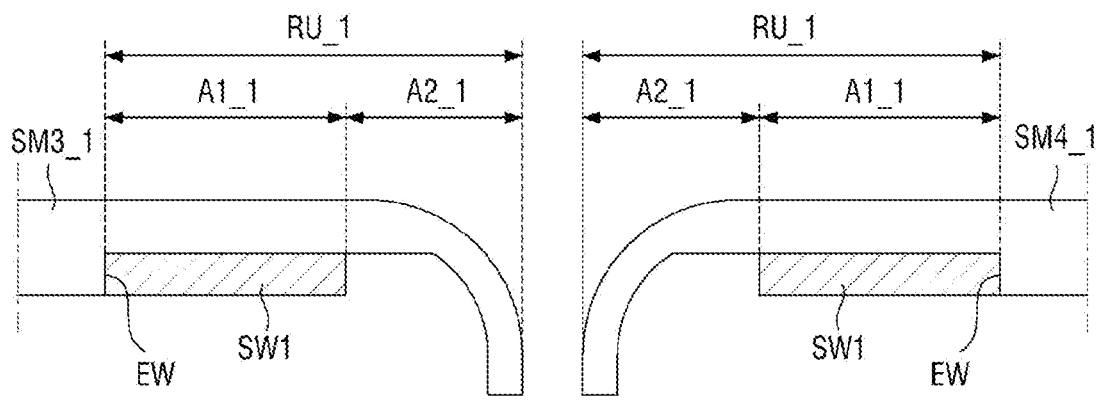
FIG. 56 is a cross-sectional view, taken along line B-B' of FIG. 55, of the third supporting member of FIG. 55.
Figure 56:
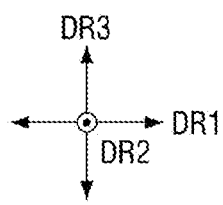
Figure 57:
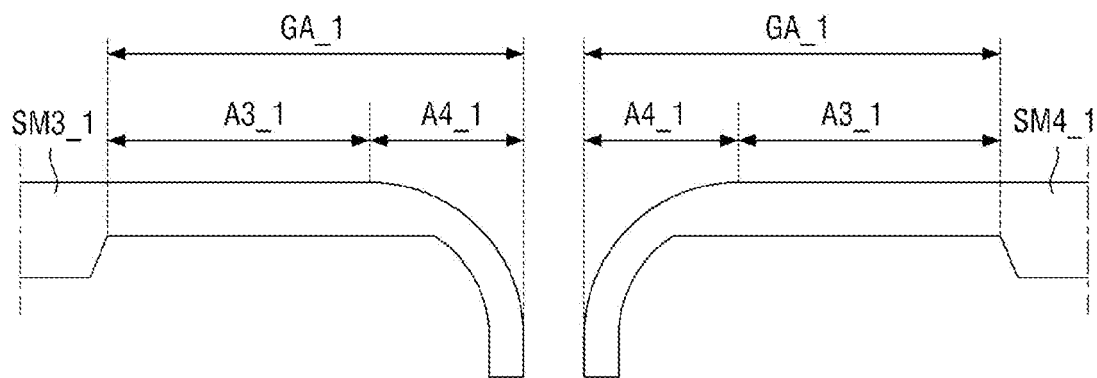
FIG. 57 is a cross-sectional view, taken along line C-C' of FIG. 55, of the third supporting member of FIG. 55.
Figure 57:
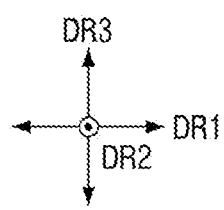
Figure 58:
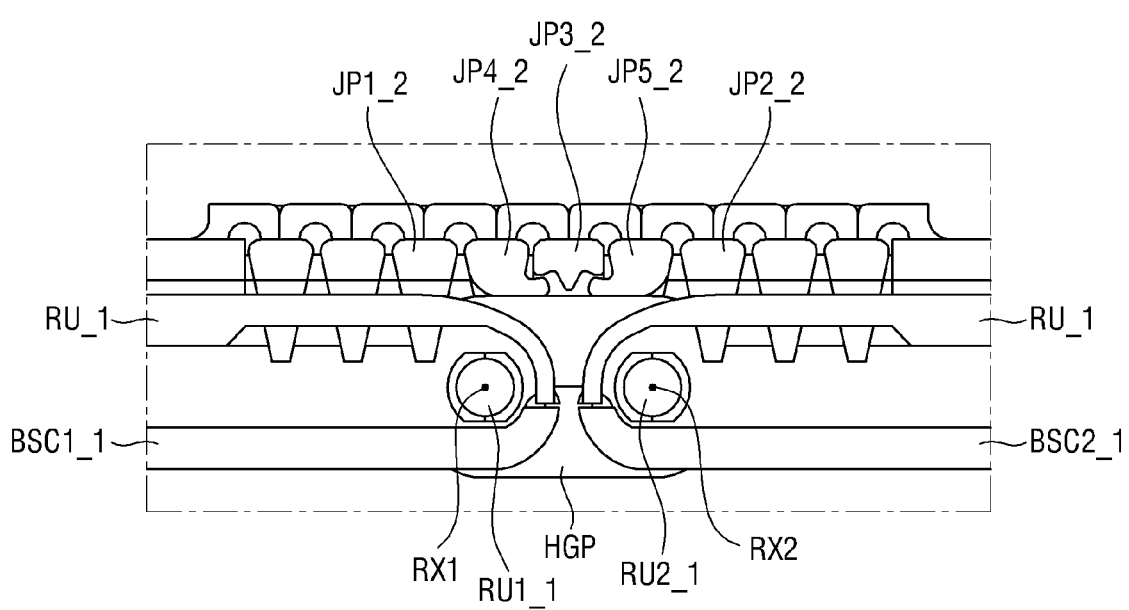
FIGS. 58 and 59 illustrate the exemplary embodiment of a display device of FIG. 55 in its folded state.
Figure 59:
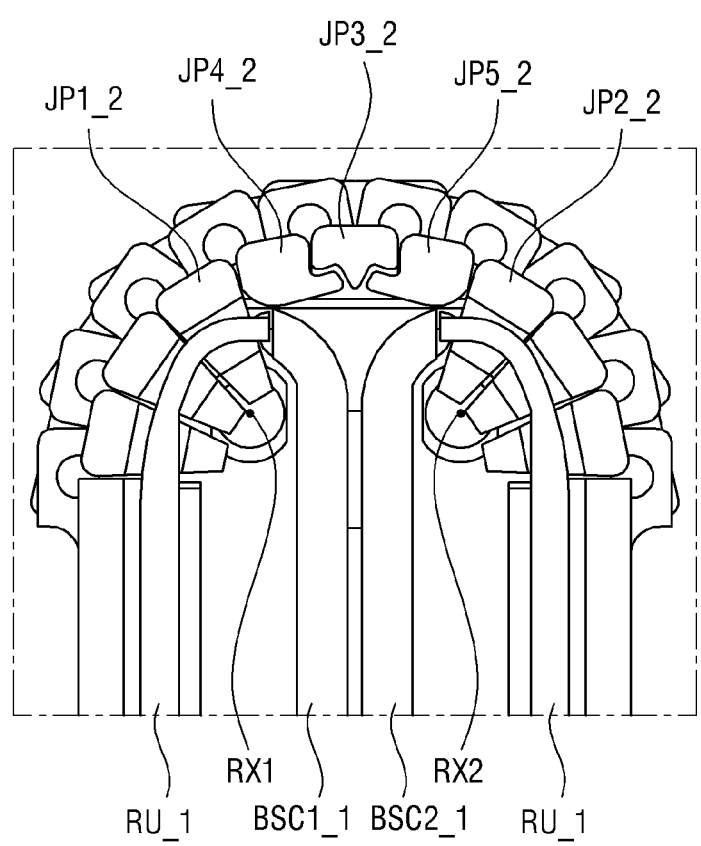

FIG. 55 is a plan view illustrating another exemplary embodiment of third and fourth supporting members according to the invention. FIG. 56 is a cross-sectional view, taken along line B-B' of FIG. 55, of the third supporting member of FIG. 55. FIG. 57 is a cross-sectional view, taken along line C-C' of FIG. 55, of the third supporting member of FIG. 55. FIGS. 58 and 59 illustrate a display device according to the exemplary embodiment of FIG. 55 in its folded state.

The exemplary embodiment of FIGS. 55 through 59 differs from the exemplary embodiment of FIGS. 26 through 29 in that a second area A2_1 of a rail unit RU_1 is bent at the end thereof to be placed in contact with first and second rear covers BSC1_1 and BSC2_1 and thus to form a closed curve, and that a fourth area A4_1 of a guide arm GA_1, which extends from a third area A3_1 of the guide arm GA_1, is bent at the end thereof to be placed in contact with the first and second rear covers BSC1_1 and BSC2_1 and thus to form a closed curve. Also, the exemplary embodiment of FIGS. 55 through 59 differs from the exemplary embodiment of FIGS. 33 through 35 in that the bottom surface of a third joint unit JP3_2 has a rib structure, and that first and second joint units JP1_2 and JP2_2 adjacent to the third joint unit JP3_2 do not include first guide parts GD1.

Specifically, the third and fourth supporting members SM3_1 and SM4_1 may be opposite to each other, and one or more second guide parts GD2_1 may be provided on the first sides of the third and fourth supporting members SM3_1 and SM4_1 that are opposite to each other.

The second guide parts GD2_1 include rail units RU_1 which overlap with hooks HK of the first guide parts GD1 and along which the hooks HK may slide. The rail units RU_1 may be disposed symmetrically on both sides of the array of the third and fourth supporting members SM3_1 and SM4_1.

Each of the rail units RU_1 may be divided into a first area A1_1 including a sidewall SW1 and a second area A2_1 not including the sidewall SW1. The second area A2_1 may extend from the first area A1_1 and may be bent along a predetermined curved trajectory. The end of the second area A2_1 may be in contact with the first and second rear covers BSC1_1 and BSC2_1 to form a closed curve.

A blocking wall EW may be disposed at one end of the first area A1_1. The blocking wall EW may extend perpendicularly from the sidewall SW1 of the first area A1_1 in the second direction DR2. Due to the presence of the sidewall SW1 and the blocking wall EW, a height difference may be generated between the third and fourth supporting members SM3_1 and SM4_1 (refer to FIG. 55).

The second guide parts GD2_1 may further include one or more guide arms GA_1 which overlap with tunnel units TU of first joint units JP1_2 and slide along the penetrations PN of each of the tunnel units TU. The guide arms GA_1 may be disposed in the middle of the third and fourth supporting members SM3_1 and SM4_1. In an exemplary embodiment, two guide arms GA_1 may be disposed symmetrically in the middle of the third and fourth supporting members SM3_1 and SM4_1, for example.

Each of the guide arms GA_1 includes a third area A3_1 which extends in parallel to the first direction Dr1 and a fourth area A4_1 which extends from the third area A3_1. The fourth area A4_1 may extend from the third area A3_1 and may be bent along the predetermined curved trajectory.

The end of the fourth area A4_1 may be in contact with the first and second rear covers BSC1_1 and BSC2_1 to form a closed curve.

The length, in the first direction DR1, of the third area A3_1 of each of the guide arms GA_1 and the length, in the first direction DR1, of the first area A1_1 of each of the rail units RU_1 may be the same, and the length, in the first direction DR1, of the fourth area A4_1 of each of the guide arms GA_1 and the length, in the first direction DR1, of the second area A2_1 of each of the rail units RU_1 may be the same.

The thickness, in the third direction DR3, of the guide arms GA_1 may be smaller than the thickness, in the third direction DR3, of the third and fourth supporting members SM3_1 and SM4_1. Due to the thickness difference between the guide arms GA_1 and the third and fourth supporting members SM3_1 and SM4_1, a height difference may be generated between the guide arms GA_1 and the third and fourth supporting members SM3_1 and SM4_1, and as a result, the third and fourth supporting members SM3_1 and SM4_1 may be prevented from advancing further when a folding member 200 is unfolded.

Since the second area A2_1 of each of the rail units RU_1 and the fourth area A4_1 of each of the guide arms GA_1 are placed in contact with the first and second rear covers BSC1_1 and BSC2_1 to form closed curves, the hooks HK of the first guide parts GD1 may be prevented from escaping the rail units RU_1 of the third supporting members SM3_1, and the penetrations PN of each of the first joint units JP1_2 may be prevented from escaping the guide arms GA_1 of the third supporting member SM3_1. As a result, the folding member 200 may be prevented from being damaged and may be properly folded or unfolded.

Referring to FIGS. 58 and 59, the bottom surface of the third joint unit JP3_2 has a rib structure. Here, the rib structure is disposed at the bottom of the third joint unit JP3_2 and is defined as a groove extending in parallel to the second direction DR2 to be inclined with respect to the third direction DR3.

The first joint unit JP1_2 adjacent to the third joint unit JP3_2 may have a protruding structure that extends in the first direction DR1 to complementarily engage with the rib structure of the third joint unit JP3_2 when the folding member 200 is folded. The second joint unit JP2_2 adjacent to the third joint unit JP3_2 may have a protruding structure that extends in the first direction DR1 to complementarily engage with the rib structure of the third joint unit JP3_2 when the folding member 200 is folded. Accordingly, when the folding member 200 is unfolded, a flat surface may be maintained. The fourth joint unit JP4_2 may be disposed between the first joint unit JP1_2 and the third joint unit JP3_2, and the fifth joint unit JP5_2 may be disposed between the second joint unit JP2_2 and the third joint unit JP3_2.

Figure 60:
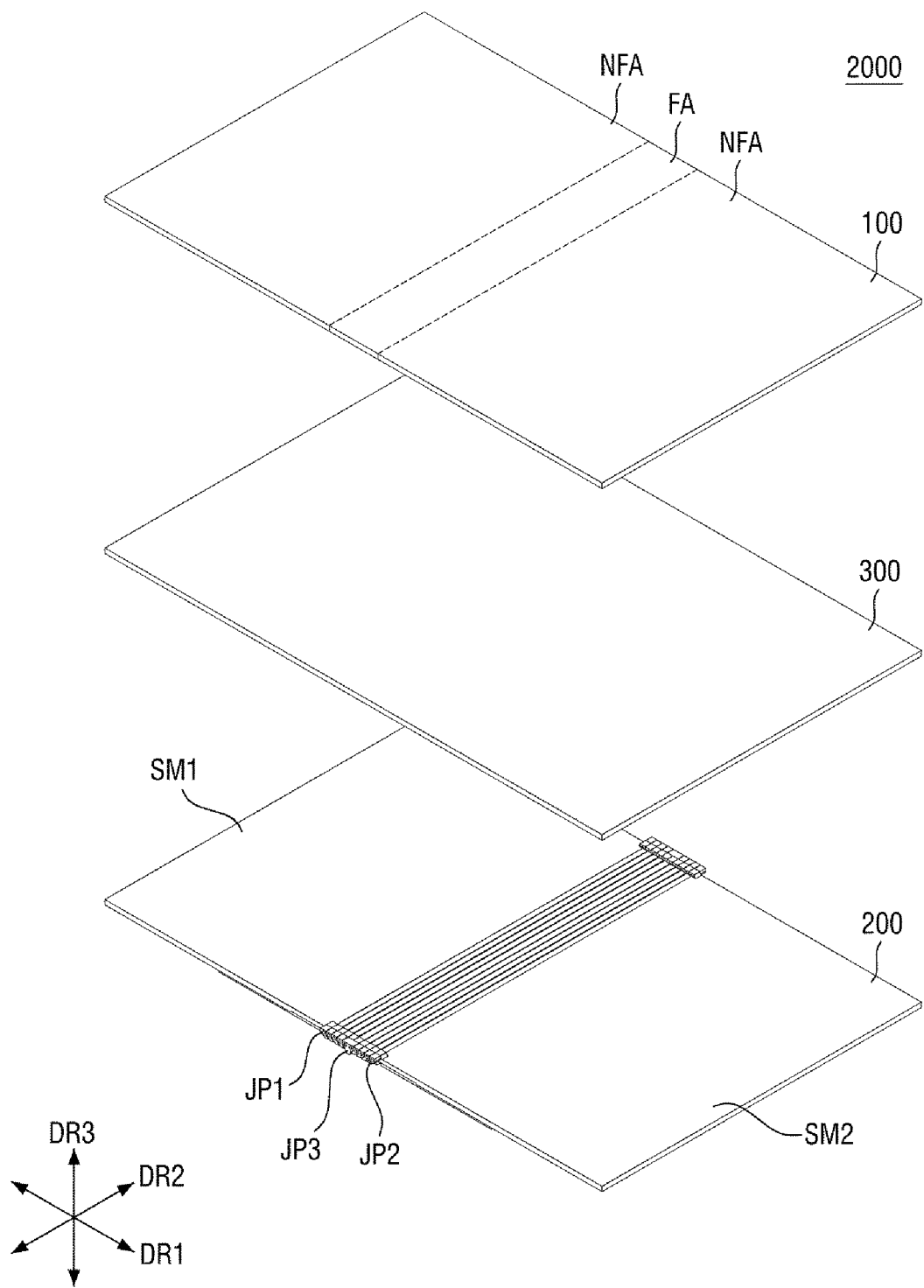
FIG. 60 is an exploded perspective view illustrating another exemplary embodiment of a display device according to the invention in its unfolded state.
Figure 61:
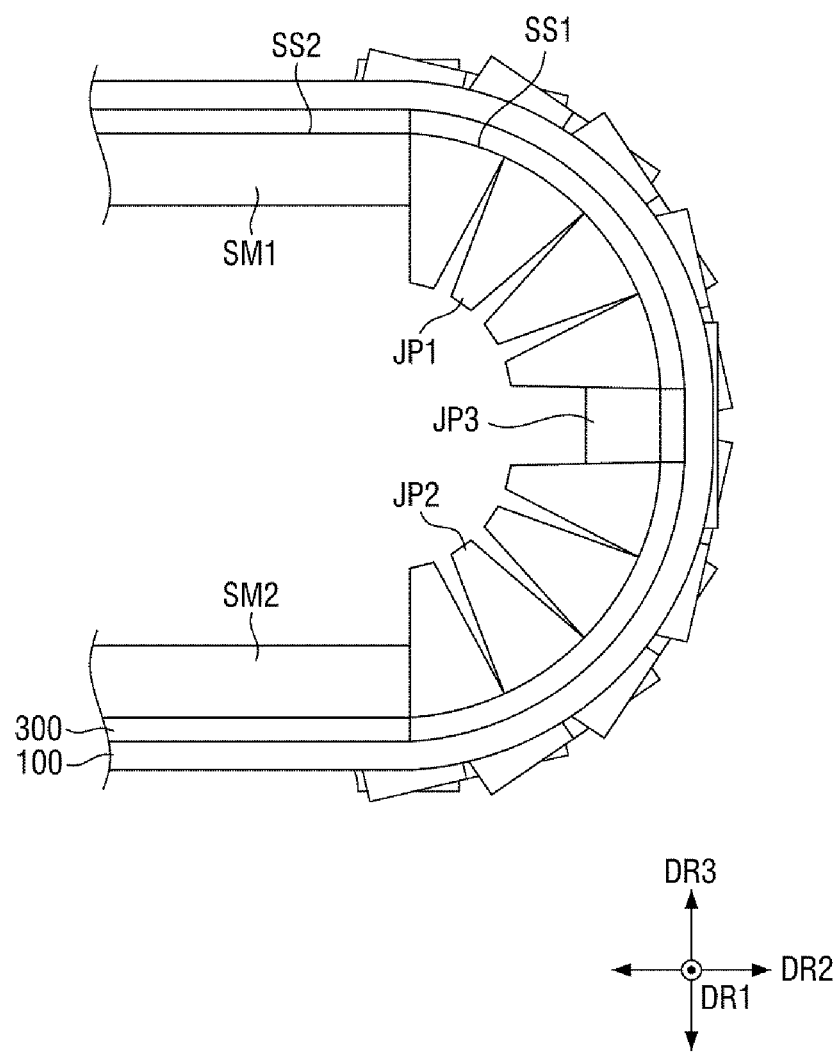
FIG. 61 is a cross-sectional view illustrating the display device of FIG. 60 in its folded state.

FIG. 60 is an exploded perspective view illustrating another exemplary embodiment of a display device according to the invention in its unfolded state. FIG. 61 is a cross-sectional view illustrating the display device of FIG. 60 in its folded state.

Referring to FIGS. 60 and 61, a display device 2000 differs from the display device 1000 of FIGS. 4 and 5 in that it further includes a protective member 300 disposed between a display module 100 and a folding member 200. The display device 2000 may provide almost the same benefits as the display device 1000 of FIGS. 4 and 5.

Specifically, the protective member 300 are disposed on the top surfaces of a first supporting member SM1, a second supporting member SM2, and a plurality of joint units (JP1, JP2, and JP3) to overlap the first supporting member SM1, the second supporting member SM2, and the joint units (JP1, JP2, and JP3). Since the protective member 300 is disposed on the joint units (JP1, JP2, and JP3), the risk of the display panel 100 being pressed by the joint units (JP1, JP2, and JP3) in a folding area FA may be further reduced.

The protective member 300 may be provided as a metal sheet having sufficient rigidity to withstand the folding and unfolding of the display module 100. In an exemplary embodiment, the thickness of the metal sheet is preferably 0.1 millimeter (mm) or less, for example. The metal sheet may include an invar alloy, but the invention is not limited thereto. In an alternative exemplary embodiment, the metal sheet may include steel use stainless ("SUS"), for example.

Specifically, the protective member 300 may support the bottom surface of the display module 100 and may cover the first supporting member SM1, the second supporting member SM2, and the joint units (JP1, JP2, and JP3). That is, the protective member 300 may correspond to the size of the display module 100 and may be provided to have a size corresponding to the area occupied by the display module 100 over the first supporting member SM1, the second supporting member SM2, and the joint units (JP1, JP2, and JP3).

The folding member 200 faces the bottom surface of the protective member 300 and is coupled to the protective member 300. The folding member 200 may include two supporting members, i.e., the first and second supporting members SM1 and SM2, and the joint units (JP1, JP2, and JP3), which correspond to the folding area FA.

The joint units (JP1, JP2, and JP3) may be arranged side by side in the first direction DR1 and may be in the shape of rods extending in the second direction DR2, which intersects the first direction DR1. The height of the joint units (JP1, JP2, and JP3) may be smaller than the height of the first and second supporting members SM1 and SM2.

Each of the joint units (JP1, JP2, and JP3) has a first supporting surface SS1 that faces the display module 100, and each of the first and second supporting members SM1 and SM2 has a second supporting surface SS2 that faces the display module 100. The folding area FA of the display module 100 is disposed on the first supporting surfaces SS1 of the joint units (JP1, JP2, and JP3), and non-folding areas NFA of the display module 100 are disposed on the second supporting surfaces SS2 of the first and second supporting members SM1 and SM2. When the display device 2000 is unfolded, the first supporting surfaces SS1 of the joint units (JP1, JP2, and JP3) and the second supporting surfaces SS2 of the first and second supporting members SM1 and SM2 are arranged side by side in the first direction DR1 and are placed at the same height.

Flat areas NFA of the protective member 300 may be attached to the second supporting surfaces SS2 of the first and second supporting members SM1 and SM2 by adhesive layers (not illustrated), but a folding area FA of the protective member 300 is not attached to the joint units (JP1, JP2, and JP3). That is, the flat areas NFA may be fixed to the second supporting surfaces SS2, but the folding area FA may remain either in contact with, or slightly apart from, the first supporting surfaces SS1 of the joint units (JP1, JP2, and JP3).

The folding member 200 and the protective member 300 may be coupled to each other by an organic/inorganic material-based adhesive layer, but the invention is not limited thereto. In an alternative exemplary embodiment, the folding member 200 and the protective member 300 may be coupled by a thermal bonding film ("TBF").

Figure 62A:
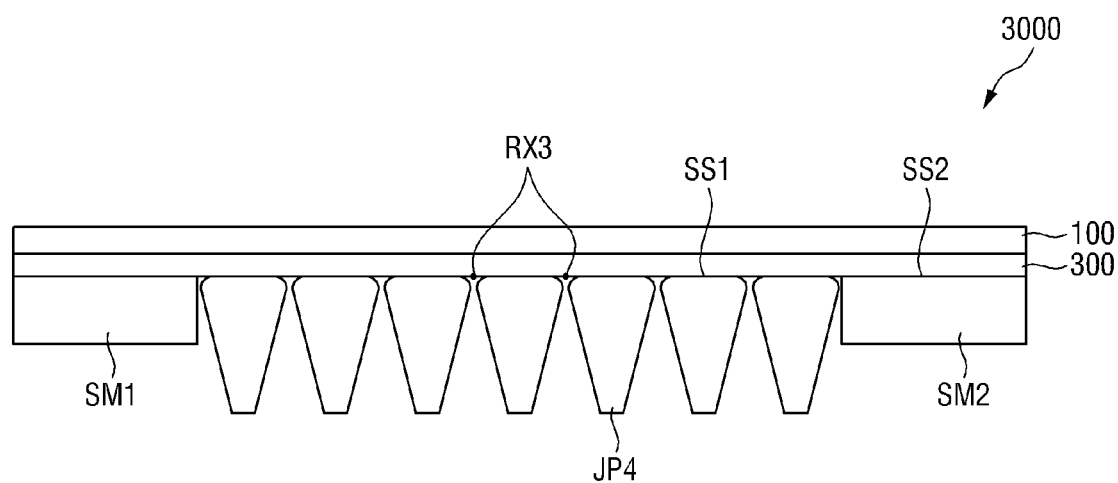
FIG. 62A is an exploded perspective view illustrating another exemplary embodiment of a display device according to the invention in its unfolded state.
Figure 62B:
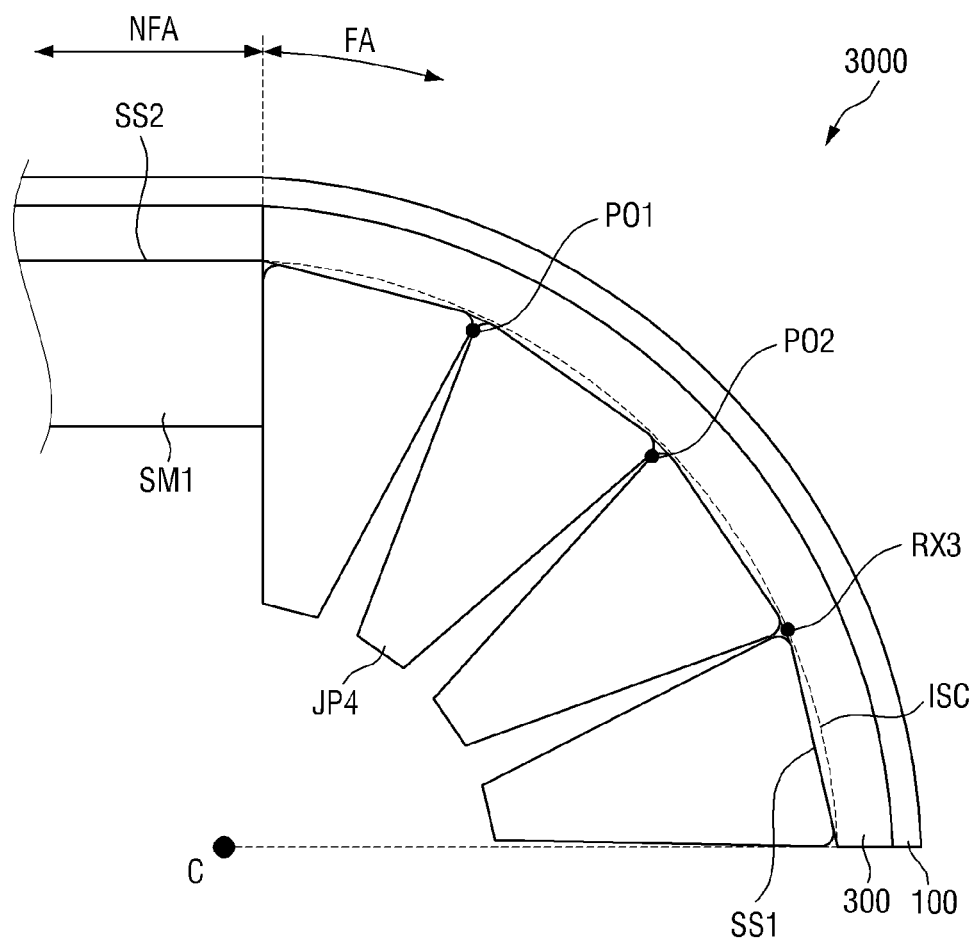
FIG. 62B is a cross-sectional view illustrating the display device of FIG. 62A in its folded state.

FIG. 62A is an exploded perspective view illustrating another exemplary embodiment of a display device according to the invention in its unfolded state. FIG. 62B is a cross-sectional view illustrating the display device of FIG. 62A in its folded state.

Referring to FIGS. 62A and 62B, a display device 3000 differs from the display device 2000 of FIGS. 60 and 61 in that a plurality of fourth joint units JP4 thereof do not include protrusions (P1 and P2). The display device 3000 may provide almost the same benefits as the display device 2000 of FIGS. 60 and 61.

Specifically, a protective member 300 overlaps with a first supporting member SM1, a second supporting member SM2, and the fourth joint units JP4 of a folding member 200. The fourth joint units JP4 are directly coupled to the protective member 300 by adhesive layers.

The fourth joint units JP4 are coupled to the protective member 300 by the adhesive layers to be able to rotate along two rotational axes RX3. When the display device 3000 is unfolded, the rotational axes RX3 may be placed at the same height as first supporting surfaces SS1 and second supporting surfaces SS2 that face a display module 100.

When the display device 3000 is folded, a folding area FA of the display module 100 is deformed by being bent by 180 degrees, and a relatively large amount of stress is generated at each of multiple points PO1 and PO2 where each pair of adjacent first supporting surfaces SS1 adjoin each other. As a result, some of multiple layers that form the display module 100 may be damaged.

In an exemplary embodiment, the display module 100 may include multiple layers such as a flexible substrate, a display unit, a sealing layer, a touch sensor unit, a polarizing film, a cover window, and the like, for example. A hard coating layer of the cover window or an inorganic insulating layer of the display unit is brittle and is thus highly likely to be damaged by tensile deformation. Accordingly, some layers of the display module 100 are highly likely to be damaged due to an increase in stress when the display device 3000 is folded.

Both ends of each of the first supporting surfaces SS1 of the fourth joint units JP4 may be rounded to have a predetermined curvature. When the display device 3000 is folded, the multiple points PO1 and PO2 may be disposed inside an imaginary arc ISC connecting the second supporting surfaces SS2. Thus, the fourth joint units JP4 may be prevented from deforming the display module 100 by pushing the display module 100 away from a curvature center C of the imaginary arc ISC at the multiple points PO1 and PO2.

Figure 63A:
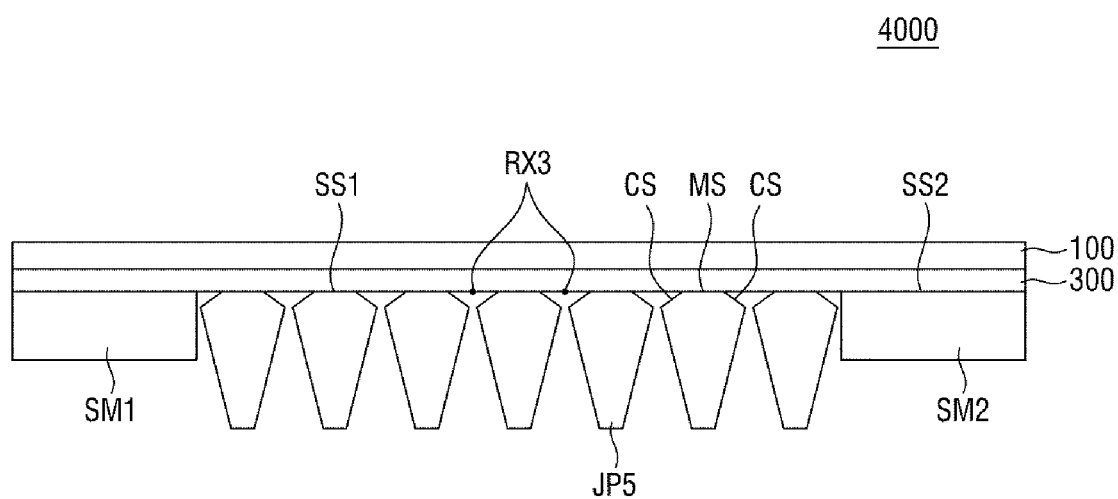
FIG. 63A is an exploded perspective view illustrating another exemplary embodiment of a display device according to the invention in its unfolded state.
Figure 63B:
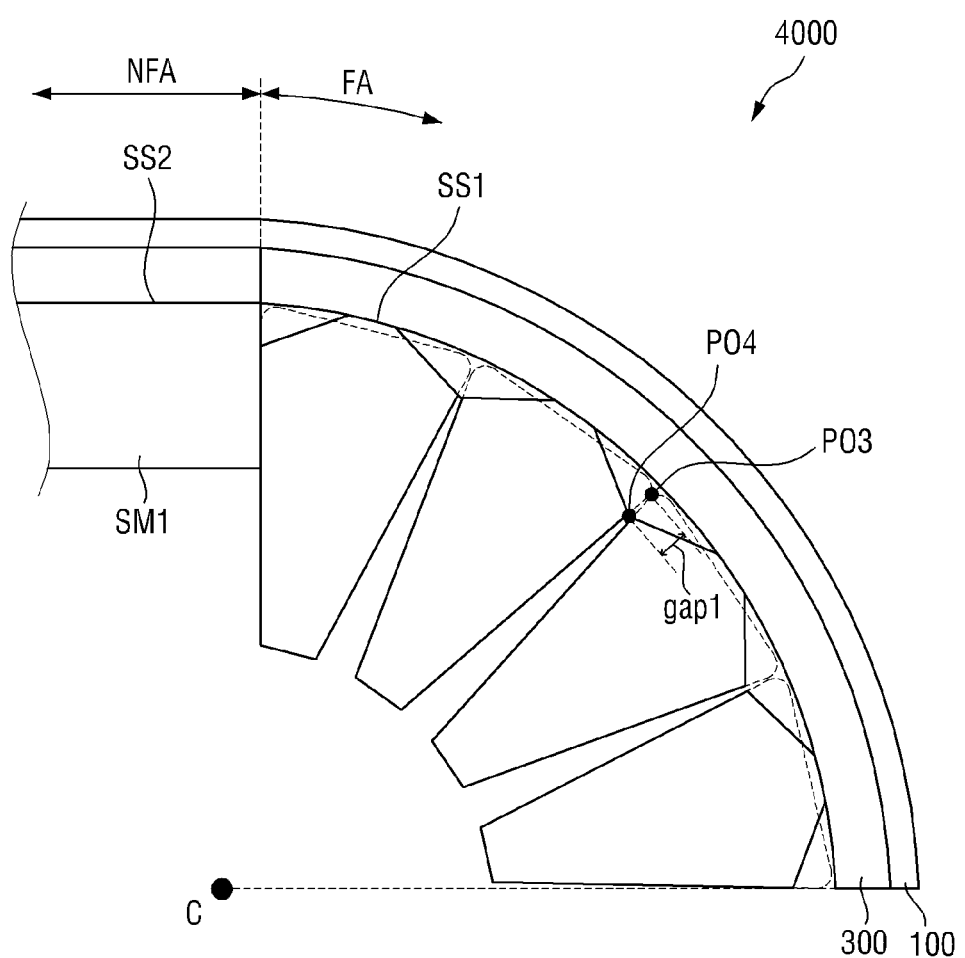
FIG. 63B is a cross-sectional view illustrating the display device of FIG. 63A in its folded state.

FIG. 63A is an exploded perspective view illustrating another exemplary embodiment of a display device according to the invention in its unfolded state. FIG. 63B is a cross-sectional view illustrating the display device of FIG. 63A in its folded state.

Referring to FIGS. 63A and 63B, a display device 4000 differs from the display device 3000 of FIGS. 62A and 62B in that each of a plurality of first supporting surfaces SS1 includes two chamfered surfaces CS on both sides thereof. The display device 4000 may provide almost the same benefits as the display device 3000 of FIGS. 62A and 62B.

Specifically, each of the first supporting surfaces SS1 may include a middle surface MS which is parallel to the first direction DR1 when the display device 4000 is unfolded, and two chamfered surfaces CS which are disposed on both sides of the middle surface MS. The two chamfered surfaces CS may have the same width and may have the same chamfer angle. In this case, each of the first supporting surfaces SS1 may be bilaterally symmetrical.

Since each of the first supporting surfaces SS1 includes two chamfered surfaces CS, multiple points where each pair of first supporting surfaces SS1 adjoin each other in a folded state may be closer than the multiple points PO1 and PO2 of FIGS. 62A and 62B to a curvature center C of a folding area FA.

That is, in the display device 3000 of FIGS. 62A and 62B in its folded state, a pair of adjacent first supporting surfaces SS1 may adjoin each other at a point PO3. On the contrary, in the display device 4000 in its folded state, a pair of adjacent first supporting surfaces SS1 may adjoin each other at a point PO4, which is closer than the point PO3 to the curvature center C.

The display device 4000 may separate the first supporting surfaces SS1 of fifth joint units JP5 from the display module 100 by a distance "gap1" between the points PO3 and PO4. Accordingly, when the display device 4000 is folded, the fifth joint units JP5 may minimize the generation of stress in the display module 100 substantially without causing the deformation of the display module 100.

Figure 64A:
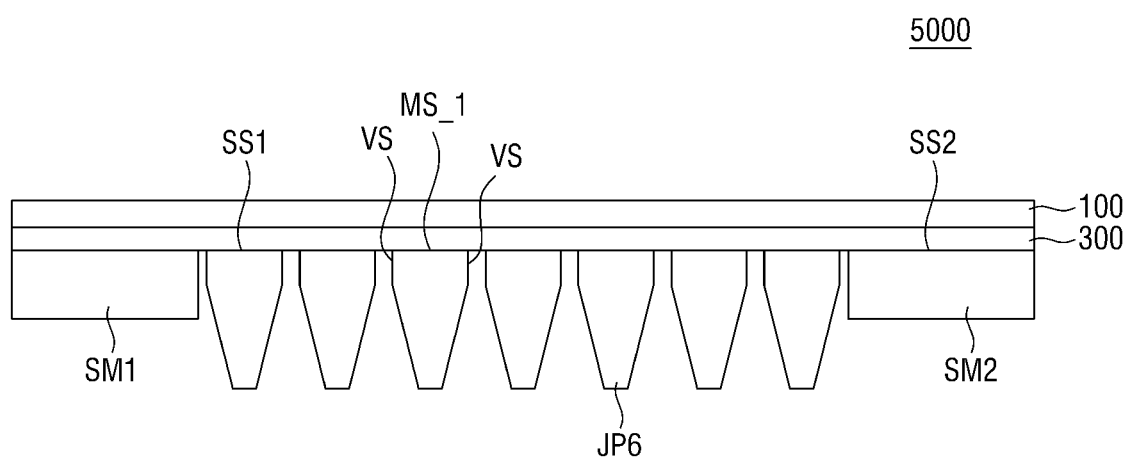
FIG. 64A is an exploded perspective view illustrating another exemplary embodiment of a display device according to the invention in its unfolded state.
Figure 64B:
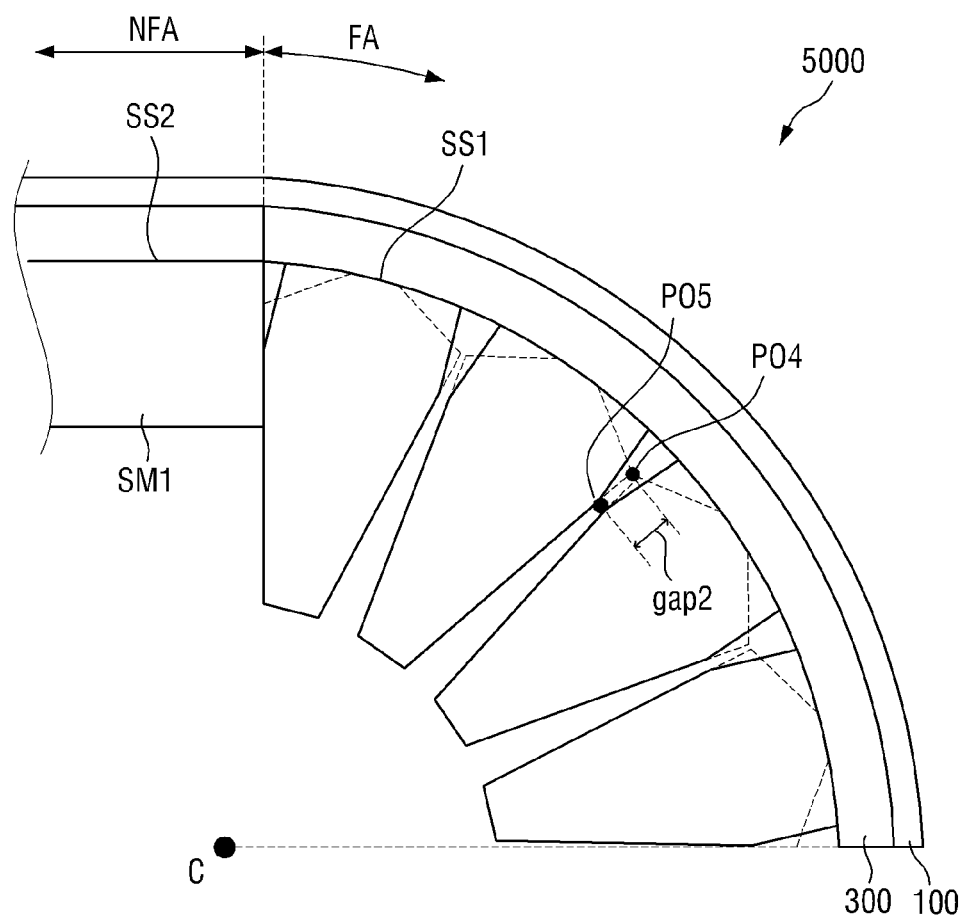
FIG. 64B is a cross-sectional view illustrating the display device of FIG. 64A in its folded state.

FIG. 64A is an exploded perspective view illustrating another exemplary embodiment of a display device according to the invention in its unfolded state. FIG. 64B is a cross-sectional view illustrating the display device of FIG. 64A in its folded state.

Referring to FIGS. 64A and 64B, a display device 5000 differs from the display device 4000 of FIGS. 63A and 63B in that each of a plurality of first supporting surfaces SS1 includes two vertical surfaces VS on both sides thereof. The display device 5000 may provide almost the same benefits as the display device 4000 of FIGS. 63A and 63B.

Specifically, each of the first supporting surfaces SS1 includes a middle surface MS_1 which is parallel to the first direction DR1 when the display device 5000 is unfolded, and two vertical surfaces VS which are disposed on both sides of the middle surface MS_1. The two vertical surfaces VS may have the same width. In this case, each of the first supporting surfaces SS1 may be bilaterally symmetrical.

Since each of the first supporting surfaces SS1 includes two vertical surfaces VS, multiple points where each pair of adjacent first supporting surfaces SS1 adjoin each other may be closer than their counterparts of FIGS. 63A and 63B to a curvature center C of a folding area FA.

That is, in the display device 4000 of FIGS. 63A and 63B in its folded state, a pair of adjacent first supporting surfaces SS1 may adjoin each other at a point PO4. On the contrary, in the display device 4000 in its folded state, a pair of adjacent first supporting surfaces SS1 may adjoin each other at a point PO5, which is closer than the point PO4 to the curvature center C.

The display device 5000 may separate the first supporting surfaces SS1 of sixth joint units JP6 from a display module 100 by a distance "gap2" between the points PO4 and PO5. Accordingly, when the display device 5000 is folded, the sixth joint units JP6 may minimize the generation of stress in the display module 100 substantially without causing the deformation of the display module 100.

What is claimed is:
1. A folding member comprising:
a first supporting member and a second supporting member separated from the first supporting member;
a plurality of joint units connected, on first sides thereof, to the first supporting member, connected, on second sides thereof, to the second supporting member, and coupled to one another to be rotatable along a first curved trajectory;

a third supporting member disposed below the first supporting member;

a fourth supporting member disposed below the second supporting member; and a hinge member providing first and second rotational axes, which are parallel to each other, to first sides of the third and fourth supporting members, respectively, which are opposite to each other, wherein each of the plurality of joint units includes a first guide part in an area on a bottom thereof, each of the third and fourth supporting members includes, in an area thereof, a second guide part which guides the first guide part to rotate along the first curved trajectory, and the plurality of joint units being disposed between the first supporting member and the second supporting member.

2. The folding member of claim 1, further comprising:

a first rear cover and a second rear cover disposed below the third and fourth supporting members, respectively.

3. The folding member of claim 2, wherein the first guide part includes a tunnel unit which extends perpendicularly from a middle of a surface of a respective joint unit of the plurality of joint units, and a penetration is defined in the tunnel unit.

4. The folding member of claim 3, wherein the second guide part includes a guide arm which overlaps with the tunnel unit and slides along the penetration.

5. The folding member of claim 4, wherein the guide arm extends along the first curved trajectory to be in contact with ends of the first and second rear covers.

6. The folding member of claim 3, wherein the first guide part includes a sidewall which is disposed at an end of the tunnel unit to extend perpendicularly from the surface of the respective joint unit and a hook which extends perpendicularly from the sidewall toward the tunnel unit.

7. The folding member of claim 6, wherein the second guide part includes a rail unit which overlaps with the hook and allows the hook to slide.

8. The folding member of claim 7, wherein the rail unit extends along the first curved trajectory to be in contact with ends of the first and second rear covers.

9. The folding member of claim 6, wherein a height from a top surface of the hook to the surface of the respective joint unit is the same as a height of the penetration.

10. The folding member of claim 1, wherein the plurality of joint units is coupled by pin members.

11. The folding member of claim 1, wherein each of the plurality of joint units includes an extension which extends in a first direction and protrusions which are disposed at each of both ends of the extension and are convexly curved, and grooves which are concavely curved in an opposite direction to the protrusions in a second direction which intersects the first direction are defined in the extension.

12. The folding member of claim 11, wherein the protrusions overlap with the grooves in the second direction and are rotatably coupled to the grooves.

13. The folding member of claim 12, wherein the plurality of joint units are coupled by metal plates.

14. The folding member of claim 13, wherein metal plate holes which are through holes are defined in the protrusions, and the metal plates penetrate the metal plate holes.

15. The folding member of claim 13, wherein each of the metal plates includes coupling areas and a bending area, coupling holes which are defined to correspond to coupling protrusions disposed in the first and second supporting members are defined in the coupling areas, and a plurality of bending holes is defined in the bending area.

16. The folding member of claim 14, wherein link part grooves are defined in areas of the protrusions, link parts are provided in areas of the link part grooves, and the link parts and the link part grooves overlap in the second direction and are rotatably coupled together.

17. The folding member of claim 1, wherein the first curved trajectory is defined as a part of a reference circle, and a center of the reference circle is apart from the first and second rotational axes.

18. The folding member of claim 1, wherein the hinge member includes a first gear which is connected to the first rotational axis, a second gear which is connected to the second rotational axis, and an idle gear which connects the first and second gears.

19. The folding member of claim 1, wherein the hinge member includes a rotary cam which performs a rectilinear motion, a fixed cam which converts the rectilinear motion of the rotary cam into a rotational motion, and an elastic member which firmly attaches the rotary cam and the fixed cam.

20. The folding member of claim 19, wherein the fixed cam includes three mountain-shaped parts and three valley-shaped parts, the rotary cam forms valley-shaped parts which engage with the mountain-shaped parts of the fixed cam to be in sliding surface contact with the mountain-shaped parts of the fixed cam and also forms mountain-shaped parts on opposite sides of each of the valley-shaped parts of the rotary cam.

21. A display device comprising: a display panel foldable along a first curved trajectory in a folding area which is defined in a plan view, the display panel displays an image; and a folding member disposed below the display panel to support the display panel, the folding member comprising:

first and second supporting members separated from each other: a plurality of joint units connected, on first sides thereof, to the first supporting member, connected, on second sides thereof, to the second supporting member, and coupled to one another to be rotatable along the first curved trajectory; third and fourth supporting members disposed below the first and second supporting members, respectively; and a hinge member connected, on a first side thereof, to the third supporting member to be rotatable about a first rotational axis and connected, on a second side thereof, to the fourth supporting member to be rotatable about a second rotational axis, wherein each of the plurality of joint units includes a first guide part, each of the third and fourth supporting members includes, in an area thereof, a second guide part which guides the first guide part to rotate along the first curved trajectory, the plurality of joint units being disposed between the first supporting member and the second supporting member, and a penetration is defined in the tunnel unit.

22. The display device of claim 21, wherein
the first guide part includes a tunnel unit which extends perpendicularly from a middle of a surface of a respective joint unit of the plurality of joint units, and
a penetration is defined in the tunnel unit.

23. The display device of claim 22, wherein
the second guide part includes a guide arm which overlaps with the tunnel unit and slides along the penetration.

24. The display device of claim 22, wherein the first guide part includes a sidewall which is disposed at an end of the tunnel unit to extend perpendicularly from the surface of the respective joint unit and a hook which extends perpendicularly from the sidewall toward the tunnel unit.

25. The display device of claim 24, wherein the second guide part includes a rail unit which overlaps with the hook and allows the hook to slide.

26. The display device of claim 21, wherein the plurality of joint units is coupled by pin members.

27. The display device of claim 21, further comprising:
a metal sheet disposed on the first supporting member, the second supporting member, and the plurality of joint units.

28. The display device of claim 27, wherein adhesive layers are interposed between the metal sheet, the first supporting member, the second supporting member, and the plurality of joint units.

29. The display device of claim 28, wherein each of the plurality of joint units has a middle surface which is in contact with a surface of the metal sheet and two chamfered surfaces which are disposed on opposite sides of the middle surface.

30. The display device of claim 28, wherein each of the plurality of joint units has a middle surface which is in contact with a surface of the metal sheet and two cut surfaces which are perpendicular to the middle surface.

* * * * *